(12) United States Patent
Hirota et al.

(10) Patent No.: US 7,360,303 B2
(45) Date of Patent: Apr. 22, 2008

(54) METHOD MANUFACTURING FOR A WINDING ASSEMBLY OF A ROTATING ELECTRICAL MACHINE

(75) Inventors: Yutaka Hirota, Tokyo (JP); Norihiro Murata, Tokyo (JP); Toshiaki Kashihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 379 days.

(21) Appl. No.: 10/550,560

(22) PCT Filed: Jan. 28, 2004

(86) PCT No.: PCT/JP2004/000736

§ 371 (c)(1),
(2), (4) Date: Sep. 26, 2005

(87) PCT Pub. No.: WO2005/074105

PCT Pub. Date: Aug. 11, 2005

(65) Prior Publication Data

US 2006/0230603 A1    Oct. 19, 2006

(51) Int. Cl.
*H01F 7/06* (2006.01)
*H02K 1/00* (2006.01)
(52) U.S. Cl. .............. 29/606; 29/605; 29/603.23; 29/603.24; 29/618; 310/179; 310/184
(58) Field of Classification Search ............. 29/605, 29/606, 603.24, 603.26, 603.236, 618, 596; 310/179, 184, 201, 198, 210, 199; 242/365.6, 242/365.3, 365.8, 366, 328, 329, 166
See application file for complete search history.

(56) References Cited

U.S. PATENT DOCUMENTS

| 4,890,466 | A | * | 1/1990 | Cislo ............................ 70/63 |
| 6,079,234 | A | * | 6/2000 | Hsiung ..................... 66/132 R |
| 6,140,735 | A | | 10/2000 | Kato et al. |
| 6,268,678 | B1 | * | 7/2001 | Asao et al. ................. 310/201 |
| 6,270,032 | B1 | * | 8/2001 | Chen ........................ 242/365.6 |
| 6,376,961 | B2 | | 4/2002 | Murakami et al. |
| 6,407,476 | B1 | * | 6/2002 | Nishimura .................. 310/180 |
| 2002/0130582 | A1 | | 9/2002 | Oketani et al. |
| 2003/0015932 | A1 | | 1/2003 | Oohashi et al. |
| 2004/0040142 | A1 | | 3/2004 | Hirota et al. |

* cited by examiner

*Primary Examiner*—A. Dexter Tugbang
*Assistant Examiner*—Tai Van Nguyen
(74) *Attorney, Agent, or Firm*—Sughrue Mion, PLLC

(57) ABSTRACT

There are proposed a manufacturing method of a winding assembly of a rotating electrical machine using a rotation block and a fixed block and a manufacturing apparatus used for the same. The rotation block includes a rotation surface rotatable around a rotation axis, and the fixed block includes a first surface and a second surface opposite to each other and a shaping surface. The shaping surface is formed between end parts of the first and the second surfaces, is made to have an almost semicircular shape with the rotation axis as the center, and extends along the rotation axis. Plural wire rods are simultaneously fed from the first surface of the fixed block to the rotation surface of the rotation block, and the wire rods positioned on the rotation surface are bent by rotation of the rotation block.

19 Claims, 33 Drawing Sheets

Fig. 23
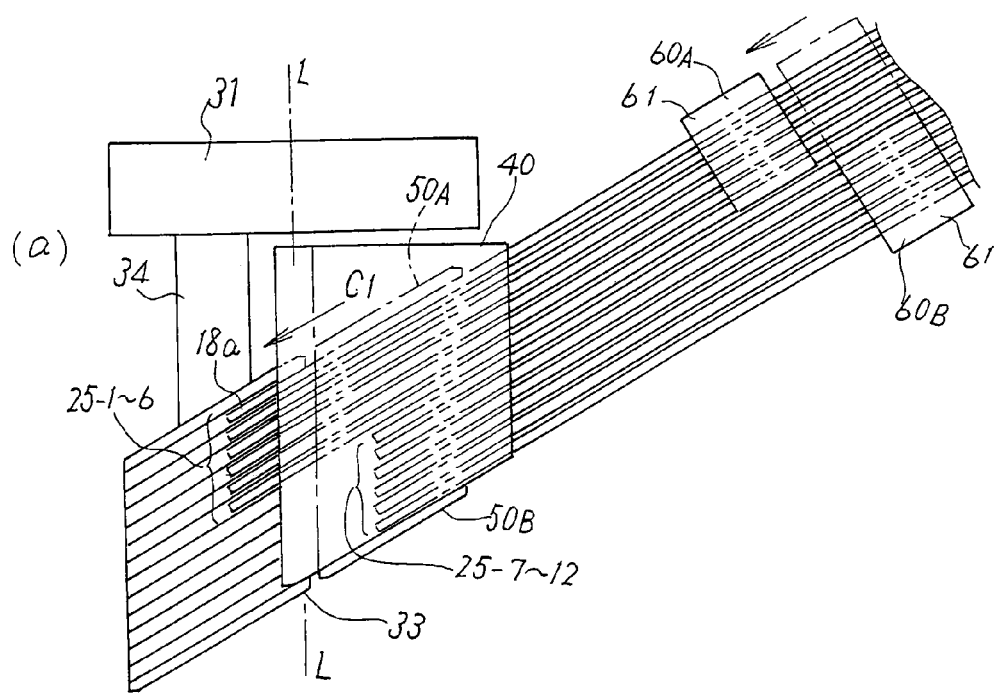
(a)
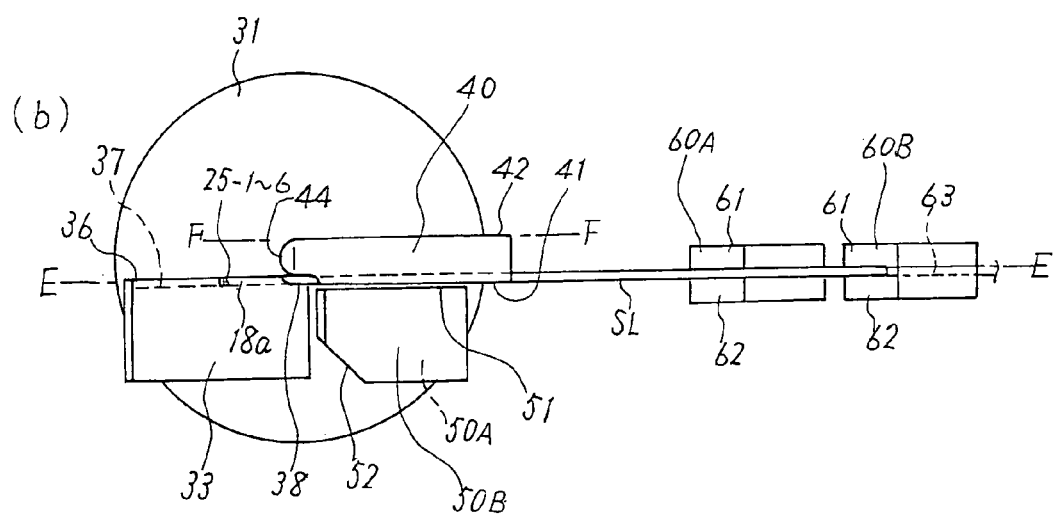
(b)

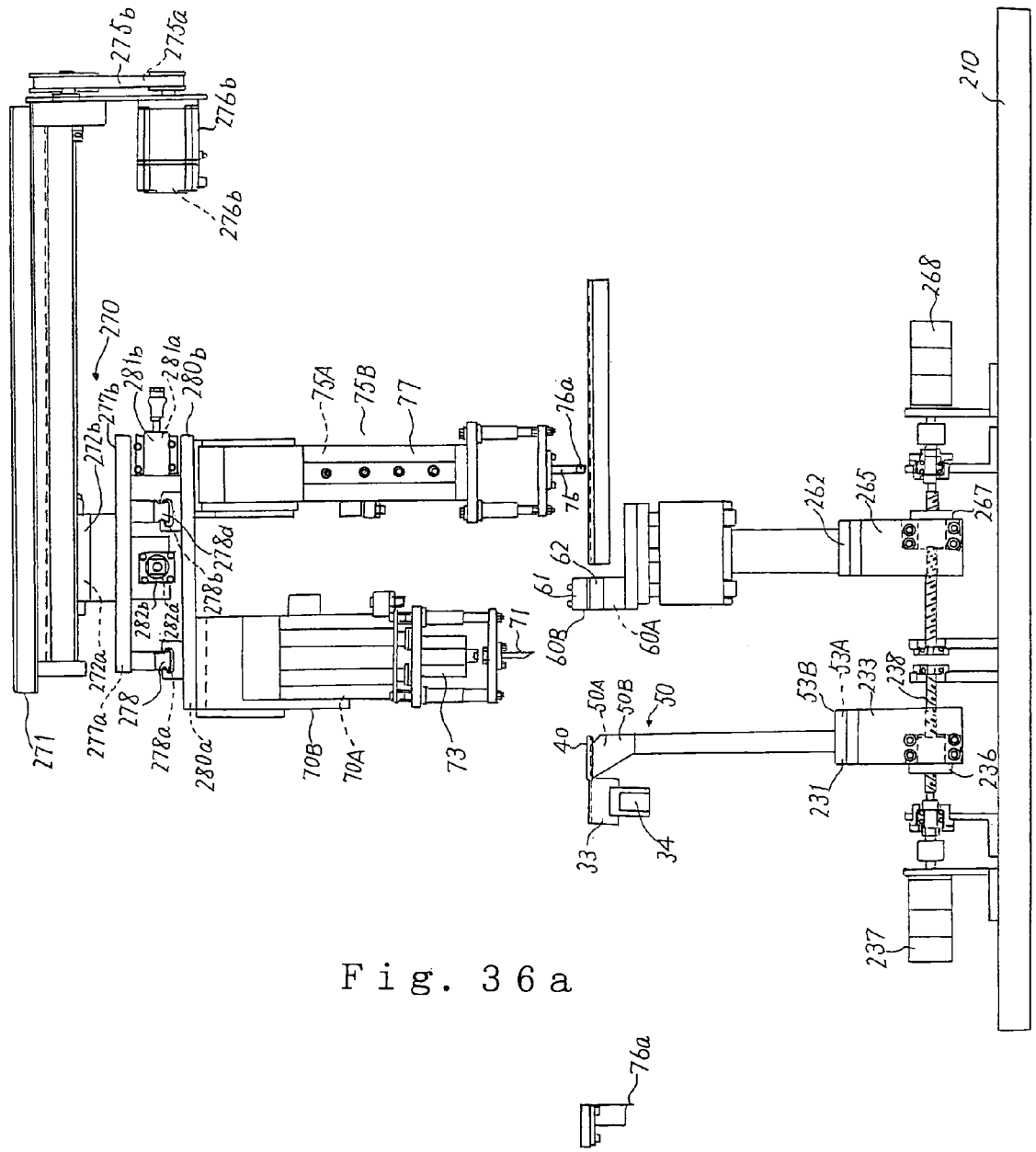

METHOD MANUFACTURING FOR A WINDING ASSEMBLY OF A ROTATING ELECTRICAL MACHINE

TECHNICAL FIELD

The present invention relates to a manufacturing method for a winding assembly of a rotating electrical machine used for a vehicle AC generator mounted in a vehicle such as, for example, a passenger car or a truck, and a manufacturing apparatus for the winding assembly.

BACKGROUND ART

The applicant of this application proposed a technique to improve the mass productivity of a winding member and a winding assembly used for this type of rotating electrical machine in JP-A-2002-176752. In this prior art, a winding assembly of a rotating electrical machine includes plural winding combinations, and each of the winding combinations are constructed by combining two winding members. Each of the winding members is wound by continuously turning a wire rod so as to have a first straight part, a second straight part, a first turn part to connect the first and the second straight parts at their one sides, and a second turn part to connect the first and the second straight parts at the other sides. According to this prior art, as compared with a conventional manufacturing method of a winding member in which a number of conductor segments are joined to each other to manufacture a winding member, the mass productivity can be improved.

In this prior art, as shown in FIG. 8 thereof, there was proposed a manufacturing method in which a pair of plate-like winding cores are used to simultaneously and helically wind plural wire rods. Each of the pair of plate-like winding cores includes plural projections to restrict the plural wire rods at the outer periphery. By the method of using the plate-like winding cores, plural wire rods, for example, twelve wire rods are wound around the pair of plate-like winding cores and are sequentially folded, so that for example, twelve winding members can be simultaneously wound.

However, in the plate-like winding cores disclosed in this prior art, since the width between the plural projections provided at one side of the outer periphery and the plural projections provided at the other side is fixed, and the lengths of the first and the second straight parts are fixed by the width, it is difficult to change the lengths of the first and the second straight parts. In order to change the lengths of the first and the second straight parts, although plate-like winding cores with different widths are prepared, the change of the lengths of the first and the second straight parts is nevertheless limited.

In order to improve this disadvantage, the present applicant proposed an improved prior invention. This improved prior invention will be simply called the prior invention. An application for this prior invention was filed in Japan on Sep. 4, 2002 as Japanese Patent Application No. 2002-259136, was filed in the United States on Feb. 6, 2003 as U.S. patent application Ser. No. 10/359,095, was filed in Germany on Jun. 5, 2003 as German Patent Application No. 10325617.2, and was filed in France on Jul. 4, 2003 as French Patent Application No. 0350297.

In this prior invention, a center shaft and a forming roller rotating around the center shaft are disposed on a turn plane, a wire rod is put in a forming gap between the center shaft and the forming roller, and the forming roller is rotated around the center shaft, so that the rod wire is turned.

In this prior invention, when the wire rod is supplied to the forming gap by a wire rod feed mechanism, since the lengths of the first and the second straight parts are set on the basis of the feed amount, the lengths of the first and the second straight parts can be easily changed by adjusting the feed amount.

However, this prior invention is for winding a relatively small number of, for example, one or two wire rods. In a winding assembly of a rotating electrical machine which requires more winding members, after the winding step is ended, a step of mutually weaving the wound winding members is indispensable. Further, since the number of winding members wound at one winding step is small, in order to mutually weave more winding members at the weaving step, the number of times of weaving is required to be made large, the work time of the weaving step becomes long, and the work efficiency is low.

Besides, in the prior invention, an push-out member is used in order to successively push out the winding member wound on the turn plane from the turn plane. However, the extrusion by the push-out member is required to be performed by specially providing the push-out step after the turn step of the wire rod on the turn plane is ended, and the whole work time of the winding step becomes long by this push-out step, and the work efficiency becomes low.

Further, in the prior invention, in the case where lead wires are formed for plural winding members of the winding assembly, after the winding step of the winding assembly, it is necessary to provide an operation of joining the special lead wires to places of the wiring members where the lead wires are required.

A first object of this invention is to propose a new improved manufacturing method for a winding assembly of a rotating electrical machine in which the problems of the prior art are improved, and the weaving step in the prior invention is made unnecessary, or even if the weaving step is performed, the number of times of weaving at the weaving step can be decreased.

Besides, a second object of this invention is to propose a new improved manufacturing method for a winding assembly of a rotating electrical machine in which the problems of the prior art are improved, the weaving step of the prior invention is made unnecessary, or the number of times of weaving at the weaving step is decreased, and the push-out step by the push-out member in the prior invention is made unnecessary.

Besides, a third object of this invention is to propose a new improved manufacturing method for a winding assembly of a rotating electrical machine in which the problems of the prior art are improved, and the number of times of weaving in the prior invention is made unnecessary, or the number of times of weaving at the weaving step is decreased, and further, formation of the lead wire in the prior invention is performed in a winding step.

Further, a fourth object of the invention is to propose a new improved manufacturing apparatus for a winding assembly of a rotating electrical machine which can be used for at least the manufacturing method for the winding assembly of the rotating electrical machine corresponding to the first object.

DISCLOSURE OF THE INVENTION

A manufacturing method for a winding assembly of a rotating electrical machine according to this invention and corresponding to the first object is a manufacturing method for a winding assembly of a rotating electrical machine including a winding step of winding respective winding members so that each of the plural winding members has a first straight part, a second straight part, a first turn part connecting the first straight part and the second straight part at their one sides, and a second turn part connecting the first straight part and the second straight part at the other sides. At the winding step, a rotation block and a fixed block are used, the rotation block includes a rotation surface rotatable around a rotation axis, the fixed block includes a first and a second surfaces opposite to each other and a shaping surface formed between end parts of the first surface and the second surface, and the shaping surface is made to have a substantial semicircular shape with the rotation axis as a center and is extended in a direction of the rotation axis.

The winding step includes a first and a second wire rod feed steps, and a first and a second wire rod turn steps. At the first and the second wire rod feed steps, plural wire rods are supplied such that in a state where they are arranged substantially in parallel to each other, the wire rods extend from the first surface of the fixed block onto the rotation surface of the rotation block and project by a predetermined dimension from the rotation axis, and consequently, lengths of the first and the second straight parts are respectively set. Besides, at the first and the second wire rod turn steps, the plural wire rods on the rotation surface of the rotation block, together with the rotation block, are rotated, so that the plural wire rods are simultaneously bent along the shaping surface, and the first and the second turn parts are respectively formed.

In the manufacturing method for the winding assembly of the rotating electrical machine according to this invention and corresponding to the first object, the rotation block and the fixed block are used, and at the first and the second wire rod feed steps, the plural wire rods are supplied such that in the state where they are arranged substantially in parallel to each other, the wire rods extend from the first surface of the fixed block onto the rotation surface of the rotation block and project from the rotation axis by the predetermined dimension, and consequently, the lengths of the first and the second straight parts are set. Thus, it is unnecessary to use a plate-like winding core unlike the prior art, and with respect to the lengths of the first and the second straight parts, the lengths of the first and the second straight parts can be easily changed by adjusting the feed amount of the plural wire rods at the first and the second wire rod feed steps. Besides, at the first and the second wire rod turn steps, the plural wire rods on the rotation surface of the rotation block, together with the rotation block, are rotated, so that the plural wire rods are simultaneously bent along the shaping surface, and the first and the second turn parts are respectively formed. However, the rotation block includes the rotation surface rotatable around the rotation axis, the fixed block includes the first surface and the second surface opposite to each other and the shaping surface formed between the end parts of the first surface and the second surface, and the shaping surface is made to have the substantial semicircular shape with the rotation axis as the center and is extended along the rotation axis. Thus, as compared with the prior invention, more winding members can be more certainly and simultaneously wound, and the weaving step as in the prior invention is made unnecessary, or the number of times of weaving can be decreased.

Besides, a manufacturing method for a winding assembly of a rotating electrical machine according to this invention and corresponding to the second object is a manufacturing method for a winding assembly of a rotating electrical machine including a winding step of winding respective winding members so that each of the plural winding members has a first straight part, a second straight part, a first turn part connecting the first straight part and the second straight part at their one sides, and a second turn part connecting the first straight part and the second straight part at the other sides, and at the winding step, a rotation block and a fixed block are used. The rotation block includes a rotation surface rotatable around a rotation axis, the fixed block includes a first and a second surfaces opposite to each other and a shaping surface formed between end parts of the first surface and the second surface, and the shaping surface is made to have a substantial semicircular shape with the rotation axis as a center and is extended in a direction of the rotation axis. The winding step includes a first and a second wire rod feed steps, and a first and a second wire rod turn steps. At the first and the second wire rod feed steps, plural wire rods are supplied such that in a state where they are arranged substantially in parallel to each other, they extend from the first surface of the fixed block onto the rotation surface of the rotation block along a supply path inclined by a predetermined angle α with respect to the rotation axis and project by a predetermined dimension from the rotation axis, and consequently, lengths of the first and the second straight parts are respectively set. Besides, at the first and the second wire rod turn steps, the plural wire rods on the rotation surface of the rotation block, together with the rotation block, are rotated, so that the plural wire rods are simultaneously bent along the shaping surface, and the first and the second turn parts are respectively formed.

In the manufacturing method of the winding assembly of the rotating electrical machine according to this invention and corresponding to the second object, in addition to the effects of the manufacturing method for the winding assembly of the rotating electrical machine according to this invention and corresponding to the first object, at the first and the second wire rod feed steps, the plural wire rods are supplied such that in the state where they are arranged substantially in parallel to each other, they extend from the first surface of the fixed block onto the rotation surface of the rotation block along the supply path inclined by the predetermined angle α with respect to the rotation axis and project from the rotation axis by the predetermined dimension, and consequently, the lengths of the first and the second straight parts are set, and at the subsequent first and the second wire rod turn steps, the plural wire rods are simultaneously bent along the shaping surface, and the first and the second turn parts are formed. Thus, at the first and the second wire rod turn steps, the plural wire rods are bent, so that the plural wire rods are fed along the rotation axis, and an push-out step by a special push-out member becomes unnecessary, and the efficiency of the winding step of the winding assembly can be improved.

Besides, a manufacturing method for a winding assembly of a rotating electrical machine according to this invention and corresponding to the third object is a manufacturing method for a winding assembly of a rotating electrical machine including a winding step of winding respective winding members so that each of the plural winding members has a first straight part, a second straight part, a first turn part connecting the first straight part and the second straight part at their one sides, and a second turn part connecting the first straight part and the second straight part at the other sides. At the winding step, a rotation block, a fixed block and a wire rod feed mechanism are used. The rotation block includes a rotation surface rotatable around a rotation axis between an original position and a rotation position, the fixed block includes a first and a second surfaces opposite to each other and a shaping surface formed between end parts of the first surface and the second surface, the shaping surface is made to have a substantail semicircular shape with the rotation axis as a center and is extended in a direction of the rotation axis, and the wire rod feed mechanism is constructed to supply the plural wire rods, in a state where they are arranged substantially in parallel to each other, along a supply path inclined by a predetermined angle α with respect to the rotation axis. At the winding step, a first wire rod feed step, a first wire rod turn step, a second wire rod feed step, and a second wire rod turn step are performed in this order. At the first and the second wire rod feed steps, the rotation surface of the rotation block is at the original position, and the wire rod feed mechanism supplies the plural wire rods so that they extend from the first surface of the fixed block onto the rotation surface of the rotation block and project from the rotation axis by a predetermined dimension, and consequently, lengths of the first and the second straight parts are set. Besides, at the first and the second wire rod turn steps, by a first rotation movement in which the rotation surface of the rotation block rotates around the rotation axis from the original position to the rotation position in a predetermined direction, the plural wire rods are simultaneously bent along the shaping surface, and the first and the second turn parts are formed, and after the first and the second turn parts are formed, the rotation surface of the rotation block is returned to the original position by a second rotation movement in which the rotation block is rotated reversely to the first rotation movement. The winding step includes a lead wire preparation step between the first wire rod feed step and the next first wire rod turn step, this lead wire preparation step includes a cut step of cutting at least one wire rod selected from the plural wire rods between the fixed block and the wire rod feed mechanism, and a cut end part of the cut wire rod is bent at the next first wire rod turn step by the rotation of the rotation block in a state where it projects more than the other wire rods.

In a manufacturing method for a winding assembly of a rotating electrical machine according to this invention and corresponding to the third object, in addition to the effects of the manufacturing method for the wiring assembly of the rotating electrical machine according to this invention and corresponding to the first object, the winding step includes the lead wire preparation step between the first wire rod feed step and the next first wire rod turn step, the lead wire preparation step includes the cut step of cutting at least one wire rod selected from the plural wire rods between the fixed block and the wire rod feed mechanism, the cut end part of the cut wire rod is bent by the rotation of the rotation block at the next first wire rod turn step in the state where it projects more than the other wire rods, and accordingly, the formation of the lead wire can be performed in the winding step, and the work efficiency can be further improved.

A manufacturing apparatus of a winding assembly of a rotating electrical machine according to this invention and corresponding to the fourth object is a manufacturing apparatus of a winding assembly of a rotating electrical machine used in a winding step of winding respective winding members so that each of the plural winding members has plural first straight parts, plural second straight parts, first turn parts connecting the first straight parts and the second straight parts at their one sides, and second turn parts connecting the first straight parts and the second straight parts at the other sides, and includes a rotation block, a fixed block and a wire rod feed mechanism. The rotation block includes a rotation surface rotatable around a rotation axis, the fixed block includes a first and a second surfaces opposite to each other and a shaping surface formed between end parts of the first surface and the second surface, the shaping surface is made to have a substantial semicircular shape with the rotation axis as a center and is extended in a direction of the rotation axis, and the wire rod feed mechanism is constructed to supply plural wire rods in a state where they are arranged substantially in parallel to each other. The winding step includes a first and a second wire rod feed steps, and a first and a second wire rod turn steps. At the first and the second wire rod feed steps, the wire rod feed mechanism supplies the plural wire rods such that in a state where they are arranged substantially in parallel to each other, these wire rods extend from the first surface of the fixed block onto the rotation surface of the rotation block and project by a predetermined dimension from the rotation axis, and consequently, lengths of the first and the second straight parts of the plural wire rods are respectively set. Besides, at the first and the second wire rod turn steps, the plural wire rods on the rotation surface of the rotation block, together with the rotation block, are rotated, so that the plural wire rods are simultaneously bent along the shaping surface, and the first and the second turn parts are respectively formed.

According to the manufacturing apparatus for the winding assembly of the rotating electrical machine according to the invention and corresponding to the fourth object, the plate-like winding core of the prior art is not used, and while adjustment of the lengths of the first and the second straight parts is easily performed, the plural winding members can be simultaneously wound. Besides, by using the rotation block and the fixed block, more wire rods can be simultaneously bent as compared with the prior invention, and accordingly, the weaving step of the prior invention is made unnecessary, or the number of times of weaving can be decreased.

BRIEF DESCRIPTION OF THE DRAWINGS

FIG. 4 shows a main part of a manufacturing apparatus used for manufacturing the winding assembly of the rotating electrical machine according to this invention, in which FIG. 4(a) is a plan view and FIG. 4(b) is a side view.

FIG. 5 and FIG. 6 show a first wire rod feed step of a winding step in embodiment 1 relating to a manufacturing method for the winding assembly of the rotating electrical machine according to this invention, in which FIG. 5(a) and FIG. 6(a) are plan views, and FIG. 5(b) and FIG. 6(b) are side views.

FIG. 7, FIG. 8 and FIG. 9 show a first wire rod turn step of the winding step in embodiment 1, in which FIG. 7(a), FIG. 8(a) and FIG. 9(a) are plan views, and FIG. 7(b), FIG. 8(b) and FIG. 9(b) are side views.

FIG. 10 shows a second wire rod feed step of the winding step in embodiment 1, in which FIG. 10(a) is a plan view, and FIG. 10(b) is a side view.

FIG. 12 shows one winding member in the winding assembly of FIG. 11, in which FIG. 12(a) is a front view, and FIG. 12(b) is a side view.

FIG. 15 is an explanatory view of the displacement step and a press step, in which FIG. 15(a) is an explanatory view of the displacement step, and FIG. 15(b) is an explanatory view of the press step.

FIG. 16 shows a lead wire preparation step of embodiment 2 relating to a manufacturing method for a winding assembly of a rotating electrical machine according to this invention, in which FIG. 16(a) is a plan view, and FIG. 16(b) is a side view.

FIG. 17 is an explanatory view of forward rotation driving of a rotation block in embodiment 2, in which FIG. 17(a) is a plan view, and FIG. 17(b) is a side view.

FIG. 18 is an explanatory view of the end of the forward rotation driving of the rotation block in embodiment 2, in which FIG. 18(a) is a plan view, and FIG. 18(b) is a side view.

FIG. 19 is a detailed explanatory view of an avoidance return operation of the rotation block in embodiment 2, in which FIG. 19(a) is an explanatory view of a first upward movement of the rotation block, FIG. 19(b) is an explanatory view of a backward operation, a counter rotation movement, a downward movement, and a forward movement of the rotation block, and FIG. 19(c) is an explanatory view of a second upward movement of the rotation block.

FIG. 21 shows a lead wire formation step of a winding step in embodiment 3 relating to a manufacturing method for a winding assembly of a rotating electrical machine according to this invention, in which FIG. 21(a) is a plan view, and FIG. 21(b) is a side view.

FIG. 22 is a detailed explanatory view of an avoidance return operation of a rotation block in embodiment 3, in which FIG. 22(a) is an explanatory view of a first upward movement of the rotation block, FIG. 22(b) is an explanatory view of a backward operation, a counter rotation movement, a downward movement, and a forward movement of the rotation block, and FIG. 22(c) is an explanatory view of a second upward movement of the rotation block.

FIG. 23 and FIG. 24 show a wire rod turn step of a winding start end part of a winding step in embodiment 4 relating to a manufacturing method for a winding assembly of a rotating electrical machine according to this invention, in which FIG. 23(a) and FIG. 24(a) are plan views, and FIG. 23(b) and FIG. 24(b) are side views.

FIG. 25 shows a winding turn step of a winding finish end part of the winding step in embodiment 4, in which FIG. 25(a) is a plan view, and FIG. 25(b) is a side view.

FIG. 36 is a side view showing the whole structure of the manufacturing apparatus of embodiment 5, and FIG. 36a is a front view of a tip part of a pusher of a selected wire rod push-out mechanism.

BEST MODE FOR CARRYING OUT THE INVENTION

Description of a Winding Member and a Winding Assembly of a Rotating Electrical Machine Before a description is given to embodiments of a manufacturing method for a winding assembly of a rotating electrical machine according to this invention and a manufacturing apparatus for the winding assembly of the rotating electrical machine, a description will be given to the winding assembly of the rotating electrical machine manufactured by this invention and a winding member included therein.

Figure 1:
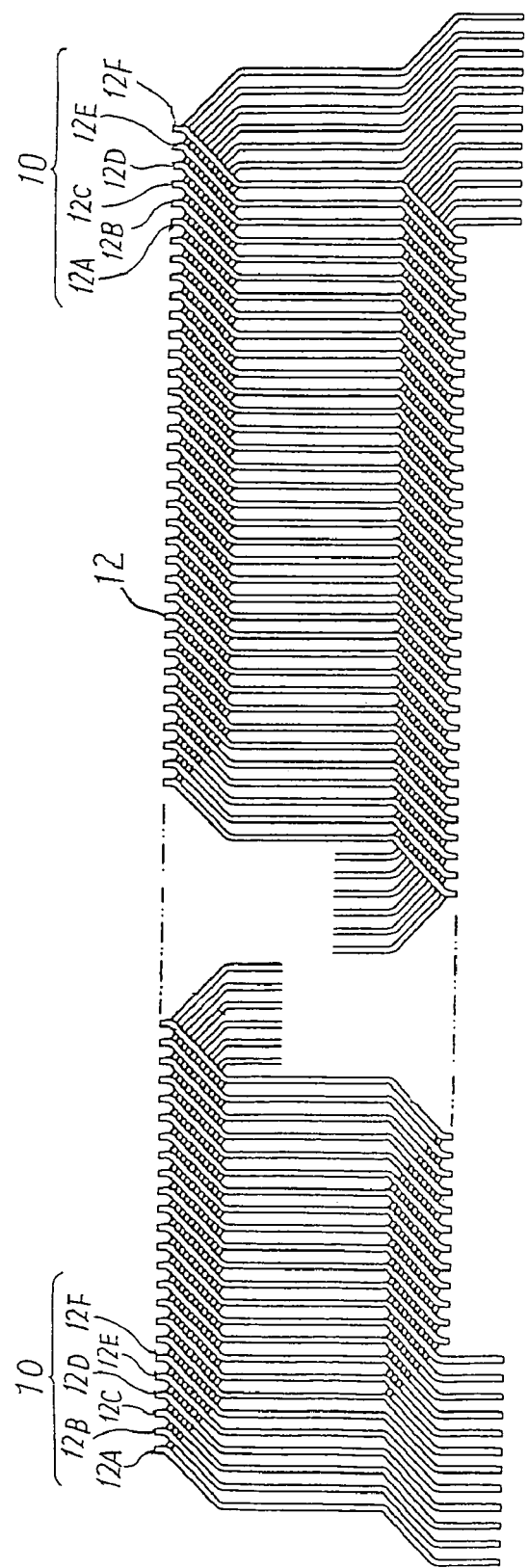
FIG. 1 is a developed view of a winding assembly of a rotating electrical machine manufactured by this invention.
Figure 2:
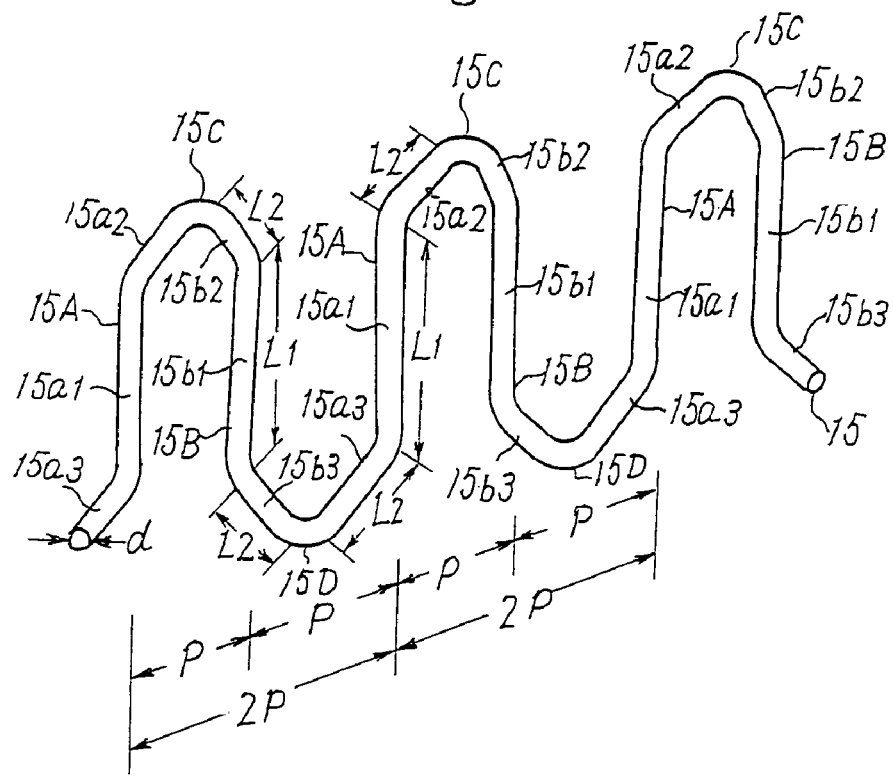
FIG. 2 is a developed view of a winding member in the winding assembly of the rotating electrical machine manufactured by this invention.
Figure 3:
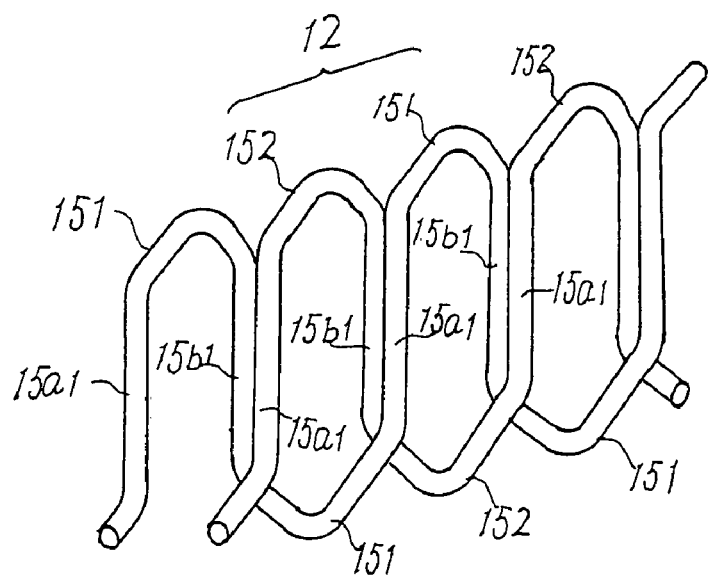
FIG. 3 is a developed view of a winding combination of a rotating electrical machine manufactured by this invention.

FIG. 1 is a developed view of a winding assembly of a rotating electrical machine manufactured by a manufacturing method for a winding assembly of a rotating electrical machine according this invention, FIG. 2 is perspective view showing a part of one winding member in the winding assembly shown in FIG. 1, and FIG. 3 is a perspective view showing a part of one winding combination in the winding assembly shown in FIG. 1.

A winding assembly 10 shown in FIG. 1 includes plural winding combinations 12, and specifically includes, for example, six winding combinations 12A to 12F. Each of the winding combinations 12A to 12F is helical and continuous from the left end to the right end of FIG. 1. Each of the winding combinations 12 is constructed by combining plural winding members 15 as shown in FIG. 3, and is specifically constructed by combining two winding members 151 and 152. Each of the winding members 15 is constructed by winding one insulating wire rod helically as shown in FIG. 2. Since the winding assembly 10 shown in FIG. 1 includes the six winding combinations 12, and each of the winding combinations 12 includes the two winding members 15, the twelve winding members 15 in total are included. The wire rod used in this winding member is a long member of conductive material such as a copper wire subjected to insulating coating, for example, a conductive member having a circular section and covered with an enamel coating. However, a coated wire rod having a rectangular section can also be used.

In the developed state shown in FIG. 2, each of the winding members 15 includes plural first straight parts 15A positioned on a first plane, plural second straight parts 15B positioned on a second plane, plural first turn parts 15C, and plural second turn parts 15D, and is constructed by winding one insulating wire rod so that these are continuous with each other. The first plane on which the plural first straight parts 15A are positioned and the second plane on which the plural second straight parts 15B are positioned are opposite to each other with a slight gap and are parallel to each other. Each of the plural first straight parts 15A includes a first parallel straight part 15a1 parallel to each other, and includes two inclined parts 15a2 and 15a3 bent from the first parallel straight part 15a1. Each of the inclined parts 15a2 is positioned at the upper side of the winding member 15, and each of the inclined parts 15a3 is positioned at the lower side. When the length of the first parallel straight part 15a1 is L1, and the length of each of the two inclined parts 15a2 and 15a3 is L2, the length L of the first straight part 15A becomes L=L1+2L2.

Each of the plural second straight parts 15B includes a second parallel straight part 15b1 parallel to each other, and includes two inclined parts 15b2 and 15b3 bent from the second parallel straight part 15b1. Each of the inclined parts 15b2 is positioned at the upper side of the winding member 15 in FIG. 2, and each of the inclined parts 15b3 is positioned at the lower side. The length of the second parallel straight part 15b1 is L1 equal to that of the first parallel straight part 15a1, and the length of each of the inclined parts 15b2 and 15b3 is L2 equal to that of the inclined parts 15a2 and 15a3. Accordingly, the length L of the second straight part 21B is also equal to the length L of the first straight part 21A.

The interval between the adjacent two first parallel straight parts 15a1, and the interval between the adjacent two second parallel straight parts 15b1 are equal to each other, and is made, for example, 2P. Besides, each of the second parallel straight parts 15b1 is arranged to be parallel to each of the first parallel straight parts 15a1, and is positioned just at the midpoint of the adjacent two parallel straight parts 15a1. As a result, the interval between the adjacent first parallel straight part 15a1 and the second parallel straight part 15b1 is P.

The plural first turn parts 15C are positioned at the upper side of the winding member 15 in FIG. 2, and the plural second turn parts 15D are positioned at the lower side thereof. Each of the plural first turn parts 15C connects each of the first straight parts 15A and the second straight part 15B adjacent thereto at its one side between the first plane and the second plane. In detail, each of the first turn parts 15C connects the inclined part 15a2 bent from each of the first parallel straight parts 15a1 and the inclined part 15b2 bent from each of the second parallel straight parts 15b1 adjacent thereto at one side of the first parallel straight part 15a1 between the first plane and the second plane.

Each of the plural second turn parts 15D connects each of the first straight parts 15A and each of the second straight parts 15B adjacent thereto at the other side between the first plane and the second plane. In detail, each of the second turn parts 15D connects the inclined part 15a3 bent from each of the first parallel straight parts 15a1 and the inclined part 15b3 bent from the second parallel straight part 15b1 adjacent thereto at the other side between the first plane and the second plane.

The winding combination 12 is constructed as shown in FIG. 3, and each of the winding combinations 12A to 12F constituting the winding assembly 10 shown in FIG. 1 is constructed as shown in FIG. 3. Of course, FIG. 3 also shows a developed state. The winding combination 12 is formed by combining two winding members 151 and 152. In the winding combination 12 developed and shown in FIG. 3, the first parallel straight part 15a1 of the winding member 151 is overlapped on the second parallel straight part 15b1 of the other winding member 152, and the second parallel straight part 15b1 of the winding member 151 is overlapped under the first parallel straight part 15a1 of the other winding member 152.

The winding assembly 10 shown in FIG. 1 is mounted to plural slots formed at predetermined intervals on the inner periphery of a stator iron core formed into a cylindrical shape. In the state where it is mounted to the stator iron core, although the whole of the winding assembly 10 also becomes cylindrical, in FIG. 1, this is developed on one plane and is shown. In the state where it is mounted to the stator iron core, the first parallel straight part 15a1 of the winding member 151 is inserted in one slot, and the second parallel straight part 15b1 of the winding member 152 is overlapped thereunder and is inserted. In another slot spaced apart from this slot by a distance equal to the pitch P, the second parallel straight part 15b1 of the winding member 151 and the first parallel straight part 15a1 of the winding member 152 overlapped thereon are inserted.

Description of Embodiments Relating to the Invention of a Manufacturing Method for a Winding Assembly 10 of a Rotating Electrical Machine Embodiment 1

Embodiment 1 relating to the manufacturing method for the winding assembly 10 of the rotating electrical machine according to this invention will be described.

The manufacturing method for the winding assembly 10 according to this invention is carried out in the order of a winding step, a displacement step, a press step and an insertion step. First, the winding step of the winding assembly 10 according to this invention will be described, and then, the displacement step, the press step, and the insertion step will be described.

Main Structure of a Manufacturing Apparatus 20 Used

Figure 4:
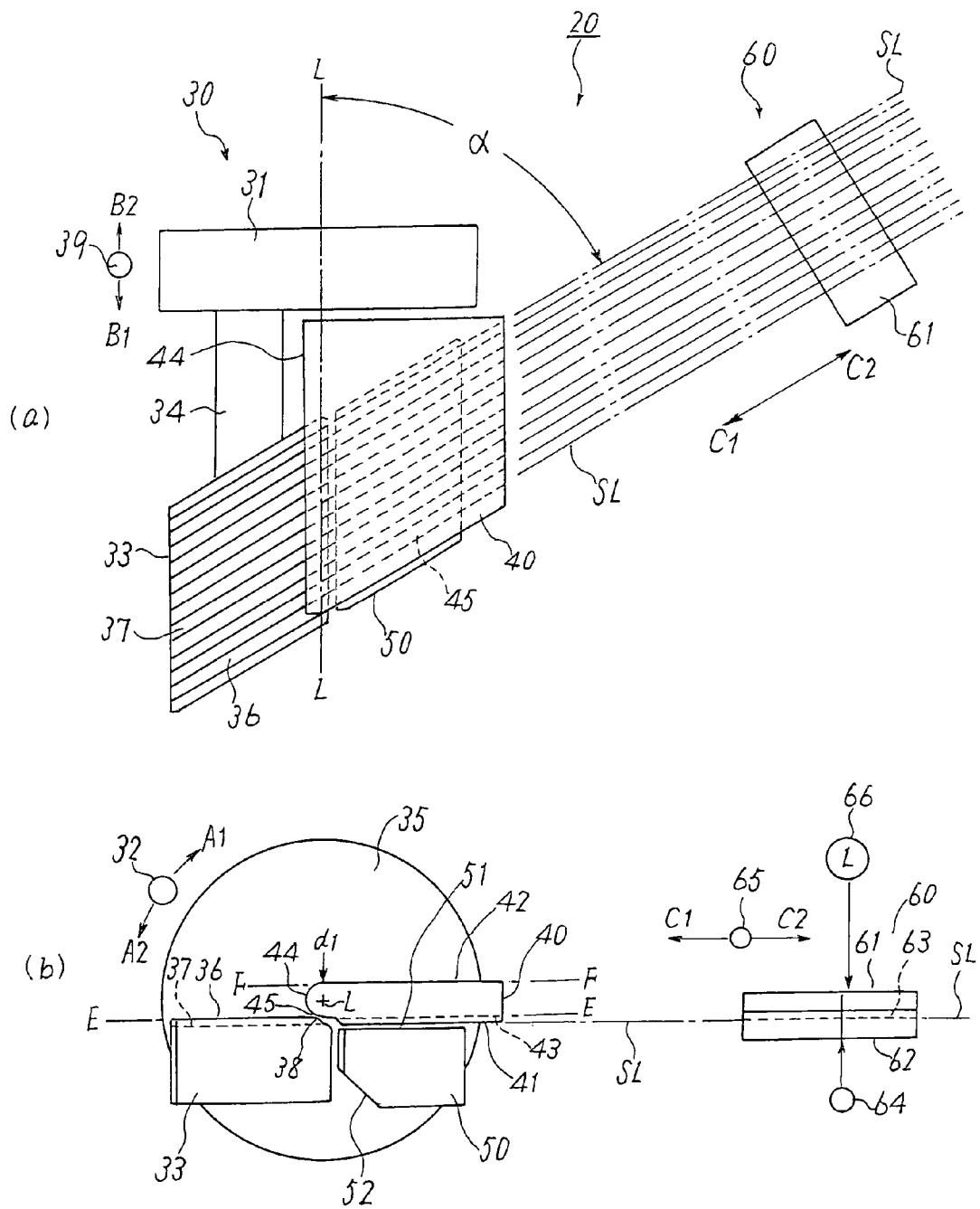

The main structure of the manufacturing apparatus 20 used in the winding step of embodiment 1 is shown in FIG. 4. FIG. 4(a) is a plan view thereof, and FIG. 4(b) is a side view thereof. As shown in FIGS. 4(a) and 4(b), this manufacturing apparatus 20 includes a turn mechanism 30 and a wire rod feed mechanism 60, and simultaneously and helically winds all twelve winding members 15 constituting the winding assembly 10. Since the winding assembly 10 includes the six winding combinations 12A to 12F, and each of the winding combinations 12A to 12F includes the two winding members 15, twelve winding members 15 in total are included, and these twelve winding members 15 are simultaneously wound.

The turn mechanism 30 includes a rotator 31, a rotation block 33, a fixed block 40, and an auxiliary block 50. The turn mechanism 30 includes a rotation driving mechanism 32 for rotation-driving the rotator 31, and the rotator 31 is intermittently rotation-driven by this rotation driving mechanism 32 around an rotation axis L-L in directions of arrows A1 and A2. The rotation in the arrow A1 direction will be called forward rotation, and the rotation in the arrow A2 direction will be called counter rotation. The rotation block 33 is arranged at one side of the rotator 31 so as to be rotated together with a coupling body 34, the rotation block 33 is rotated at one side of the rotator 31, and a rotation space 35 is formed at the one side of this rotator 31. The rotation block 33 includes a rotation surface 36 facing the rotation space 35 at its upper plane, and this rotation surface 36 is formed to be plane. In FIGS. 4(a) and 4(b), the rotation block 33 is shown at its original position, and at this original position, the rotation surface 36 exists on a first reference surface E-E horizontally extending toward the left direction from a position slightly lower than the rotation axis L-L.

Twelve wire rods constituting the winding assembly 10 are supplied on supply lines SL of the twelve wire rods. The supply lines SL of the twelve wire rods are set to be parallel to each other and at equal intervals. As shown in FIG. 4(a), the supply lines SL of these wire rods are set in a direction inclined by a predetermined inclination angle α with respect to the rotation axis L-L. This inclination angle α is set to be, for example, 60 degrees. Besides, as shown in FIG. 4(b), the supply lines SL of these wire rods are set on a plane slightly lower than the first reference plane E-E and parallel to the first reference plane E-E.

Twelve guide grooves 37 for guiding the twelve wire rods are formed in parallel to each other on the rotation surface 36 of the rotation block 33. The guide grooves 37 are formed to be parallel to the supply lines SL of the twelve wire rods. Accordingly, the guide grooves 37 on the rotation surface 36 are also formed to be inclined by the inclination angle α with respect to the rotation axis L-L. An arc surface 38 is formed at an inner end part of the rotation surface 36 positioned near the rotation axis L-L. The respective guide grooves 37 are opened upward at the time when the rotation block 33 exists at the original position. The bottom surface of each of the guide grooves 37 exists on the plane including the supply lines SL of the wire rods at the time when the rotation block 33 exists at the original position.

The turn mechanism 30 includes a reciprocal movement mechanism 39 to reciprocate the rotator 31 and the rotation block 33 along the rotation axis L-L, and the rotator 31 is driven by the reciprocal movement mechanism 39 to intermittently perform a reciprocate movement along the rotation axis L-L in directions of arrows B1 and B2. The reciprocal movement of the rotation block 33 by this reciprocal movement mechanism 39 will be called a slight forward movement FD0 and a slight backward movement BK0.

The fixed block 40 is fixed in the rotation space 35 by a not-shown fixing stand. This fixed block 40 includes a first surface 41 and a second surface 42 opposite to each other and parallel to each other. Both the first surface 41 and the second surface 42 are formed to be plane. The first surface 41 of the fixed block 40 extends toward the right direction and in the horizontal direction on the plane including the supply lines SL of the wire rods from slightly below the rotation axis L-L. The twelve guide grooves 43 extending in parallel to the supply lines SL of the respective wire rods are formed on the first surface 41. The respective guide grooves 43 are opened downward. The upper bottom surfaces of the respective guide grooves 43 are positioned on the first reference surface E-E. The second surface 42 of the fixed block 40 extends horizontally toward the right direction from slightly above the rotation axis L-L, and forms a second reference surface F-F parallel to the first reference surface E-E.

A shaping surface 44 is formed at the end parts of the first surface 41 and the second surface 42 on the side of the rotation axis L-L. The shaping surface 44 is formed to have a semicircular shape with the rotation axis L-L as the center, and the semicircular surface of the shaping surface 44 is expanded toward the rotation surface 36. The shaping surface 44 exists between the first surface 41 and the second surface 42, and is specifically formed between the first reference surface E-E on which the upper bottoms of the respective guide grooves 43 are positioned and the second reference plane F-F formed of the second surface 42. This shaping surface 44 is extended along the rotation axis L-L, the whole portion in the extension direction is opposite to the arc surface 38 of the rotation block 33, and a gap 45 is formed therebetween. The diameter of the semicircular shape of the shaping surface 44 is d1, and the gap length of the gap 45 in the diameter direction is smaller than the depths of the guide grooves 37 and 43. Although the shaping surface 44 is formed into the semicircular shape with the rotation axis L-L as the center, it is not necessarily required to have the accurate semicircular shape, and it is sufficient if the shaping surface is formed to have a substantial semicircular shape with the rotation axis L-L as the center.

The rotation surface 36 of the rotation block 33 is aligned with the first surface 41 of the fixed block 40 at the original position shown in FIGS. 4(a) and 4(b). In this alignment state, the rotation surface 36 and the upper bottom surfaces of the respective guide grooves 43 of the fixed block 40 are aligned on the first reference surface E-E, and the lower bottom surfaces of the respective guide grooves 37 of the rotation surface 36 and the first surface 41 of the rotation block 40 are aligned on the plane including the supply lines SL of the wire rods.

When the rotation block 33 performs the forward rotation operation from the original position shown in FIG. 4, that is, is rotation-driven in the arrow A1 direction, the twelve wire rods in the guide grooves 37 on the rotation surface 36 are rotated in the arrow A1 direction by the rotation surface 36. In the forward rotation operation of the rotation block 33, the rotation surface 36 of the rotation block 33 becomes almost parallel to the second surface 42 of the fixed block 40, the rotation block 33 is rotated to the position where the plural wire rods are pressed to the second reference surface F-F of the second surface 42, and the twelve wire rods are bent along the shaping surface 44 around the rotation axis L-L. The rotation block 33 is returned to the original position by the counter rotation operation, that is, the rotation in the arrow A2 direction.

The auxiliary block 50 is positioned at a position opposite to the first surface 41 of the fixed block 40. This auxiliary block 46 includes an auxiliary surface 51 formed to be plane, and the auxiliary surface 51 is in contact with the first surface 41 of the fixed block 40 or in a state close thereto. The auxiliary surface 51 of the auxiliary block 50 prevents the wire rods in the respective guide grooves 43 of the first surface 41 from outgoing from the respective guide grooves 43, and holds the respective wire rods in the respective guide grooves 43. The auxiliary block 50 includes an inclined surface 52 at a lower corner on the rotation axis L-L side. This inclined surface 52 has a shape obtained by obliquely cutting the lower corner of the auxiliary block 50 on the rotation axis L-L side.

The wire rod feed mechanism 60 includes a pair of feed blocks 61 and 62, and these feed blocks 61 and 62 are arranged so that the supply lines SL for the wire rods may be nipped therebetween. The feed block 61 is made of a material having elasticity, guide grooves 63 for guiding the twelve wire rods in parallel to the supply lines SL are formed on the upper surface of the feed block 62, and the upper surface of the feed block 62 is opposite to the feed block 61. A press mechanism 64 to press the feed block 62 in the direction toward the feed block 61 is attached to the feed block 62, and when it is pressed to the feed block 61 by the press mechanism 64, the twelve wire rods are nipped and held between the feed blocks 61 and 62. Besides, a feed drive mechanism 65 is attached to the wire rod feed mechanism 60, and when the wire rods are fed along the supply lines SL, in a state where the twelve wire rods are nipped and held between the pair of feed blocks 61 and 62, the twelve wire rods are supplied along the supply lines SL for the wire rods by the feed drive mechanism 65 from the illustrated original position toward an arrow C1 direction. When the supply of the wire rods is ended, the feed blocks 61 and 62 move in an arrow C2 direction and are returned to the original position. When they are returned in the arrow C2 direction, the holding of the wire rods between the feed blocks 61 and 62 is released, and while sliding on the wire rods, they are returned to the original position.

A feed amount setting mechanism 66 is attached to the feed drive mechanism 65 of the wire rod feed mechanism 60. This feed amount setting mechanism 66 sets a wire rod feed length L in the arrow C1 direction. The wire rod feed length L is equal to the length L of the first and the second straight parts 15A and 15B of the winding member 15 shown in FIG. 2, and is equal to the sum of the length L1 of the first and the second parallel straight parts 15a1 and 15b1 and the length L2 of the second and the third inclined parts 15a2, 15a3, 15b2 and 15b3.

Detailed Description of the Winding Step

FIGS. 5 to 10 show the winding step of the winding assembly 10 according to the invention in order of steps. The winding step of the winding assembly 10 will be described in detail with reference to these drawings. The respective drawings (a) of FIGS. 5 to 10 are plan views, and the respective drawings (b) are side views. Since this winding step basically repeats a first wire rod feed step S1, a first wire rod turn step S2, a second wire rod feed step S3, and a second wire rod turn step S4 in this order, the respective steps S1, S2, S3 and S4 will be described in detail.

Figure 5:
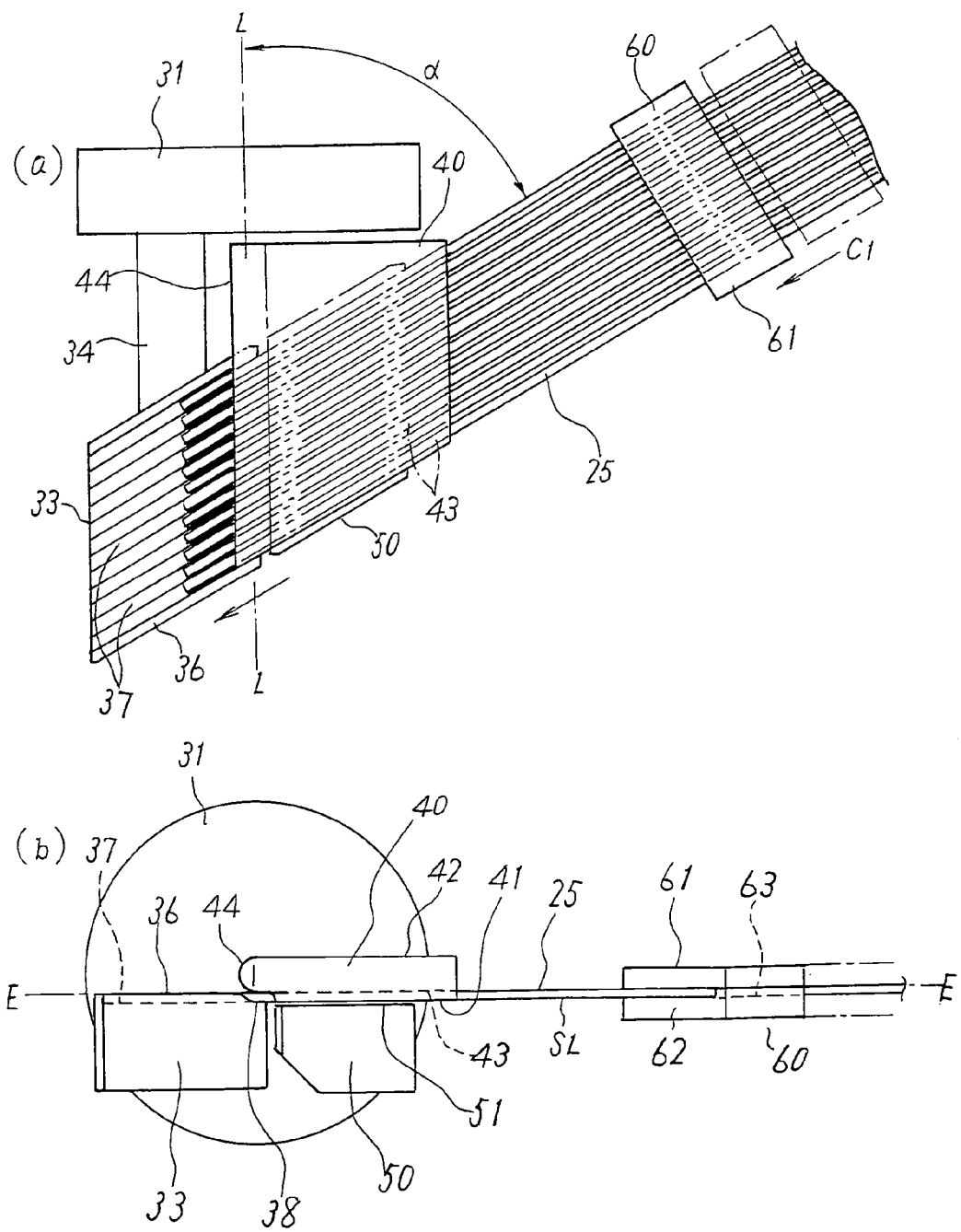
Figure 6:
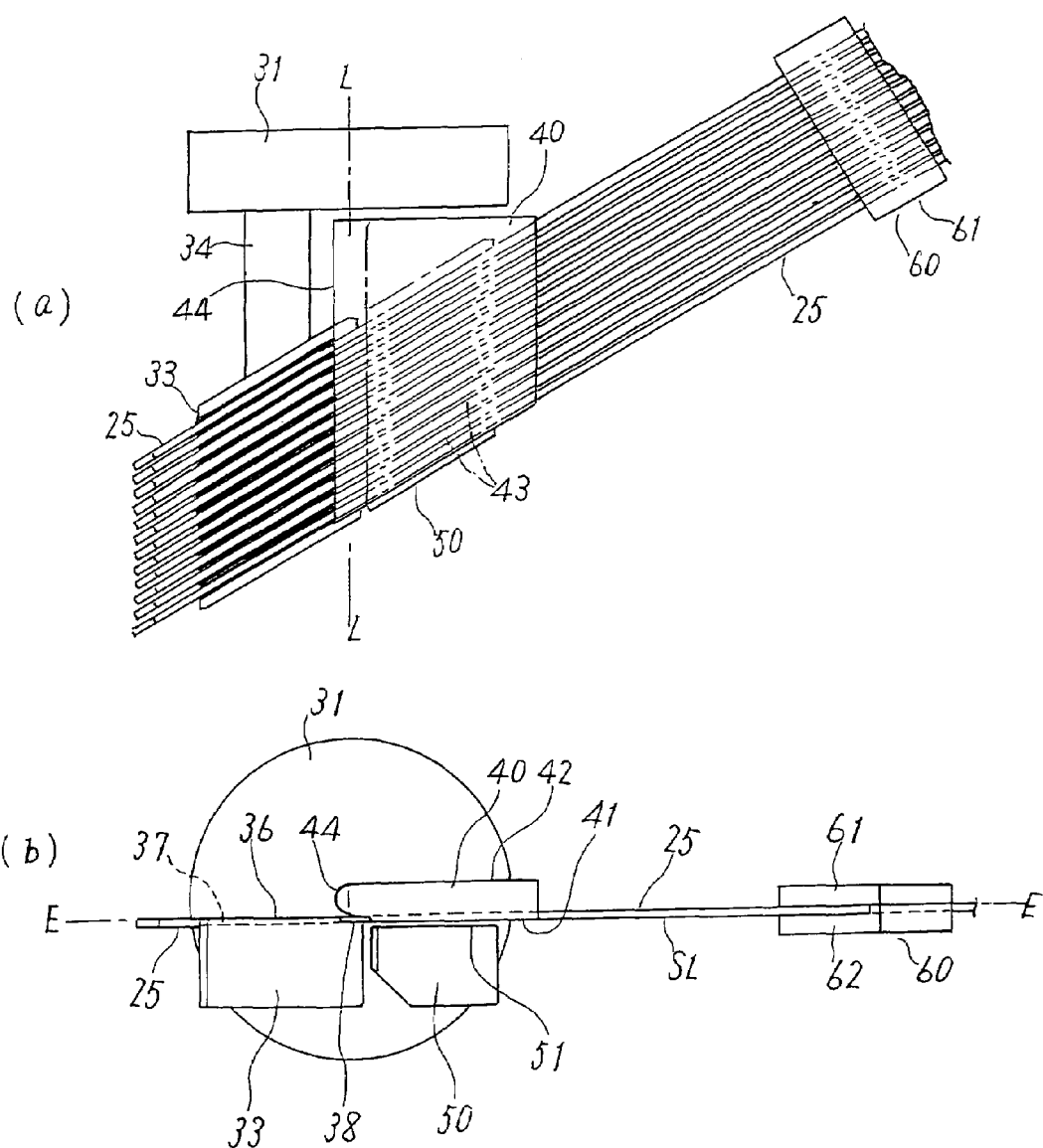

(1) Description of the First Wire Rod Feed Step S1 (See FIGS. 5 and 6)

At the first wire rod feed step S1, the length of the first straight part 15A is set for the twelve winding members 15 constituting the winding assembly 10. At this step S1, the movements of the rotator 31 and the rotation block 33 of the manufacturing apparatus 20 are stopped, and the rotation block 33 is at the original position shown in FIGS. 4(a) and 4(b). At the original position of the rotation block 33, as described before, the rotation surface 36 of the rotation block 33 is positioned on the first reference surface E-E, the first surface 41 of the fixed block 40 is positioned at the supply lines SL for the wire rods 25, the guide grooves 37 of the rotation surface 36 and the guide grooves 43 of the first surface 41 are aligned along the supply lines SL for the respective wire rods, and the twelve wire rods 25 are supplied on the supply lines by the wire rod feed mechanism 60. In this state, in the wire rod feed mechanism 60, the feed block 62 is pressed to the feed block 61 by the press mechanism 64, and the twelve wire rods 25 are nipped and held between the feed blocks 61 and 62.

In the state where the feed blocks 61 and 62 hold the wire rods 25, the wire rod feed mechanism 60 drives the feed blocks 61 and 62 along the supply lines SL for the respective wire rods in the arrow C1 direction by the feed drive mechanism 65. By the driving of the feed mechanism 60 in the arrow C1 direction, the twelve wire rods 25 are simultaneously supplied in parallel to each other by the wire rod feed length L set by the feed amount setting mechanism 66. The wire rods 25 are fed on the supply lines SL for the wire rods to the guide grooves 43 of the first surface 41 of the fixed block 40, and are further horizontally supplied to reach the guide grooves 37 of the rotation surface 36 of the rotation block 33. The twelve wire rods 25 are supplied on the respective supply lines SL with the inclination angle α with respect to the rotation axis L-L. The twelve wire rods 25 are supplied through the state of FIG. 5 to a position shown in FIGS. 6(a) and 6(b). In the state shown in FIGS. 6(a) and 6(b), the leading edge parts of the twelve wire rods 25 are fed to a position where they move forward in the left direction by the length L from the rotation axis L-L, and the length L for the first straight part 15A is set. The feeding of the wire rods 25 by the feed mechanism 60 is stopped in the state of FIGS. 6(a) and 6(b). At the end of the wire rod feed step shown in FIGS. 6(a) and 6(b), the feed block 62 of the wire rod feed mechanism 60 is separated from the feed block 61, the nipping of the wire rods 25 between the feed blocks 61 and 62 is released, and the feed blocks 61 and 62 are driven in the arrow C2 direction in this state and are returned to the original position. When the feed blocks 61 and 62 are moved in the arrow C2 direction, the nipping of the wire rods 25 between the feed blocks 61 and 62 is released, and accordingly, the feed blocks 61 and 62 are returned to the original position while sliding on the wire rods 25. Incidentally, the state shown in FIGS. 5(a) and 5(b) is the state in the middle of the transition to the state shown in FIGS. 6(a) and 6(b).

Figure 7:
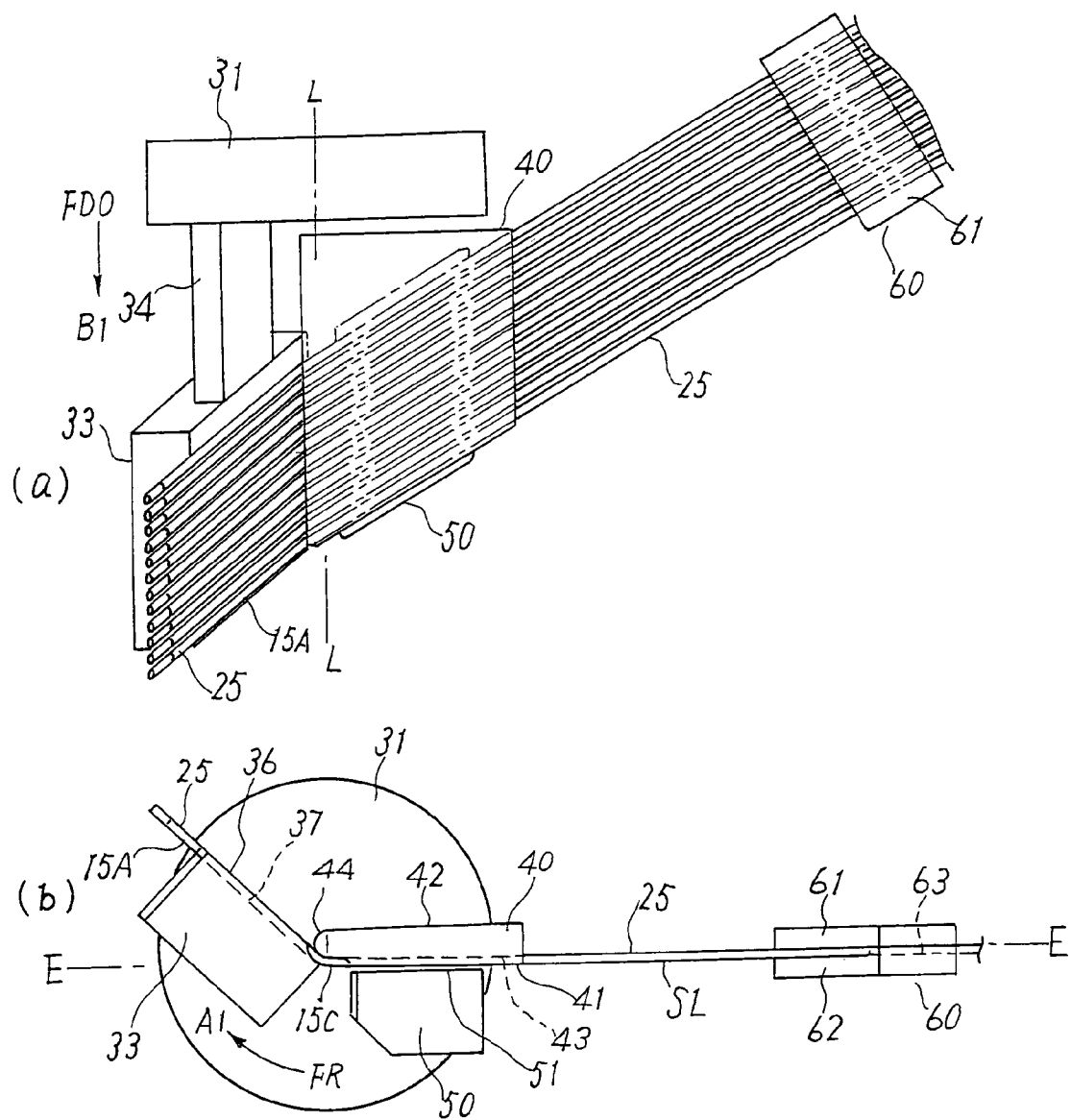
Figure 8:
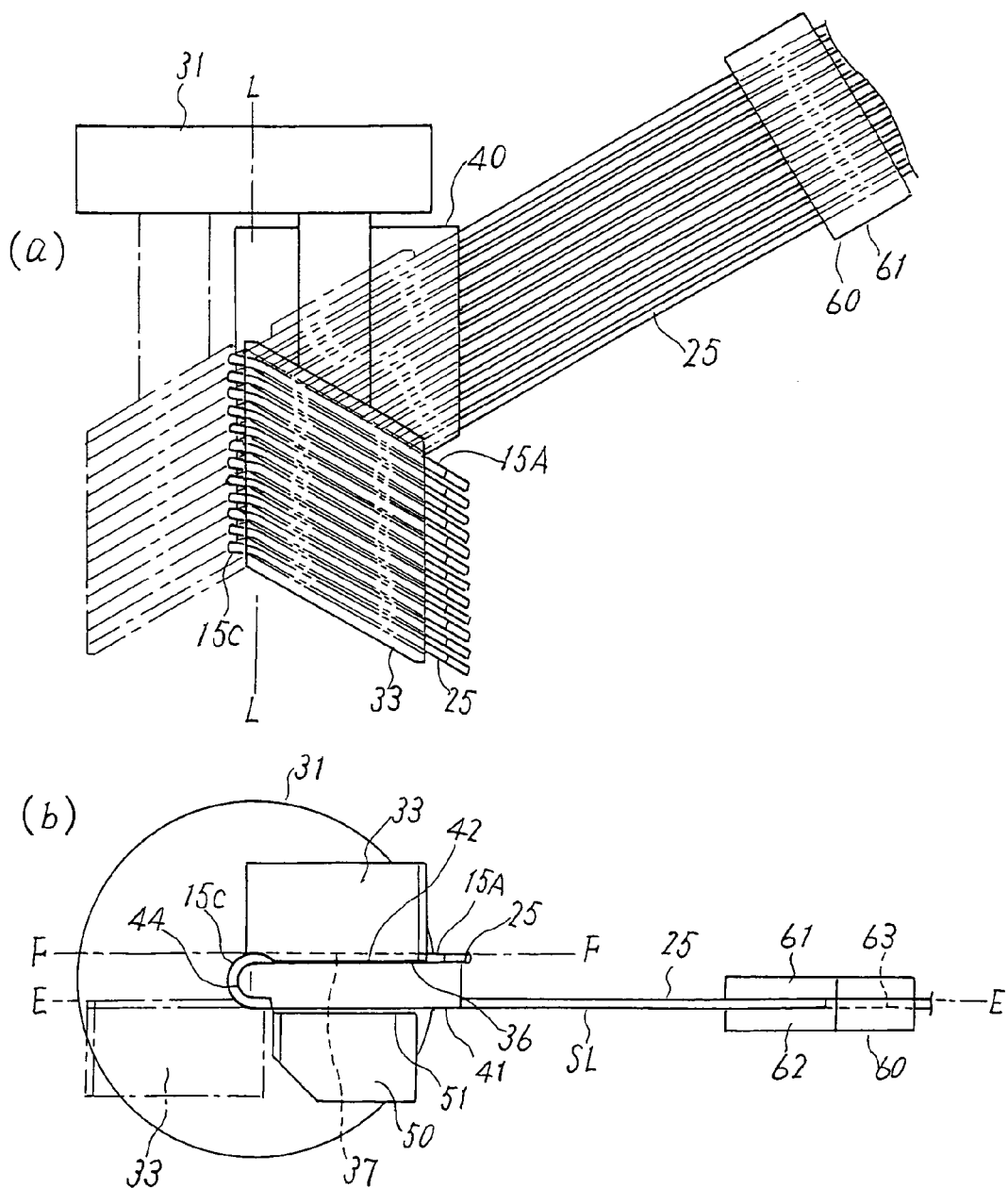
Figure 9:
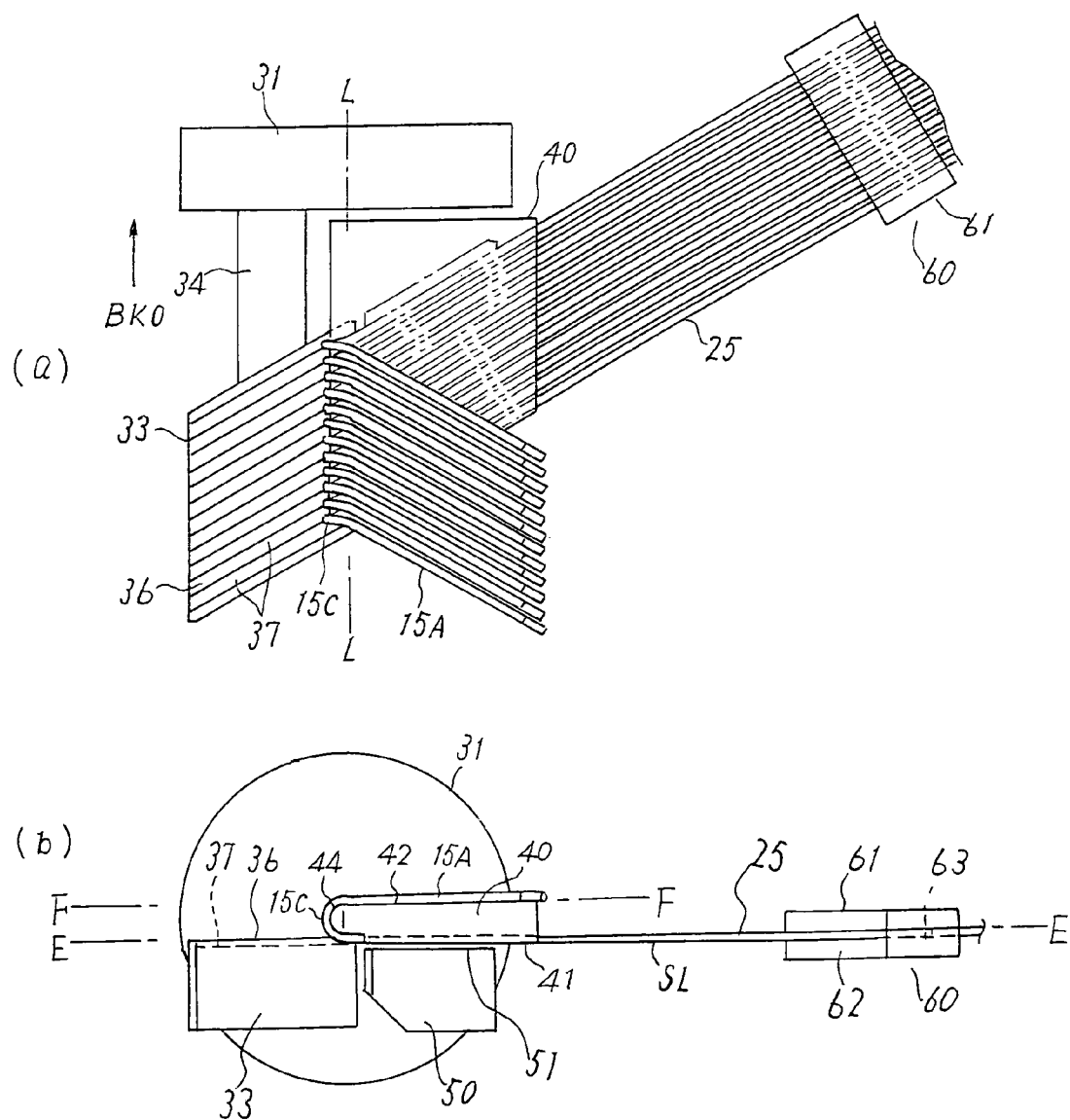

(2) Description of the First Wire Rod Turn Step S2 (See FIGS. 7 and 8)

This first wire rod turn step S2 is the step of simultaneously bending the twelve wire rods 25 subsequently to the first wire rod feed step S1, and at this first wire rod turn step S2, one first straight part 15A and one first turn part 15C continuous therewith are formed for each of the twelve wire rods 25. At this first wire rod turn step S2, the movement of the wire rod feed mechanism 60 in the directions of the arrows C1 and C2 is suspended, the feed blocks 61 and 62 are in the state where they are returned to the original position, and the respective wire rods 25 are nipped and held between the feed blocks 61 and 62.

At the initial period of the first wire rod turn step S2, the forward rotation driving FR is given to the rotator 31 and the rotation block 33, and they are rotated in the arrow A1 direction. By the forward rotation driving FR of the rotator 31 and the rotation block 33, the respective wire rods 25 on the rotation surface 36 of the rotation block 33 are bent around the rotation axis L-L along the shaping surface 44 of the fixed block 40. At the first wire rod turn step S2, as described before, since the respective wire rods 25 are nipped and held between the feed blocks 61 and 62 positioned at the original position, even by the forward rotation driving FR of the rotation block 33, the wire rods are not moved on the supply lines SL, and with the rotation of the rotation surface 36, the respective wire rods 25 are bent in the clockwise direction around the shaping surface 44. Besides, at the first wire rod turn step S2, the auxiliary block 50 prevents the wire rods 25 in the respective guide grooves 43 of the first surface 41 of the fixed block 40 from separating from the guide grooves 43 of the first surface 41 by the forward rotation driving FR of the rotation block 33. By the rotation preventing action of the auxiliary block 50 to the wire rods 25 on the first surface 41, the respective wire rods 25 on the first surface 41 are kept in the guide grooves 43 of the first surface 41, and the wire rods 25 on the rotation surface 36 are effectively bent. Incidentally, FIGS. 7(a) and 7(b) show the halfway state of the forward rotation driving FR of the rotation block 33.

FIGS. 8(a) and 8(b) show a state at the end of the forward rotation driving FR of the rotation block 33. The rotation surface 36 of the rotation block 33 becomes parallel to the second reference surface F-F according to the second surface 42 of the fixed block 40, and the respective wire rods 25 are pressed onto the second reference surface F-F. Since the shaping surface 44 of the fixed block 40 is constructed into the substantial semicircular shape with the rotation axis L-L as the center, and the forward rotation driving FR with the rotation axis L-L as the center is applied to the rotation block 33, as shown in FIGS. 8(a) and 8(b), the respective wire rods 25 are bent by substantially 180 degrees with respect to the rotation axis L-L. As a result of the forward rotation driving FR of the rotation block 33, as shown in FIGS. 8(a) and 8(b), the first straight part 15A and the first turn part 15C continuous therewith are formed for each of the wire rods 25.

At the end of the first wire rod feed step S1 shown in FIGS. 6(a) and 6(b), since the respective wire rods 25 project by the wire rod feed length L from the rotation axis L-L onto the rotation surface 36 of the rotation block 33, the first straight part 15A has the length L. Besides, the respective wire rods 25 are bent along the shaping surface 44 of the fixed block 40, the inner diameter of the first turn part 15C becomes equal to the diameter d1 of the shaping surface 43.

When the forward rotation driving FR is given to this rotation block 33, as shown in FIGS. 7(a) and 7(b), the rotation block 33 performs the slight forward movement FD0 in the arrow B1 direction by the reciprocal movement mechanism 39 along the rotation axis L-L. This slight forward movement FD0 is the movement for adjusting the shape of the first turn part 15C.

Counter rotation driving CR is given to the rotator 31 and the rotation block 33 from the end of the forward rotation driving FR shown in FIGS. 8(a) and 8(b), and they are rotated in the arrow A2 direction. By this counter rotation driving CR, the rotation block 33 is returned to the original position shown in FIGS. 9(a) and 9(b). Together with this counter rotation driving CR, the rotation block 33 performs the slight backward movement BK0 along the rotation axis L-L in the arrow B2 direction shown in FIG. 9(a). The backward movement BK0 in the arrow B2 direction is the movement to move the rotation block 33 backward by the distance equal to the slight forward movement FD0 in the arrow B1 direction. This slight backward movement BK0 is also the movement to adjust the shape of the first turn part 15C.

Figure 10:
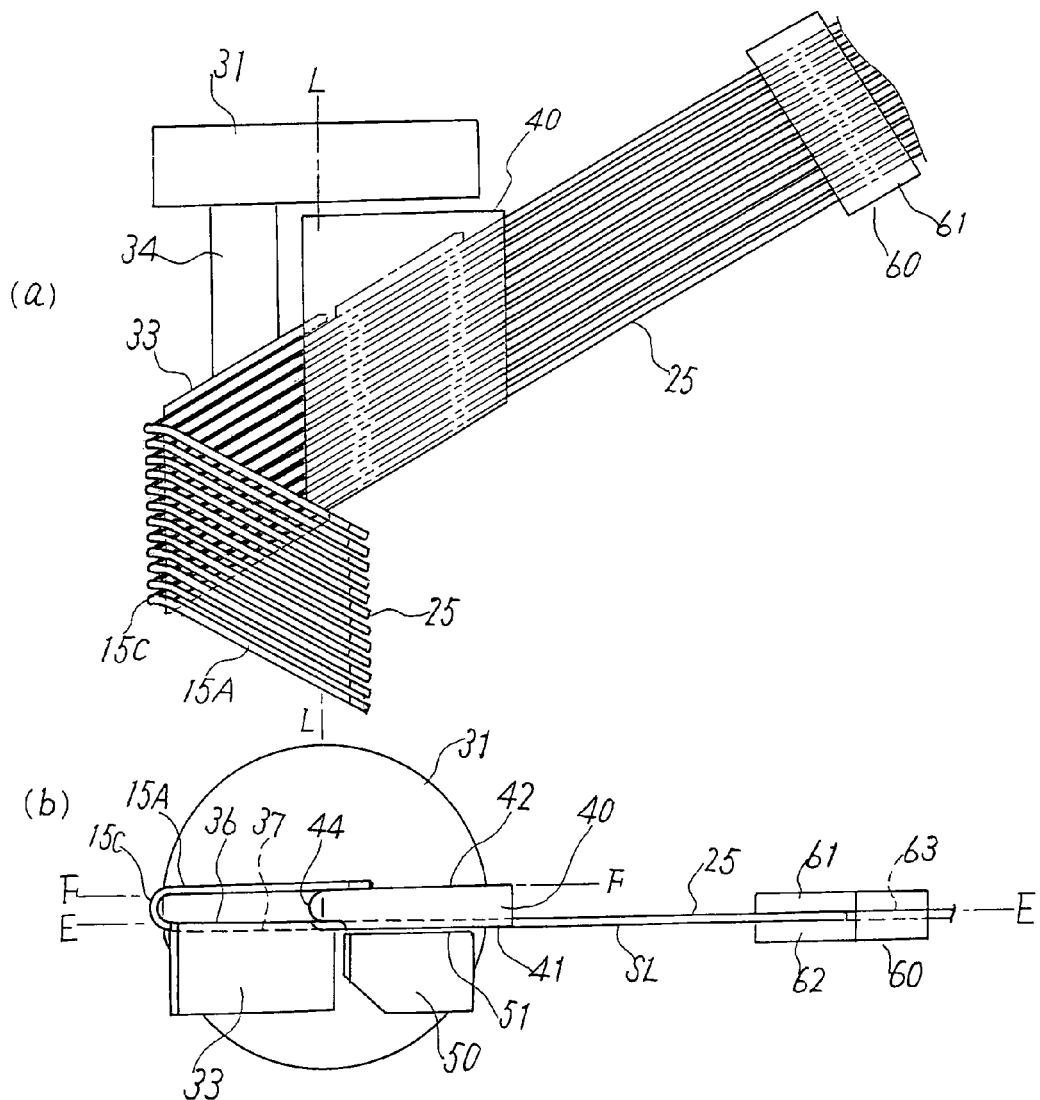

(3) Description of the Second Wire Rod Feed Step S3 (See FIG. 10)

This second wire rod feed step S3 is performed subsequently to the first wire rod turn step S2. This second wire rod step S3 is the step of setting the length L of the second straight part 15B for each of the wire rods 25, and the respective portions of the manufacturing apparatus 20 basically perform the same movement as the first wire rod feed step S1.

Also at the second wire rod feed step S3, similarly to the first wire rod feed step S1, the rotation block 33 is at the original position and is in the state where its movement is suspended, and the wire rod feed mechanism 60 performs the movement of sending the respective wire rods 25 along the respective supply lines SL. FIGS. 10(a) and 10(b) show the state in which at the second wire rod feed step S3, the respective wire rods 25 are fed from the state shown in FIGS. 9(a) and 9(b) along the supply lines SL by the length L. Also at the second wire rod feed step S3, in the state where the respective wire rods 25 are nipped and held between the feed blocks 61 and 62, after the wire rod feed mechanism 60 feeds the respective wire rods 25 in the arrow C1 direction by the wire rod feed length L set by the feed length setting mechanism 65, in the state where the nipping of the respective wire rods 25 between the feed blocks 61 and 62 is released, they are returned to the original position in the arrow C2 direction, and at this original position, the respective wire rods 25 are nipped and held between the feed blocks 61 and 62 for the next second wire rod turn step.

At the end of the second wire rod feed step S3 shown in FIGS. 10(a) and 10(b), there occurs a state in which the first turn part 15C formed at the former first wire rod turn step S2 projects from the rotation axis L-L by the wire rod feed length L, and the length L for the second straight part 15B continuous with the first turn part 15C is set on the rotation surface 36 of the rotation block 33.

(4) Description of the Second Wire Rod Turn Step S4

This second wire rod turn step S4 is the turn step of forming the second straight part 15B and the second turn part 15D, and the respective parts of the manufacturing apparatus 20 operate similarly to the first wire rod turn step S2. At this second wire rod turn step S4, similarly to the foregoing first wire rod turn step S2, the feeding of the wire rod 25 by the first wire rod feed mechanism 60 is suspended, the wire rod feed mechanism 60 is at the original position and is in the state where the respective wire rods 25 are held between the feed blocks 61 and 62. Similarly to the first wire rod turn step S2, the rotator 31 and the rotation block 33 are rotated until the rotation surface 36 of the rotation block 33 becomes substantially parallel to the second reference surface F-F by the forward rotation driving FR, and the second straight part 15B and the second turn part 15D continuous therewith are formed. The rotation block 33 is given the counter rotation driving CR after the forward rotation driving FR, and is returned to the original position. When the forward rotation driving FR is given, the rotation block 33 performs the slight forward movement FD0 along the rotation axis L-L in the arrow B1 direction by the reciprocal movement mechanism 39, and when the counter rotation driving CR is given, it performs the slight backward movement BK0 along the rotation axis L-L, and adjusts the shape of the second turn part 15D.

At the end of the second wire rod feed step S3 shown in FIGS. 10(a) and 10(b), since the first turn part 15C of each of the wire rods 25 projects by the wire rod length L from the rotation axis L-L onto the rotation surface 36 of the rotation block 33, the second straight part 15B formed at the second wire rod turn step has the length L. Besides, since the respective wire rods 25 are bent along the shaping surface 44 of the fixed block 40, the inner diameter of the second turn part 15D becomes equal to the diameter d1 of the shaping surface 44.

Figure 11:
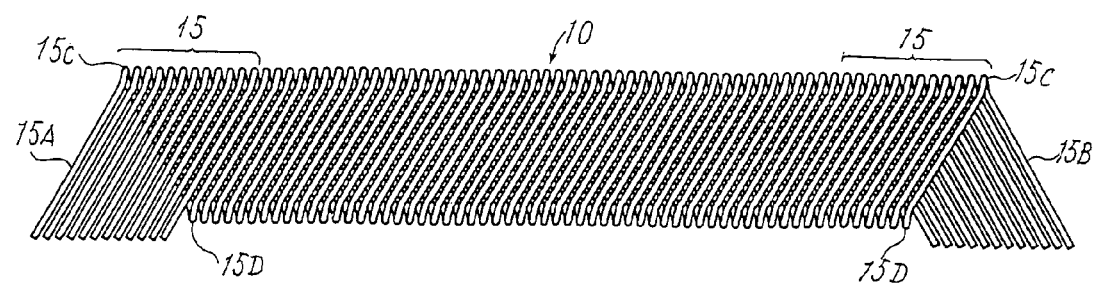
FIG. 11 is a front view showing the winding assembly manufactured in the winding step of embodiment 1.
Figure 12:
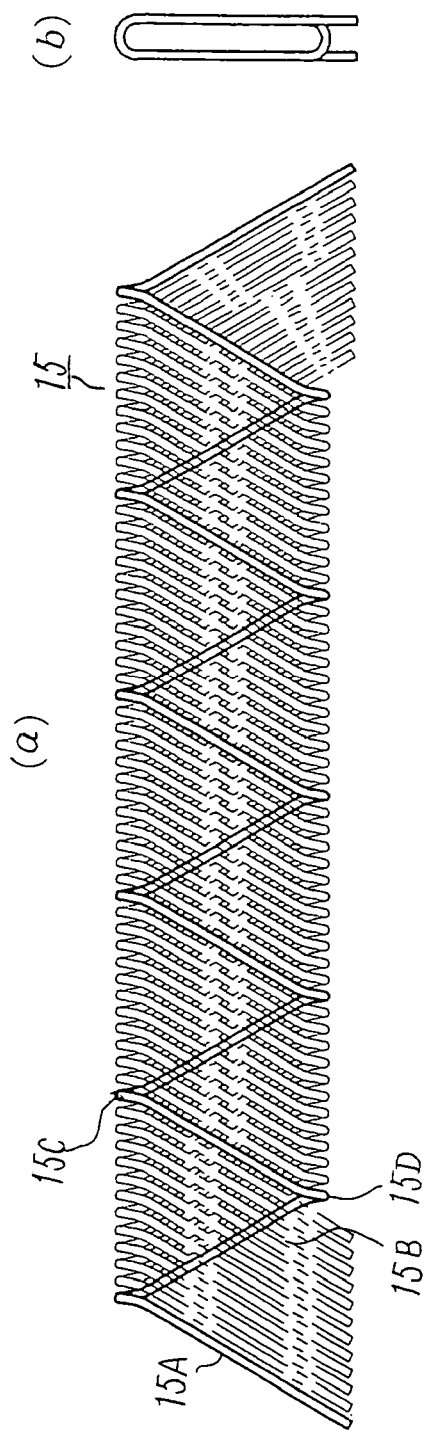

The above first wire rod feed step S1, the first wire rod turn step S2, the second wire rod feed step S3, and the second wire rod turn step S4 are repeated in this order, so that while the first straight part 15A, the first turn part 15C, the second straight part 15B and the second turn part 15D are sequentially formed for the twelve wire rods 25 simultaneously, winding of the winding assembly 10 having a necessary number of turns can be performed. FIG. 11 shows the winding assembly 10 at the end point of the above winding step.

As described above, at the winding step of the winding assembly 10 of embodiment 1, a plate-like winding core as in the prior art is not used, and the length L of the first and the second straight parts 15A and 15B of each of the winding members 15 can be set by the feed length L of the wire rod 25 at the first and the second wire rod feed steps, and accordingly, the change and adjustment of the length L of the first and the second straight parts 15A and 15B can be easily performed.

Besides, the rotation block 33 includes the rotation surface 36 rotatable around the rotation axis L-L, the fixed block 40 includes the first surface 41 and the second surface 42 opposite to each other, and includes the shaping surface 44 between the end parts of the first surface 41 and the second surface 42, and the shaping surface 44 is made to have the substantial semicircular shape with the rotation axis L-L as the center and is extended along the rotation axis L-L. Thus, more wire rods can be simultaneously supplied and can be bent. For example, in the case where the winding assembly 10 including twelve wire rods 25 is manufactured, the twelve wire rods 25 can be simultaneously supplied and bent, and, a weaving step as in the prior invention can be completely made unnecessary. Besides, for example, in the case where the winding assembly 10 including twelve wire rods is manufactured, when six wire rods 25 are simultaneously supplied and bent, the winding assembly 10 including the twelve winding members 15 can be constructed by weaving the winding assemblies each including the six wire rods 25 only once, and the number of times of weaving can be decreased. In any event, the weaving step is made unnecessary, or the number of times of weaving is decreased, so that the work efficiency of the winding step can be improved.

Besides, since the supply lines SL of the wire rods are inclined by the inclination angle α with respect to the rotation axis L-L, at the first and the second wire rod turn steps S2 and S4, the respective wire rods 25 are bent substantially by 180 degrees with respect to the rotation axis L-L as shown in, for example, FIGS. 8(*a*) and 8(*b*), and at the same time as this bending, the respective wire rods 25 are consequently fed in the direction of moving away from the rotator 31 along the rotation axis L-L. Thus, in embodiment 1, since a push-out member as in the prior invention to push out the bent wire rod 25 becomes unnecessary, the manufacturing apparatus 20 can be simplified, and in addition, since the push-out step by the push-out member also becomes unnecessary, the work efficiency of the winding step can be improved.

Description of the Displacement Step

Figure 13:
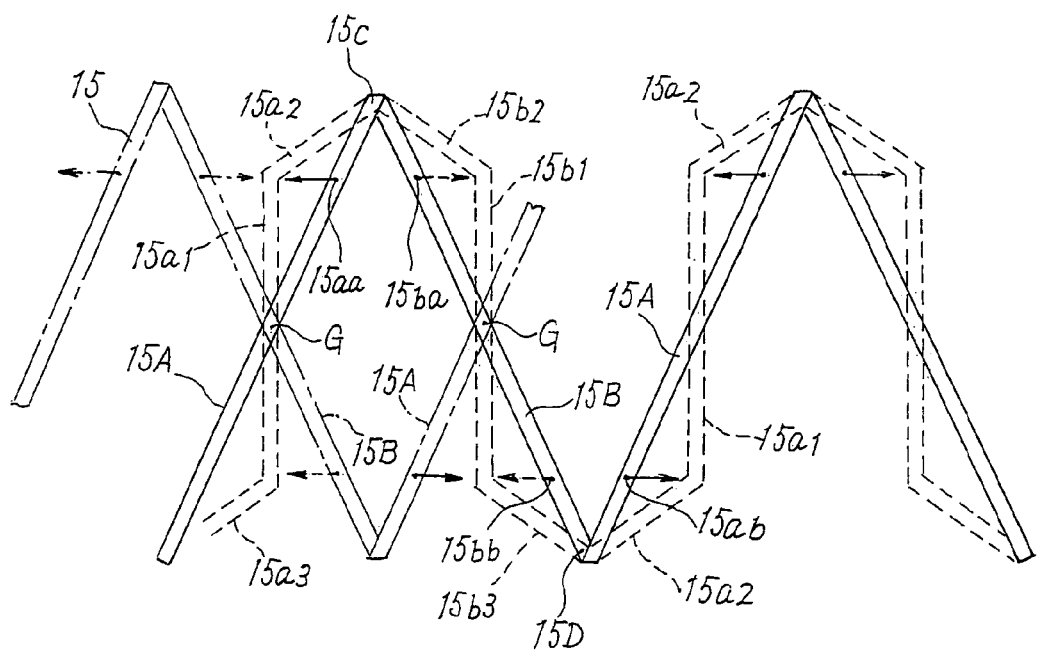
FIG. 13 and FIG. 14 are explanatory views of a displacement step in embodiment 1.

Next, the displacement step carried out subsequently to the winding step will be described. In this displacement step, each of the six winding combinations 12 is deformed into the hexagonal pattern shape shown in FIG. 1 and FIG. 3, and the two winding members 151 and 152 constituting each of the winding combinations 12 are mutually overlapped as shown in FIG. 3. As shown in FIG. 13, in the winding assembly 10, the two winding members 151 and 152 have such relation that just at the middle of each of the first straight parts 15A of the one winding member 151, each of the second straight parts 15B of the other winding member 152 crosses. The winding assembly 10 shown in FIG. 11 includes six pairs each including two winding members having the relation as shown in FIG. 13, and the six pairs of the winding members are simultaneously deformed at the displacement step.

Figure 14:
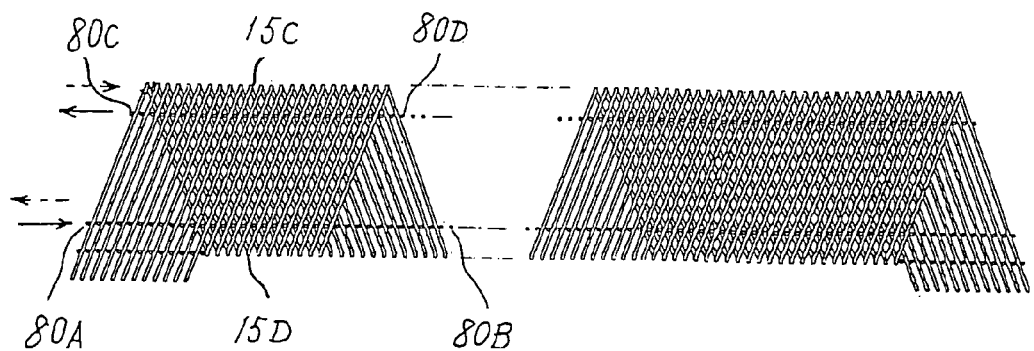
Figure 15:
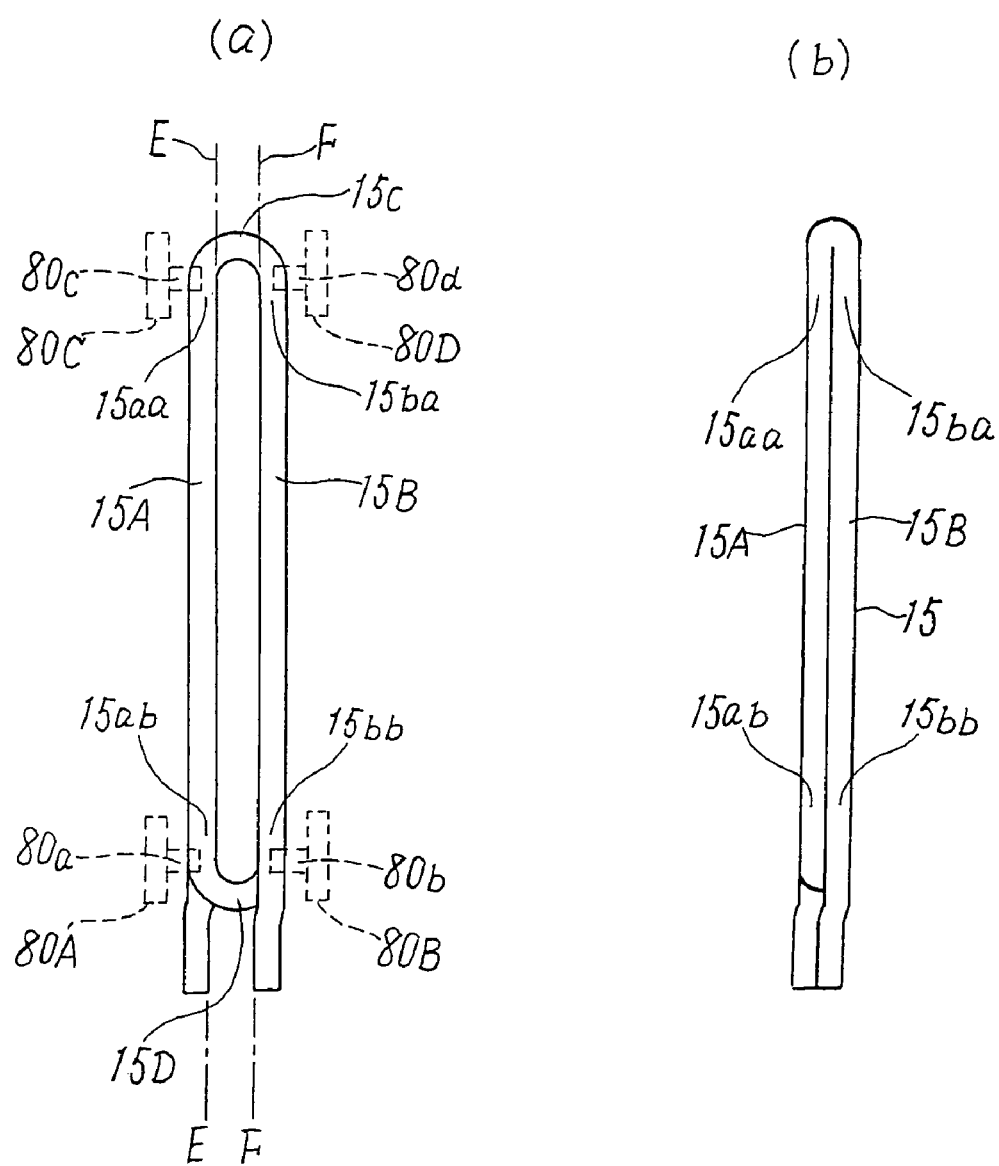

In this displacement step, as shown in FIG. 14, four movable members 80A, 80B, 80C and 80D having plural pins are used. The movable members 80A and 80B are disposed at the lower end part of the winding assembly 10, and the movable members 80C and 80D are disposed at the upper end part of the winding assembly 10. FIGS. 15(*a*) and 15(*b*) are side views of the winding assembly 10, each of the first straight part 15A is positioned on the first reference surface E-E, and each of the second straight parts 15B is positioned on the second reference surface F-F. The movable member 80A is disposed at the lower end part of the winding assembly 10 on the first reference surface E-E side, and the movable member 80B is disposed at the lower end side thereof on the second reference surface F-F side. The movable member 80C is disposed at the upper end part of the winding assembly 10 on the first reference surface E-E side, and the movable member 80D is disposed at the upper end part thereof on the second reference surface F-F side.

The movable member 80A includes plural pins 80*a* to simultaneously move lower end parts 15*ab* of the first straight parts 15A of the respective winding members 151 and 152 in the right direction, and the movable member 80B includes plural pins 80*b* to simultaneously move lower ends 15*bb* of the second straight parts 15B of the respective winding members 15 in the left direction. Besides, the movable member 80C includes plural pins 80*c* to simultaneously move upper end parts 15*aa* of the first straight parts 15A of the respective winding members 15 in the left direction, and the movable member 80D includes plural pins 80*d* to simultaneously move upper end parts 15*ba* of the second straight parts 15B of the respective winding members 15 in the right direction.

FIGS. 13 and 14 show the movement of these movable members 80A to 80D. In these drawings, the movable member 80A is moved in the right direction, and the lower end parts 15*ab* of the respective first straight parts 15A are moved toward the right by the respective pins 80*a*. The movable member 80B is moved in the left direction opposite to the direction of the movable member 80A, and the lower end parts 15*bb* of the respective second straight parts 15B are moved toward the left by the respective pins 80*b*. Besides, the movable member 80C is moved in the left direction, and the upper end parts 15*aa* of the respective first straight parts 15A are moved toward the left by the respective pins 80*c*. The movable member 80D is moved in the right direction opposite to the direction of the movable member 80C, and the upper end parts 15*ba* of the respective second straight parts 15B are moved to the right by the respective pins 80*d*. As a result of the movements of these movable members 80A to 80D, each of the winding members 151 is deformed from a state shown by a solid line of FIG. 13 to a state shown by a dotted line, and the winding member 152 indicated by an alternate long and short dash line is also similarly deformed.

As is apparent from FIG. 13, with respect to each of the first straight parts 15A positioned on the first plane E-E, its upper end part 15*aa* is moved to the left, and its lower end part 15*ab* is moved to the right, and consequently, it has the first parallel straight part 15*a*1, and the inclined parts 15*a*2 and 15*a*3. Besides, with respect to each of the second straight parts 15B positioned on the second plane F-F, its upper part 15*ba* is moved to the right, and its lower end part 15*bb* is moved to the left, and consequently, it has the second parallel straight part 15*b*1 and the inclined parts 15*b*2 and 15*b*3.

Next, in FIG. 13, attention is paid to the relation between the winding member 151 indicated by the solid line and the winding member 152 indicated by the alternate long and short dash line. Before the displacement step, the first straight part 15A of this winding member 152 crosses the second straight part 15B of the winding member 151 indicated by the solid line at the middle point G in the length direction, and after the movement of the movable members 80A to 80D, it is eventually overlaps on the second parallel straight part 15b1 indicated by the dotted line. Similarly, the second straight part 15B of the winding member 152 indicated by the alternate long and short dash line crosses the first straight part 15A of the winding member 151 indicated by the solid line at the middle point G, and as a result of the movements of the movable members 80A to 80D, it eventually overlaps under the lower portion of the first parallel straight part 15a1 indicated by the dotted line. In this way, at the displacement step, as shown in FIG. 3, the parallel straight parts 15a1 and 15b1 of the two winding members overlap with each other, and the winding combination 12 is formed.

Description of the Press Step

The press step is carried out subsequently to the displacement step. At this press step, the winding assembly 10 in the state where the displacement step is ended is pressed so that the first plane E-E where the respective first straight parts 15A are positioned and the second plane F-F where the respective second straight parts 15B are positioned approach each other.

This press step is shown in FIG. 15(b). FIG. 15(a) is a side view of the winding assembly 10 after the displacement step is ended, and the first plane E-E where the first straight parts 15A of the respective winding members 15 are positioned and the second plane F-F where the respective second straight parts 15B are positioned are in parallel to each other and are spaced each other. At the press step, as shown in FIG. 15(b), at least one of the first straight part 15A and the second straight part 15B is pressed to the other so that the inside surfaces of the respective straight parts 15A and 15B are positioned on almost the same plane.

Description of the Insertion Step

The insertion step of inserting the winding assembly 10 into slots of a stator iron core of a rotating electrical machine is carried out after the press step. The stator iron core is constructed to be developed into a flat plate shape, and plural slots are formed on its one surface at predetermined intervals. In the winding assembly 10, the parallel straight parts 15a1 and 15b1 of each of the winding combination bodies 12 overlapping with each other are inserted into one slot, the parallel straight part 15a1 is positioned at the inner layer of the slot, and the parallel straight part 15b1 is positioned at the outer layer of the slot. Different parallel straight parts 15b1 and 15a1 of the same winding combination 12 overlapping with each other are inserted into a different slot spaced apart from this slot by N pieces. In this different slot, they are inserted so that the parallel straight part 15b1 is positioned at the inner layer, and the parallel straight part 15a1 is positioned at the outer layer.

After all the winding combinations 12 are similarly inserted into the respective slots, the stator iron core is bent into a cylindrical shape so that the respective slots are positioned at the inner periphery, both the ends are joined to each other, and further, inner wire connection necessary for the winding assembly 10 is performed, and a joining step of joining end parts of the necessary winding members 15 is carried out, so that the stator is completed.

As described above, after the winding step, the first parallel straight parts 15a1 are formed at the respective first straight parts 15A by the displacement step, and the second parallel straight parts are formed at the respective second straight parts 15B, so that they can be easily inserted into the slots in the state where these parallel straight parts 15a1 and 15b1 are parallel to each other.

Besides, at the displacement step, since the two winding members are overlapped with each other while the up and down overlap relation of the first parallel straight part 15a1 and the second parallel straight part 15b1 is changed, the electrical characteristics of the two winding members in the slots can be made uniform. Especially in a predetermined slot, the first parallel straight part 15a1 of the first winding member is positioned at the first layer, and the second parallel straight part 15b1 of the second winding member is positioned at the second layer, and further, at a slot spaced apart from the predetermined slot by a predetermined number, the first parallel straight part 15a1 of the first winding member is positioned at the second layer, and the second parallel straight part 15b1 is positioned at the first layer, and the position is changed at each turn, and accordingly, the electrical characteristics can be made more uniform.

Besides, after the winding assembly 10 is inserted into the iron core, the end parts of the respective winding members are joined to each other, the insertion operation can be easily performed, and the wire connection of the winding assembly can be easily performed after the insertion.

Besides, since the press step of causing the first plane E-E where the respective first straight parts 15A of the plural winding members 15 are positioned to approach the second plane F-F where the respective second straight parts 15B are positioned is performed, it becomes easy to cause the first winding member to approach the second winding member in the slot.

Embodiment 2

Next, embodiment 2 of a manufacture method for a winding assembly of a rotating electrical machine according to this invention will be described with reference to FIGS. 16 to 20.

According to this embodiment 2, a winding step includes a lead wire formation step SLW of forming a lead wire 17a at a set position for a winding member selected from plural winding members wound. This lead wire formation step SLW is carried out by a lead wire preparation step SLP carried out subsequently to an nth first or second wire rod feed step S1 or S3 (n is an arbitrary natural number) and by an nth first or second wire rod turn step S2 or S4 subsequent to this lead wire preparation step SLP. The first or second wire rod turn step S2 or S4 subsequent to this lead wire preparation step SLP is called a lead wire additional formation turn step STL. At the lead wire additional formation turn step STL, the lead wire 17a is formed in addition to a first straight part 15A and a first turn part 15C, and besides, the lead wire 17a is formed in addition to a second straight part 15B and a second turn part 15D. The winding step except this lead wire formation step SLW, and a displacement step, a press step and an insertion step subsequent thereto are equal to those of embodiment 1.

In this embodiment 2, for the lead wire formation step SLW, a retract movement operation MS to retract the auxiliary block 50 to the wire rod feed mechanism 60 side, a cutting mechanism 70 for cutting the selected wire rod in the vicinity of the wire rod feed mechanism 60, and an avoidance return operation AR to return the rotation block 33 to the original position while avoiding the wire rod 25 and the lead wire 17a are introduced into the manufacturing apparatus 20 described in embodiment 1. The other structure of the manufacturing apparatus 20 and the movements of the respective parts are equal to those of embodiment 1.

Figure 16:
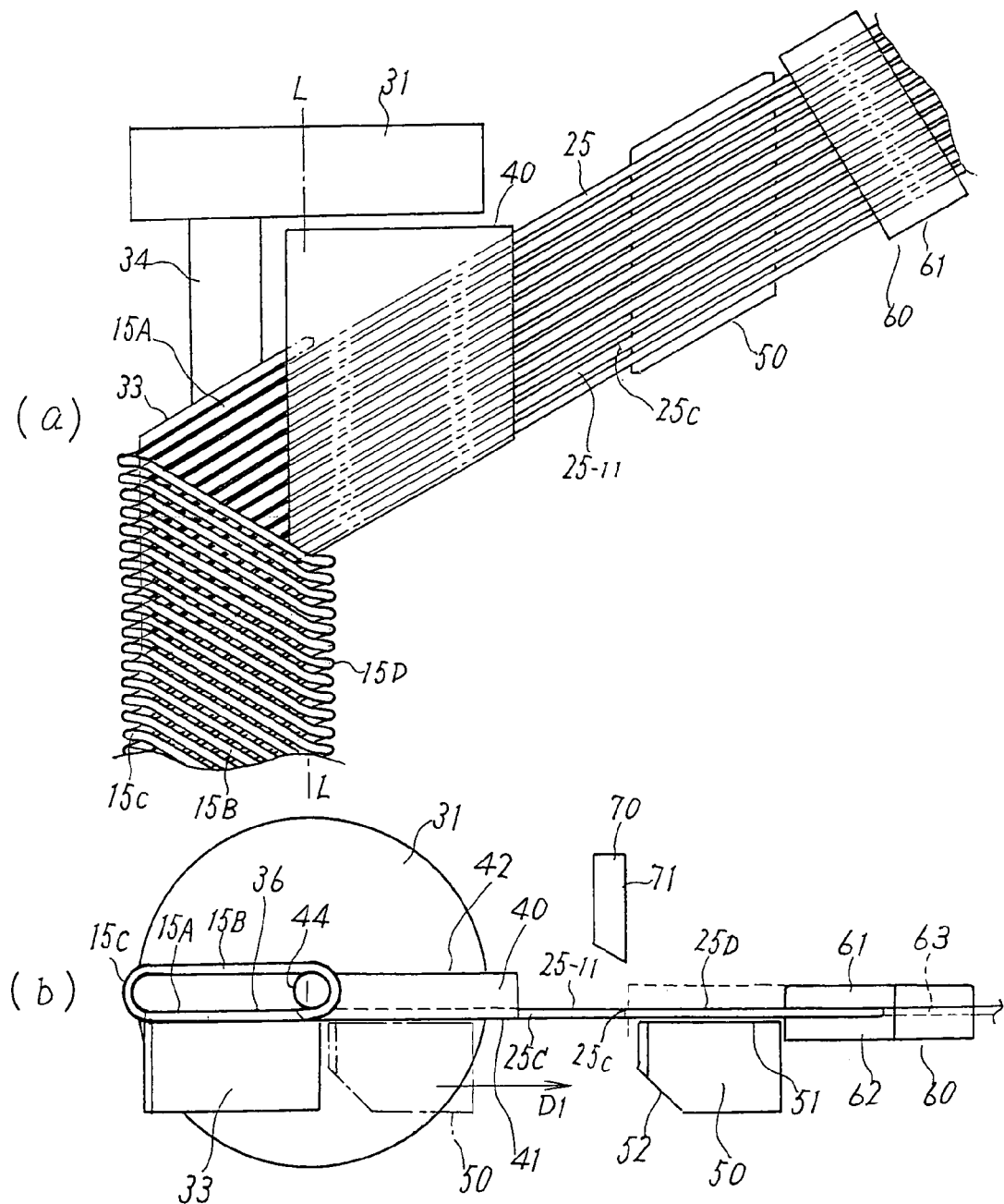

The lead wire preparation step SLP in the lead wire formation step SLW is shown in FIGS. 16(*a*) and 16(*b*). At this lead wire preparation step SLP, a cut operation by the cutting mechanism 70 and the retract movement operation MS of the auxiliary block 50 are performed. First, the cutting operation by the cutting mechanism 70 will be described.

At the end of the nth first wire rod feed step S1 or second wire rod feed step S3, the feed blocks 61 and 62 of the wire rod feed mechanism 60 are at the advance position where the respective wire rods 25 are nipped between the feed blocks 61 and 62, and are fed from the first surface 41 of the fixed block 40 onto the rotation surface 36 of the rotation block 33 along the respective supply lines SL, and the advance position of this wire rod feed mechanism 60 is indicated by a dotted line in FIG. 16(*b*). A cutter 71 of the cutting mechanism 70 is disposed above the advance position of the wire rod feed mechanism 60. In the state where the wire rod feed mechanism 60 is at the advance position and the respective wire rods 25 are nipped and held, this cutting mechanism 70 lowers the cutter 71 from above the front end toward the supply lines SL of the wire rods, and cuts a wire rod 25-11 selected from the plural wire rods 25 at a cut place 25*c*. This wire rod 25-11 is the eleventh wire rod among the twelve wire rods 25 when counted from the rotator 31 side. In this wire rod 25-11, at the left side of the cut place 25*c*, there is a wire rod portion 25C extending from the cut place 25*c* on the supply line SL to a portion slightly below the rotation axis L-L, and at the right side of the cut place 25*c*, there is a wire rod portion 25D extending from the cut place 25*c* through the wire rod feed mechanism 60. In this embodiment 2, the wire rod portion 25C becomes the lead wire 17*a*.

At the lead wire preparation step SLP, the retract movement operation MS of the auxiliary block 50 is performed subsequently to the cut operation by the cutting mechanism 70. The retract movement operation MS of the auxiliary block 50 is carried out in a state where the wire rod feed mechanism 60 releases the holding operation of the respective wire rods 25, and is returned to the original position indicated by the solid line in FIGS. 16(*a*) and 16(*b*). The retract movement operation MS of this auxiliary block 50 is performed in order to prevent that the rotation of the lead wire 17*a* is hindered by the auxiliary block 50 before the forward rotation operation FR is given to the rotation block 33 at the nth first wire rod turn step S1 or second wire rod turn step S3 subsequent to the lead wire formation preparation step. By the retract movement operation MS, the auxiliary block 50 performs the retract operation in an arrow D1 direction from the original position indicated by an alternate long and short dash line in FIG. 16(*b*) to the retract position adjacent to the wire rod feed mechanism 60 returned to the original position. At this retract position, the auxiliary block 50 is positioned at the right side of the cut place 25*c* as indicated by the solid line in FIG. 16(*b*), and it does not prevent the wire rod portion 25C from rotating in the clockwise direction in accordance with the forward rotation driving FR.

Figure 17:
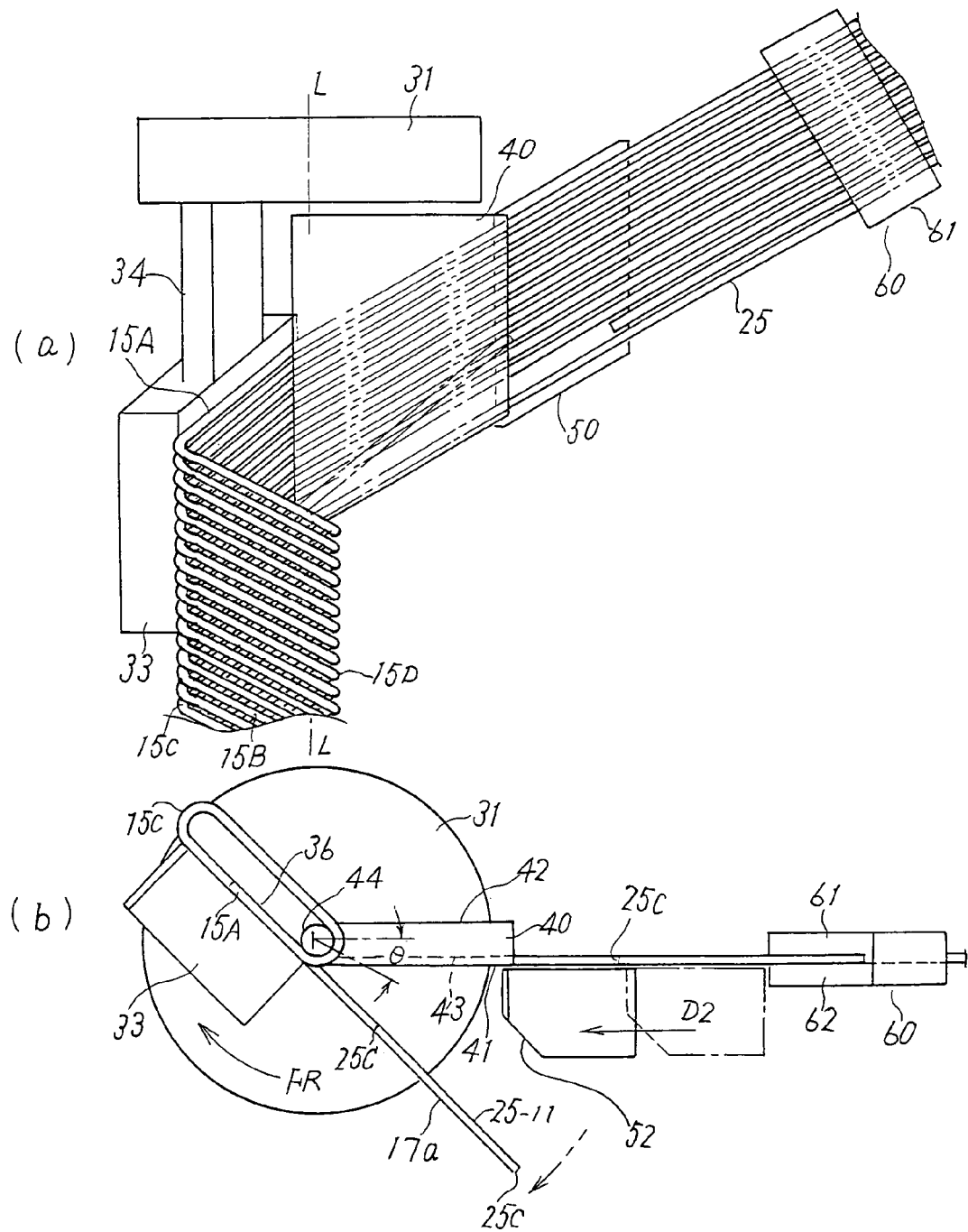

Subsequently to the lead wire preparation step SLP, a lead wire additional formation turn step STL shown in FIGS. 17(*a*) and 17(*b*) and FIGS. 18(*a*) and 18(*b*) is carried out. In FIGS. 17(*a*) and 17(*b*), the forward rotation driving FR is given to the rotator 31 and the rotation block 33. Since the wire rod portion 25C positioned at the left side of the cut place 25*c* is cut at the cut place 25*c*, it is rotated in the clockwise direction in accordance with the forward rotation driving FR of the rotation block 33 as shown in FIGS. 17(*a*) and 17(*b*). However, all the other wire rods 25 having no cut place 25*c* are nipped and held between the feed blocks 61 and 62 of the wire rod feed mechanism 60 and are not rotated.

In FIGS. 17(*a*) and 17(*b*), when the wire rod portion 25C is rotated by a predetermined angle θ, and there is eliminated a fear that the auxiliary block 50 hinders the rotation of the wire rod portion 25C, the auxiliary block 50 is quickly moved from the retract position indicated by the alternate long and short dash line toward the arrow D2 direction, and is quickly returned to the original position. At the original position, the auxiliary block 50 retains the wire rods 25 in the guide grooves 43 of the first surface 41 of the fixed block 40 into the guide grooves 43, and hinders the wire rods 25 on the first surface 41, together with the rotation block 33, from rotating in the clockwise direction. As a result that the rotation of the wire rods 25 on the first surface 41 is hindered by the auxiliary block 50, the wire rods 25 on the rotation surface 36 are efficiently bent along the shaping surface 44. In order to quickly secure this efficient bending operation, in the state where the wire rod portion 25C has been rotated by the predetermined angle θ, the auxiliary block 50 is quickly returned to the original position.

An inclined surface 52 is formed on the auxiliary block 50. This inclined surface 52 is formed by obliquely cutting the lower corner of the auxiliary block 50 at the rotation axis L-L side, and in FIG. 17(*b*), when the auxiliary block 50 is quickly returned to the original position in the arrow D2 direction, it faces the lead wire 17*a* rotated. This inclined surface 52 prevents that the auxiliary block 50 quickly returned to the original position collides with the lead wire 17*a*.

Figure 18:
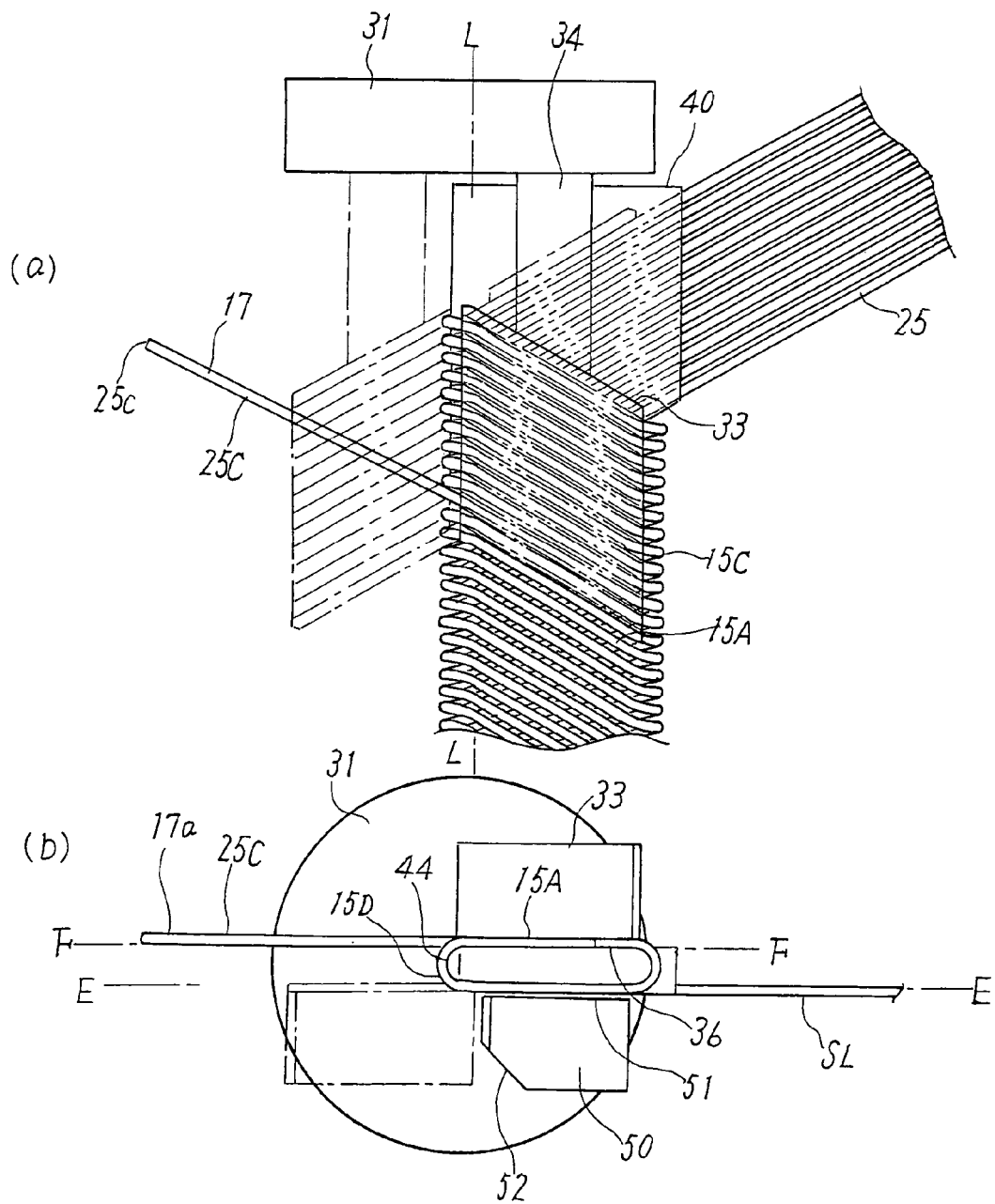

FIGS. 18(*a*) and 18(*b*) shows the end of the forward rotation driving FR of the rotation block 33 in the lead wire additional formation turn step STL. In the state shown in FIGS. 18(*a*) and 18(*b*), as described in embodiment 1, the rotation block 33 is positioned on the second reference surface F-F including the second surface 42 of the fixed block 40, and on this second reference surface F-F, the first straight part 15A or the second straight part 15B is formed for each of the wire rods 25, the first turn part 15C or the second turn part 15D is formed along the shaping surface 44, and the wire rod portion 25C also extends almost horizontally on the second reference surface F-F to become the lead wire 17*a*.

In preparation for the next wire rod feed step S1 or S3, the rotation block 33 is returned from the state shown in FIGS. 18(*a*) and 18(*b*) to the original position. In embodiment 2, at the return of the rotation block 33, the avoidance return operation AR to return the rotation block 33 while avoiding the wire rod 25 and the lead wire 17*a* is given. In this avoidance return operation AR, a next first upward movement UP1, a backward movement BK, a counter rotation movement CR, a downward movement DN, a forward movement FD, and a second upward movement UP2 are given to the rotation block 33 in this order. The respective movements are effective in returning the rotation block 33 to the original position while avoiding the lead wire 17*a*. Incidentally, the respective movements are movements to move not only the rotation block 33 but also the whole of the rotation portion, together with the rotator 31 and the coupling body 34.

Figure 19:
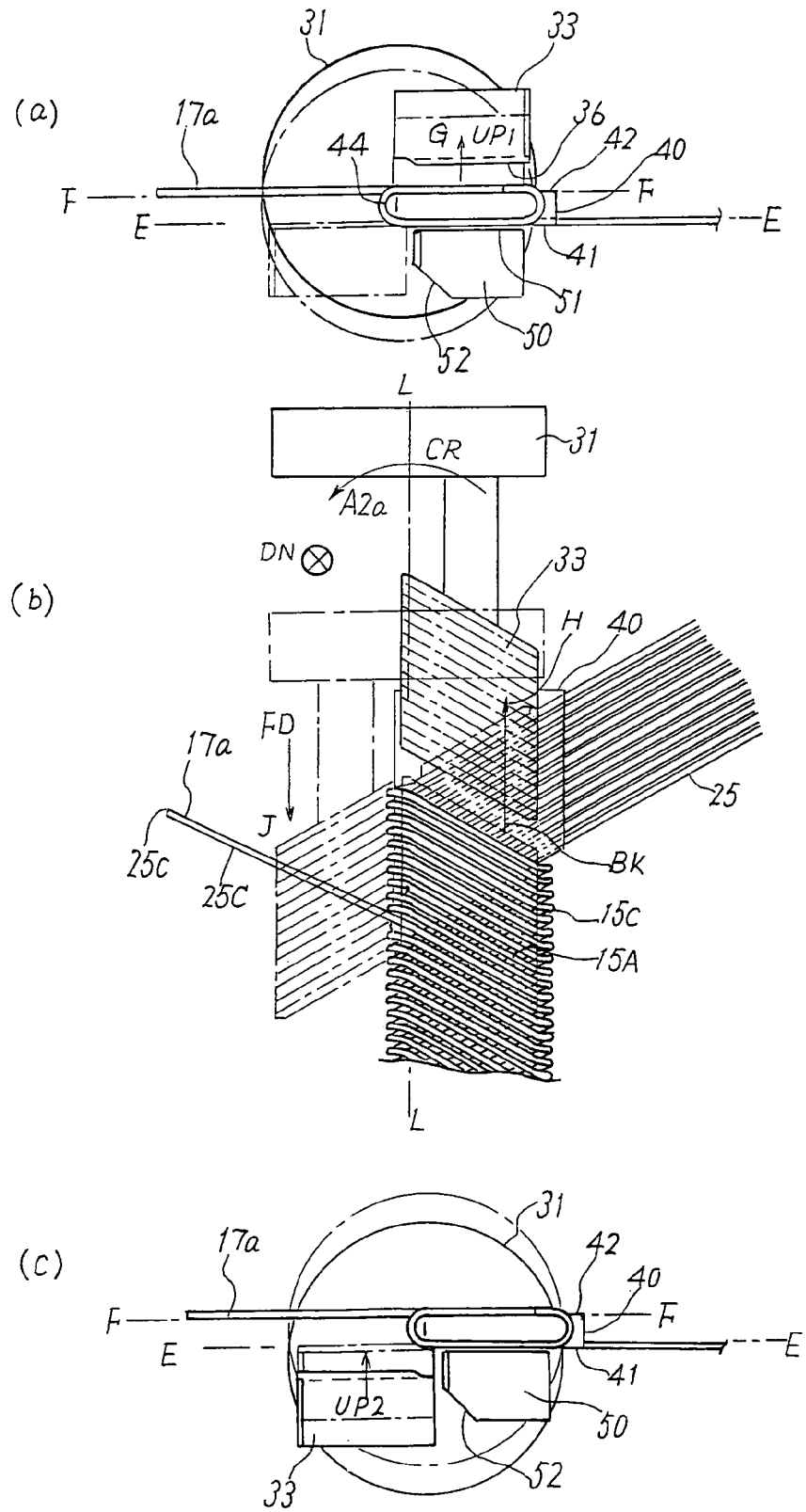

FIGS. 19(*a*), 19(*b*) and 19(*c*) show the respective movements. First, FIG. 19(*a*) shows the first upward movement UP1 for the rotation portion including the rotation block 33.

This first upward movement UP1 raises, in an arrow G direction orthogonal to the rotation axis L-L, the second surface 42 of the fixed block 40, that is, the rotation block 33 existing on the second reference surface F-F so as to separate it from the second surface 42. By this first upward movement UP1, the rotation surface 36 of the rotation block 33 moves above the second reference surface F-F. By this first upward movement UP1, the rotation surface 36 of the rotation block 33 rises from the second reference surface F-F in a state where the wire rods 25 fitted in the guide grooves 37 of the rotation surface 36 are made to remain on the second reference surface F-F, and the rotation block 33 is placed in a free state with respect to the respective wire rods 25.

In FIG. 19(b), the backward movement BK is given to the rotation portion including the rotation block 33 subsequently to the first upward movement UP1. Subsequently to the first upward movement UP1, in this backward movement BK, the rotation block 33 is moved backward in an arrow H direction of FIG. 19(b) along the rotation axis L-L to approach the rotator 31. In this backward movement BK, since the rotation block 33 is in the free state with respect to the respective wire rods 25 by the first upward movement UP1, the rotation block 33 can be easily moved backward. In this backward movement BK, as shown in FIG. 19(b), the rotation block 33 is moved backward to such a range that even if the counter rotation operation CR in an arrow A2a direction is given to the rotation block 33, the rotation block 33 does not collide with the lead wire 17a.

Subsequently to this backward movement BK, the counter rotation operation CR in the arrow A2a direction is given to the rotation portion including the rotation block 33. In this counter rotation operation CR, the rotation block 33 is inverted by 180 degrees in the arrow A2a direction around an axis rising from the rotation axis L-L by the first upward movement UP1. Subsequently to this counter rotation movement CR, the downward movement DN is given to the rotation block 33. This downward movement DN moves the rotation surface 36 of the rotation block 33 across the first reference surface E-E to the lower side thereof.

Subsequently to the downward movement DN, the forward movement FD is given to the rotation portion including the rotation block 33. This forward movement FD moves the rotation block 33, which has been moved backward to approach the rotator 31 by the backward movement BK, forward in an arrow J direction of FIG. 19(b) along the rotation axis L-L. In this state, since the rotation surface 36 of the rotation block 33 is positioned at the further lower side of the first reference surface E-E as indicated by an alternate long and short dash line in FIG. 19(b), even if the rotation block 33 moves forward by the forward movement FD, the guide grooves 37 of the rotation surface 36 do not collide with the wire rods 25 on the first reference surface E-E. Subsequently to the forward movement FD, as shown in FIG. 19(c), the second upward movement UP2 is given to the rotation portion including the rotation block 33, and the rotation block 33 is returned to the original position. At this original position, the rotation surface 36 returns to the first reference surface E-E, and the wire rods 25 on the first reference surface E-E fit in the respective guide grooves 37 of the rotation surface 36. This state is equal to the end state of the first or the second wire rod turn step S2 or S4 described in embodiment 1, and prepares for the next first wire rod feed step S1 or the second wire rod feed step S3.

Figure 20:
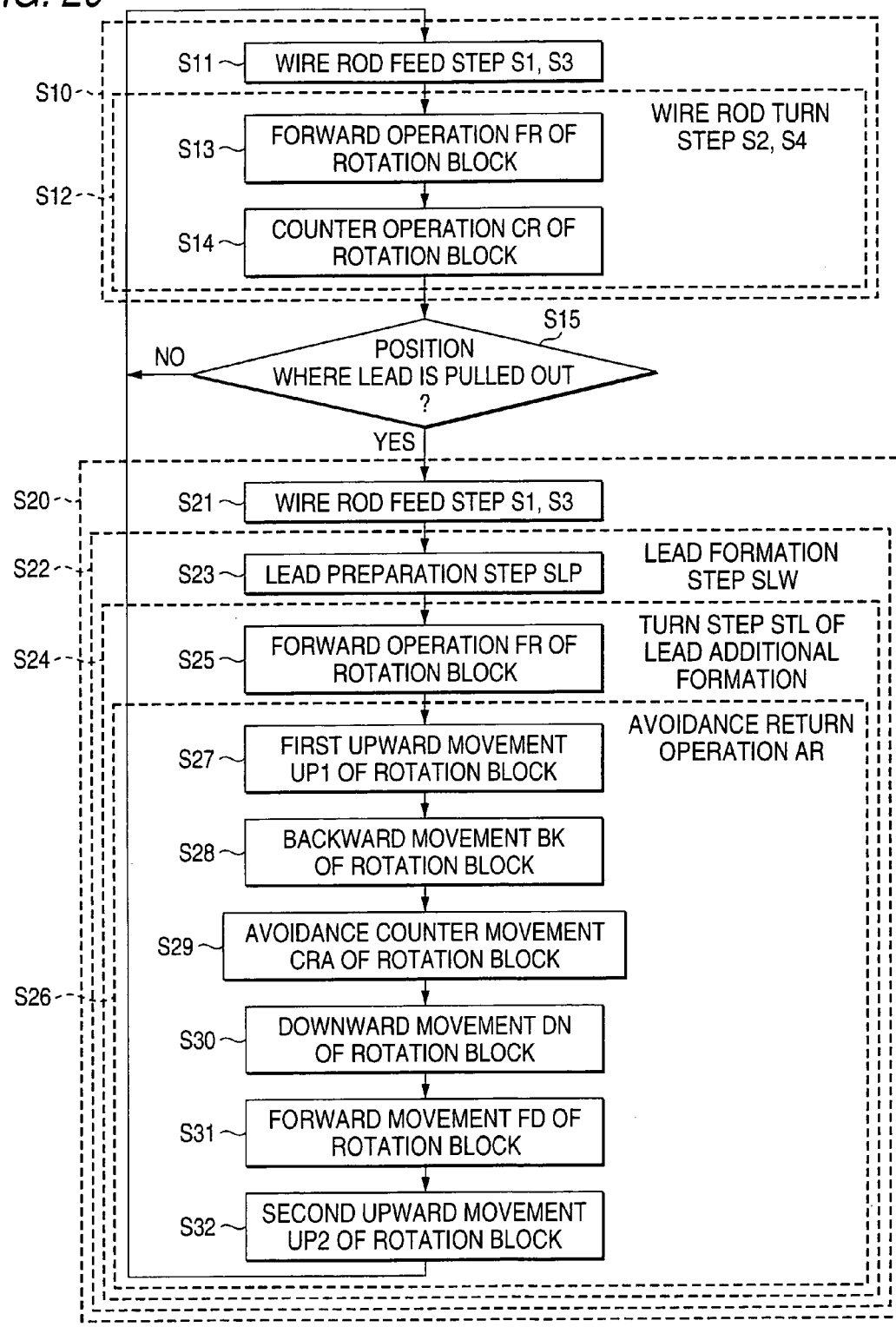
FIG. 20 is a flowchart of a winding step in embodiment 2.

FIG. 20 is a flowchart showing the operation of the winding step according to embodiment 2. This flowchart includes a first step group S10 and a second step group S20, and step 15 is included between the first and the second step groups S10 and S20. The first step group S10 is a normal winding step not including the formation of the lead wire 17a, and includes step S11 and step S12. The step S12 further includes steps S13 and S14. The step S11 indicates the wire rod feed steps S1 and S3 described in embodiment 1, and on the respective supply lines SL, a predetermined number of plural wire rods 25 are supplied to the guide grooves 37 of the rotation surface 36 from the direction inclined by a predetermined inclination angle α with respect to the rotation axis L-L. The step S12 indicates the wire rod turn steps S2 and S4 described in embodiment 1, the step 13 indicates the forward rotation operation FR of the rotation block 33, and the step S14 indicates the counter rotation operation CR of the rotation block 33. At the step S13, by the forward rotation operation FR of the rotation block 33, the plural wire rods 25 on the rotation surface 36 are simultaneously bent around the rotation axis L-L by substantially 180 degrees to form the first and the second straight parts 15A and 15B and the first and the second turn parts 15C and 15D. At the step S14, the rotation block 33 is returned to the original position by the counter rotation operation CR of the rotation block 33.

At the step S15, it is judged whether a formation position of the lead wire 17a is produced. When the position where the lead wire 17a is formed is produced and the judgment result of the step S15 is YES, the procedure proceeds to the second step group S20. When the judgment result is NO, the procedure returns to the step S11 of the first step group S10, and the winding operation described in embodiment 1 is repeated.

At the second step group S20, in addition to the first and the second straight parts 15A and 15B, and the first and the second turn parts 15C and 15D, the lead wire 17a is formed. This second step group S20 includes step group S22 of carrying out the lead wire formation step SLW after step S21 indicating the first and the second wire rod feed steps S1 and S3. The step group S22 of carrying out the lead wire formation step SLW includes step S23 of carrying out the lead wire preparation step SLP, and step group S24 of carrying out the lead wire additional formation turn step STL. At the step S23, the cutting step by the cutting mechanism 70 and the retract movement operation MS to the auxiliary block 50 are carried out. The step group S24 of carrying out the lead wire additional formation turn step STL includes step S25 of performing the forward rotation operation FR of the rotation block 33, and step group S26 of carrying out the avoidance return operation AR of the rotation block 33. At the step S25, in addition to the first and the second straight parts 15A and 15B and the first and the second turn parts 15C and 15D, the lead wire 17a is formed.

By the step S26 after the step S25, the avoidance return operation AR of the rotation block 33 is performed. This avoidance return operation AR includes a first upward movement UP1 of step S27, a backward operation BK of step S28, an avoidance counter rotation operation CRA of step S29, a downward movement DN of step S30, a forward operation FD of step S31, and a second upward movement UP2 of step S32. The procedure returns from the second upward movement UP2 of this step S32 to the step S11, and the first step group S10 is carried out.

As described above, according to embodiment 2, in the winding step of the winding assembly 10, the lead wire 17a can be simultaneously formed for the selected wire rod 25 at the predetermined turn position. Unlike the prior invention, a work operation is made unnecessary in which after the winding assembly 10 is constructed, an insulation coating of a wire rod of a predetermined winding member at a predetermined turn position is peeled, and a lead wire is bonded to the portion, and manufacture efficiency of the winding assembly 10 can be improved.

Embodiment 3

Similarly to embodiment 2, embodiment 3 relates to a manufacturing method for a winding assembly of a rotating electrical machine in which a lead wire is formed in a winding step of a winding assembly 10, and is an embodiment in which embodiment 2 is modified and one more lead wire 17b is formed subsequently to one lead wire 17a.

Figure 21:
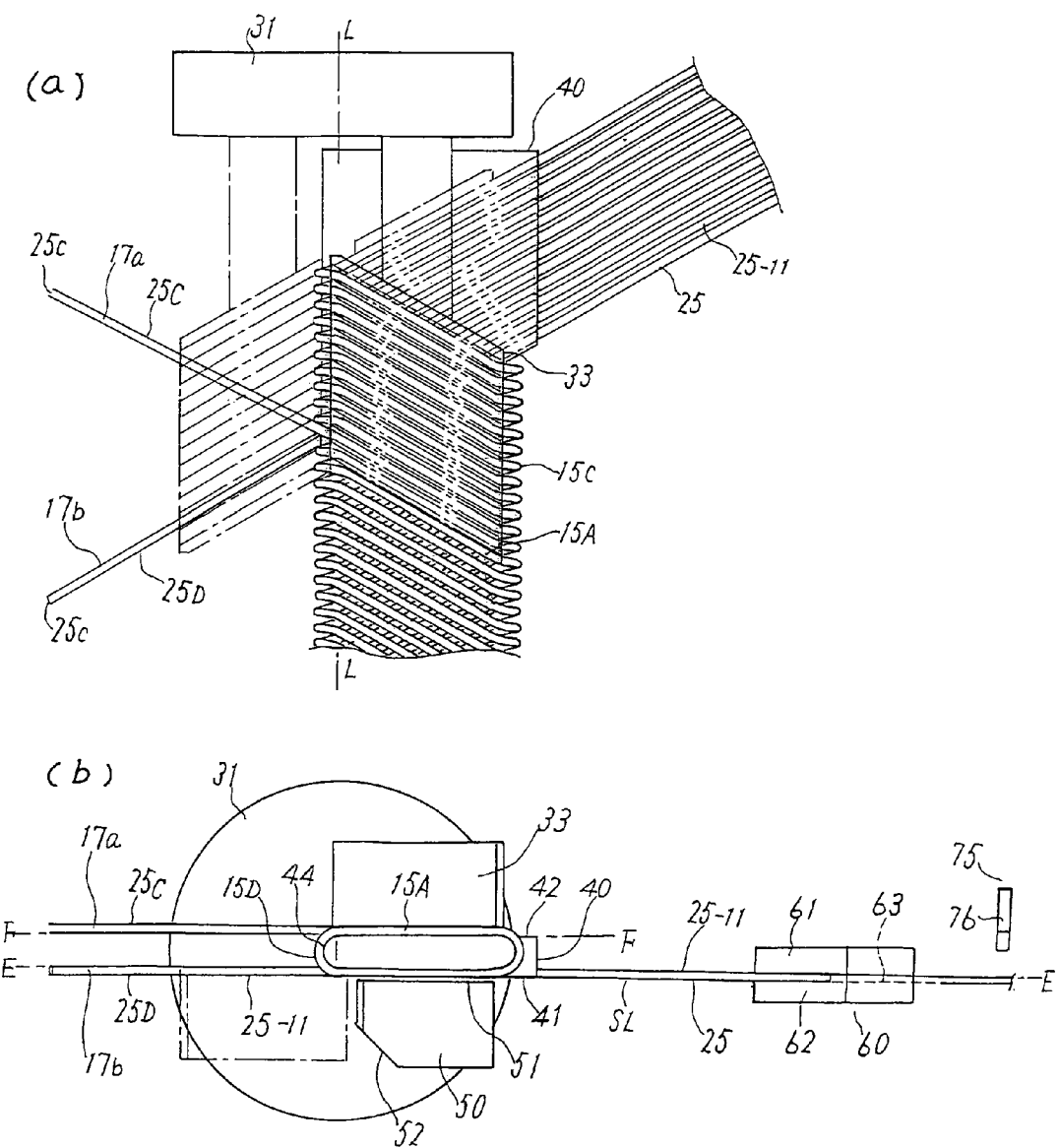

FIGS. 21(a) and 21(b) show a state in which after one lead wire 17a is formed similarly to embodiment 2, one more lead wire 17b is formed. FIGS. 21(a) and 21(b) show the state in which after the lead wire 17a is formed, the lead wire 17b is formed in the state where the rotation block 33 exists on the second reference surface F-F. Although the state shown in FIGS. 21(a) and 21(b) corresponds to the state shown in FIGS. 18(a) and 18(b) of embodiment 2, the lead wire 17b is additionally formed.

In the state shown in FIGS. 16(a) and 16(b), the wire rod 25-11 cut at the cut place 25c by the cutting mechanism 70 includes the wire rod portion 25D existing at the right side of the cut place 25c, and even at the end of the forward rotation driving of the rotation block 33 shown in FIG. 18, the wire rod portion 25D exists at the position shown in FIGS. 16(a) and 16(b). In embodiment 3, in the state shown in FIGS. 21(a) and 21(b) corresponding to FIGS. 18(a) and 18(b) of embodiment 2, while the wire rods 25 except the cut wire rod 25-11 are made to remain on the first surface 41 of the fixed block 40, the wire rod portion 25D of the wire rod 25-11 is supplied onto the rotation surface 36 of the rotation block 33, so that this wire rod portion 25D forms the lead wire 17b. Specifically, with respect to this cut portion 25D, for example, as shown in FIG. 21(b), a selected wire rod push-out mechanism 75 to push out only a selected wire rod is provided behind the wire rod feed mechanism 60, and by a pusher 75 of this selected wire rod push-out mechanism 75, only the wire rod 25-11 including the wire rod portion 25D is made to further project from the rotation surface 36 as shown in FIGS. 21(a) and 21(b), and the lead wire 17b is formed.

Although the lead wire 17a exists on the second reference surface F-F similarly to embodiment 2, since the lead wire 17b is formed on the first reference surface E-E by pushing out only the wire rod 25-11 including the wire rod portion 25D by the selected wire rod push-out mechanism 75, it exists on the first reference surface E-E.

Figure 22:
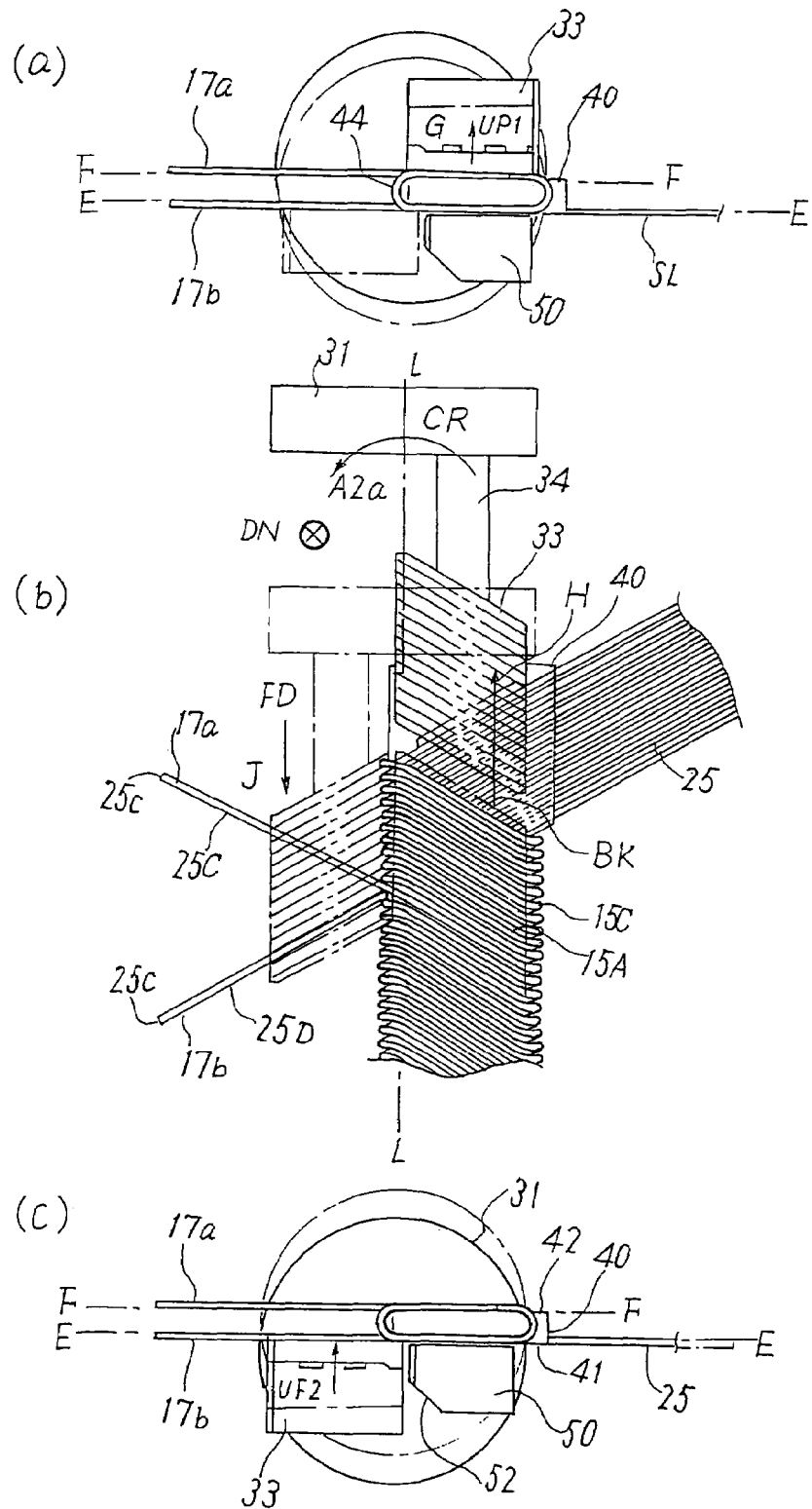

Also in this embodiment 3, as shown in FIGS. 21(a) and 21(b), it is necessary that the rotation block 33 existing on the second reference surface F-F is returned to its original position while avoiding collision with the wire rod 25 and the lead wires 17a and 17b, and for that purpose, an avoidance return operation AR similar to embodiment 2 is given to the rotation block 33. The avoidance return operation AR in this embodiment 3 is shown in FIGS. 22(a), 22(b) and 22(c), and since this is the same as the avoidance return operation AR of embodiment 2 shown in FIGS. 19(a), 19(b) and 19(c), the detailed description will be omitted.

According to this embodiment 3, in the winding step of the winding assembly 10, the lead wires 17a and 17b are continuously formed.

Embodiment 4

Embodiment 4 is an embodiment in which at winding start end parts of a winding assembly 10 and winding finish end parts, leading end parts 18a, 18b, 18c and 18d connected to winding members 15 of another winding assembly 10 are formed in a winding step of the winding assembly 10. FIGS. 23(a) and 23(b) and FIGS. 24(a) and 24(b) show a state in which the leading end parts 18a and 18b are formed at the winding start end parts, and FIGS. 25(a) and 25(b) show a state in which the leading end parts 18c and 18d are formed at the winding finish end parts.

In this embodiment 4, the auxiliary block 50 used in embodiment 2 is replaced by two auxiliary blocks 50A and 50B. These auxiliary blocks 50A and 50B are such that the auxiliary block 50 is separated, typically is just halved in the direction in which twelve wire rods 25 are arranged in parallel to each other. The auxiliary block 50A corresponds to six wire rods 25-1 to 25-6 close to the rotator 31 among twelve adjacent wire rods 25, and the auxiliary block 50B corresponds to remaining wire rods 25-7 to 25-12. The respective auxiliary blocks 50A and 50B are constructed to be capable of moving from an original position opposite to a first surface 41 of a fixed block 40 to a retract position close to a wire rod feed mechanism 60. However, in this embodiment 4, the one auxiliary block 50B is always placed at the original position. In detail, in the state where the leading end parts 18a and 18b are formed at the winding start end parts shown in FIGS. 23(a) and 23(b) and FIGS. 24(a) and 24(b), both the auxiliary blocks 50A and 50B exist at the original position, and in the state where the leading end parts 18c and 18d are formed at the winding finish end parts shown in FIGS. 25(a) and 25(b), only the auxiliary block 50A is moved to the retract position.

Each of the auxiliary blocks 50A and 50B has an auxiliary surface 51 opposite to the first surface 41 of the fixed block 40 at its original position, and has an inclined surface 52 at a lower portion of a front end face on a rotation axis L-L side.

Besides, in this embodiment 4, the wire rod feed mechanism 60 used in embodiments 1, 2 and 3 is replaced by two wire rod feed mechanisms 60A and 60B. The wire rod feed mechanism 60A performs feeding of the six wire rods 25-1 to 25-6 close to the rotator 31, and the wire rod feed mechanism 60B performs feeding of the remaining six wire rods 25-7 to 25-12. Similarly to the wire rod feed mechanism 60, each of the wire rod feed mechanisms 60A and 60B includes feed blocks 61 and 62. Guide grooves 63 for guiding six wire rods are formed on the surface of each of the feed blocks 62, and the feed block 62 is pressed to the feed block 61 so that the six wire rods are nipped and held.

FIGS. 23(a) and 23(b) and FIGS. 24(a) and 24(b) show the formation state of the leading end parts 18a and 18b at the winding start end parts of the winding assembly 10, and FIGS. 25(a) and 25(b) show the formation state of the leading end parts 18c and 18d at the winding finish end parts.

First, the formation method of the leading end parts 18a and 18b will be described with reference to FIGS. 23(a) and 23(b) and FIGS. 24(a) and 24(b). The leading end parts 18a and 18b of the winding start end parts of the winding assembly 10 are formed by carrying out a winding start leading end part formation step before a first wire rod feed step S1, a first wire rod turn step S2, a second wire rod feed step S3 and a second wire rod turn step S4. The winding start leading end part formation step includes a wire rod feed step SS1 for six wire rods among twelve wire rods 25, a wire rod turn step SS2, and a wire rod turn step SS3.

As shown in FIGS. 23(a) and 23(b), the wire rod feed step SS1 is a step of feeding the six wire rods 25-1 to 25-6 close to the rotator 31 before the remaining wire rods 25-7 to 25-12. In the two wire rod feed mechanisms 60A and 60B, in the state where the wire rod feed mechanism 60B is stopped at the original position, only the wire rod feed mechanism 60A is moved in the arrow C1 direction, and feeds the six wire rods 25-1 to 25-6 onto the rotation surface 36 of the rotation block 33. This wire rod feed mechanism 60A feeds the wire rods 25-1 to 25-6 in the state where the six wire rods 25-1 to 25-6 are nipped and held. At this wire rod feed step SS1, similarly to the wire rod feed steps S1 and S3, the rotation block 33 is at the original position, and the rotation surface 36 is on the first reference surface E-E. The auxiliary blocks 50A and 50B are in the state where they are stopped at the position opposite to the first surface 41 of the fixed block 40.

Figure 24:
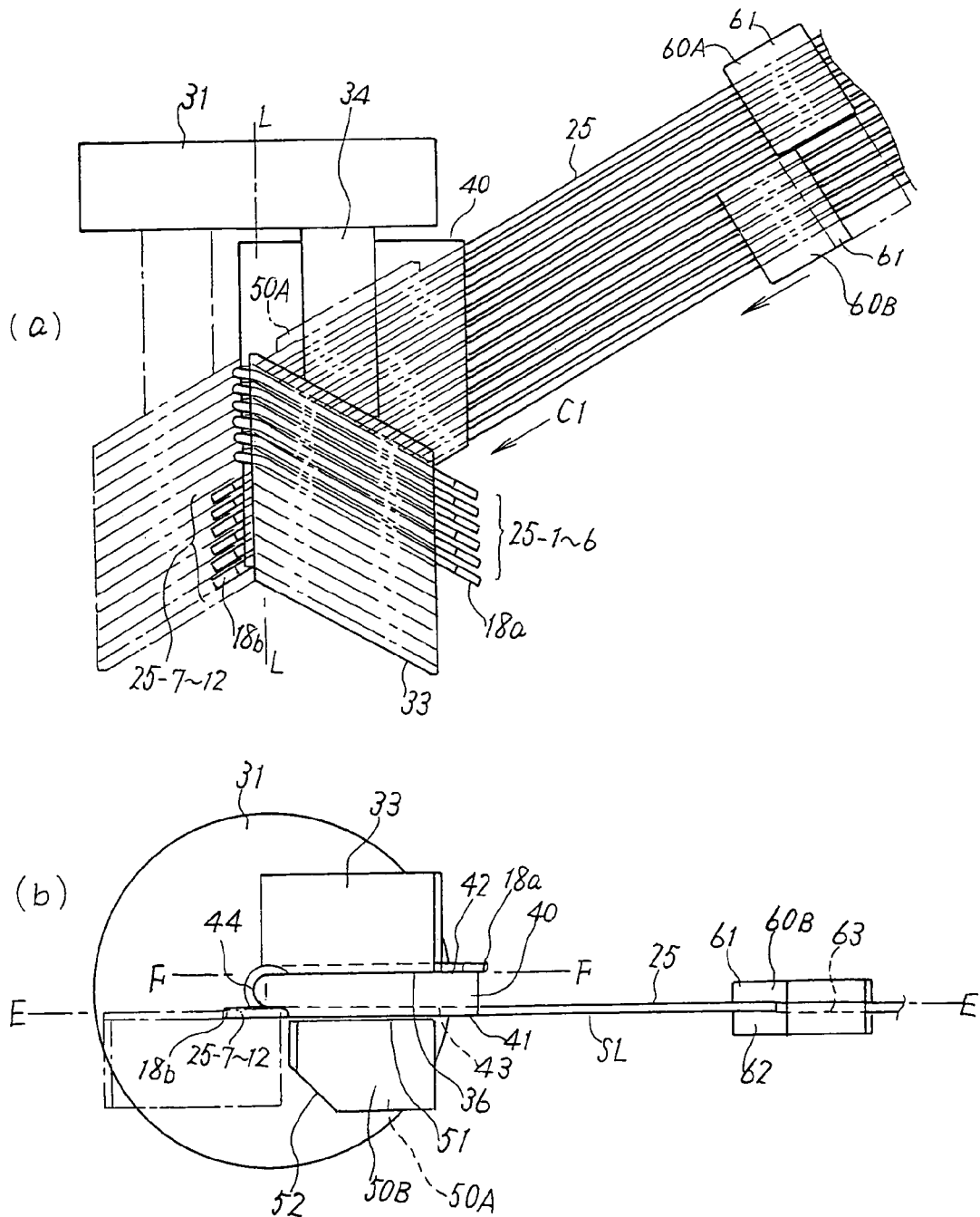
Figure 25:
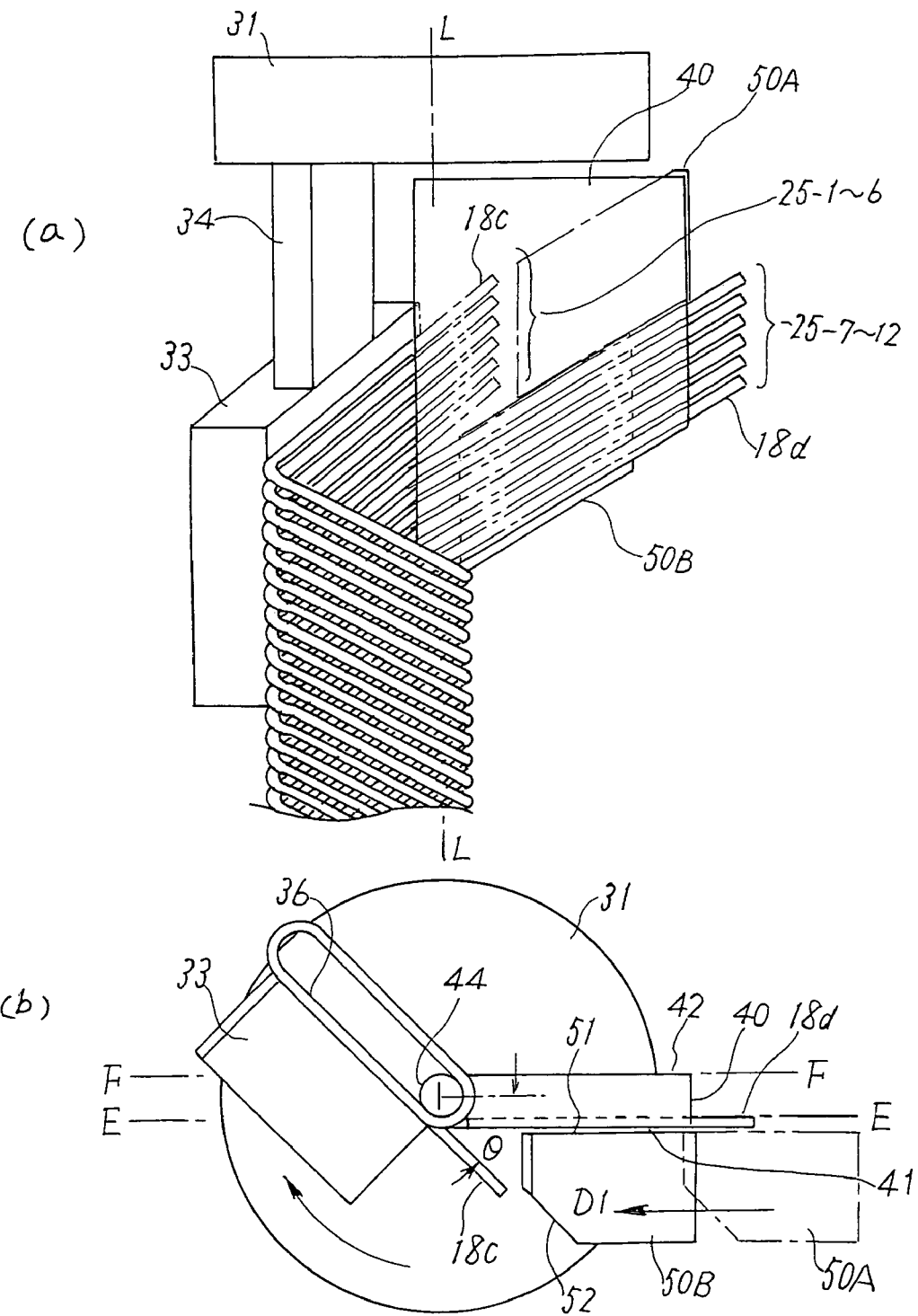

The wire rod turn step SS2 is shown in FIGS. 24(a) and 24(b). The forward rotation driving FR is given to the rotation block 33 from the original position shown in FIGS. 23(a) and 23(b), and the rotation surface 36 is positioned on the second reference surface F-F. By the forward rotation driving FR of this rotation block 33, as shown in FIGS. 24(a) and 24(b), the six wire rods 25-1 to 25-6 are bent by substantially 180 degrees with respect to the rotation axis L-L, and the leading end parts 18a are formed. The rotation block 33 is given the counter rotation driving CR after the forward rotation driving FR, and is returned to the original position indicated by an alternate long and short dash line in FIGS. 24(a) and 24(b).

At the next wire rod feed step SS3, after the rotation block 33 is returned to the original position indicated by the alternate long and short dash line in FIGS. 24(a) and 24(b), the remaining wire rods 25-7 to 25-12 are fed to the rotation surface 36. At this wire rod feed step SS3, in the state where the wire rod feed mechanism 60A is stopped at the original position, the wire rod feed mechanism 60B is moved in the arrow C1 direction in the state where the remaining wire rods 25-7 to 25-12 are nipped and held, and feeds the wire rods 25-7 to 25-12 to the rotation surface 36. The end parts of the wire rods 25-7 to 25-12 fed to the rotation surface 36 form the leading end parts 18b. In FIGS. 24(a) and 24(b), although the leading end parts 18a are positioned on the second reference surface F-F, the leading end parts 18b are positioned on the first reference surface E-E.

After the wire rod feed step SS3, the first wire rod feed step S1 described in embodiment 1, the first wire rod turn step S2, the second wire rod feed step S3, and the second wire rod turn step S4 are repeated in this order and the winding step proceeds. In these steps S1 to S4, similarly to embodiment 1, the twelve wire rods 25 are simultaneously fed to the rotation surface 36, and the twelve wire rods 25 are simultaneously bent along the shaping surface 44 by the rotation of the rotation surface 36.

FIGS. 25(a) and 25(b) show the winding finish leading end part formation step of forming the leading end parts 18c and 18d at the winding finish end parts of the winding assembly 10. This winding finish leading end part formation step is carried out subsequently to the final second wire rod turn step S4. At the winding finish leading end part formation step, in the state where the wire rods 25-7 to 25-12 are made to remain on the first reference surface E-E, the wire rods 25-1 to 25-6 are bent by the forward rotation driving FR of the rotation surface 36. At this time, as shown in the FIGS. 25(a) and 25(b), the end parts 18c of the wire rods 25-1 to 25-6 are rotated in the clockwise direction from the position close to the rotation axis L-L of the first reference surface E-E, and only the auxiliary block 50A is retracted to the retract position indicated by the alternate long and short dash line in FIG. 25(b) in order not to hinder the rotation of this end parts 18c. The auxiliary block 50B is stopped at the original position where its auxiliary surface 51 is opposite to the first surface 41 of the fixed block 40, and prevents the wire rods 25-7 to 25-12 from rotating. Thus, the end parts 18d of the wire rods 25-7 to 25-12 are made to remain on the first reference surface E-E. In the state where the end parts 18c of the wire rods 25-1 to 25-6 are rotated by a predetermined angle θ, even if the auxiliary block 50A is returned to the original position opposite to the first surface 41 of the fixed block 40, it does not hinder the rotation of the end part 18a, and the auxiliary block 50A is quickly moved in the arrow D1 direction as indicated by the alternate long and short dash line in FIG. 25(b) and is returned to the original position.

By this winding finish leading end formation step, the leading end parts 18c and 18d are formed.

According to this embodiment 4, in the winding step of the winding assembly 10, the winding start leading end parts 18a and 18b and the winding finish leading end parts 18c and 18d can be simultaneously formed.

Figure 26:
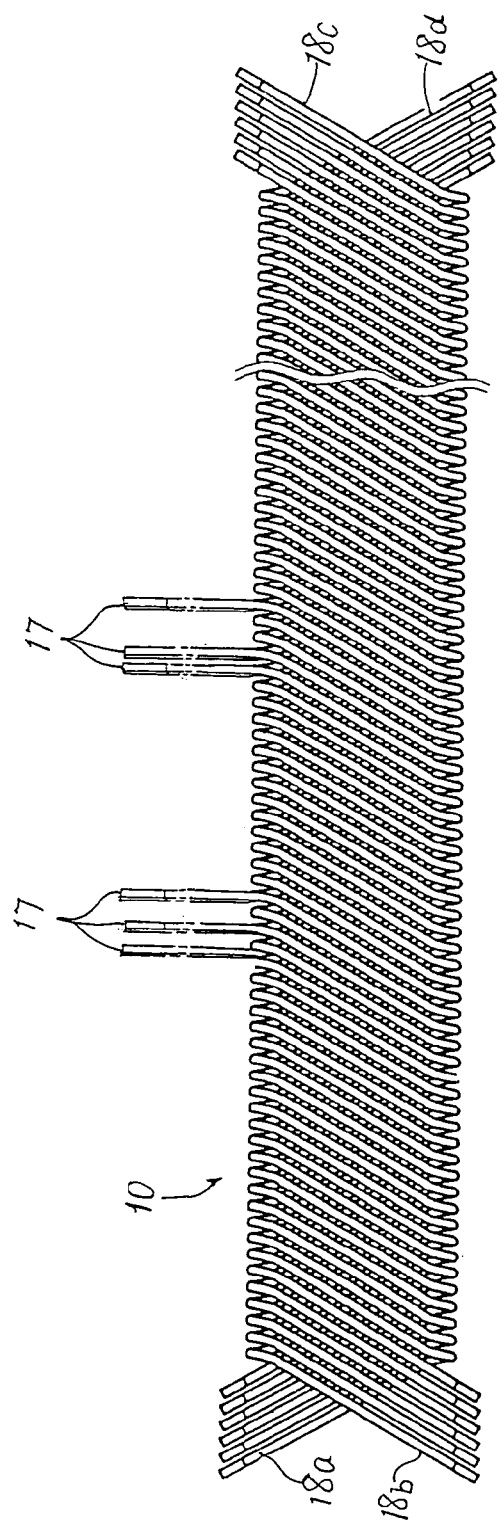
FIG. 26 is a front view showing an example of the winding assembly of the rotating electrical machine manufactured by embodiment 4 relating to the manufacturing method for the winding assembly of the rotating electrical machine according to this invention.
Figure 27:
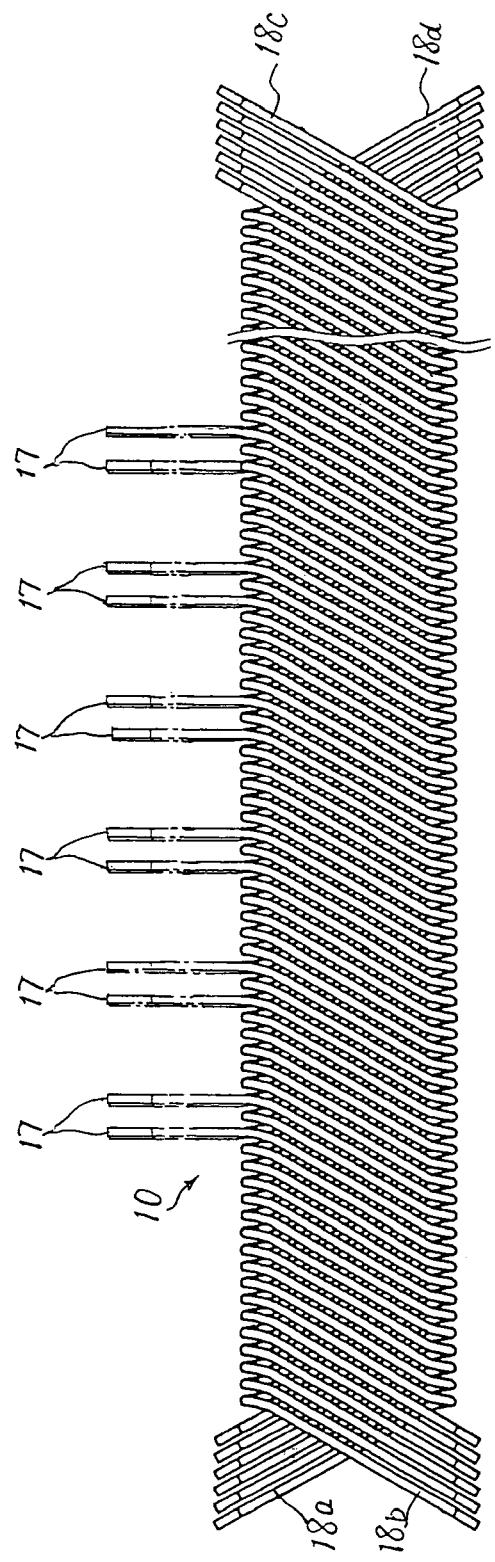
FIG. 27 is a front view showing another example of the winding assembly of the rotating electrical machine manufactured by embodiment 4 relating to the manufacturing method for the winding assembly of the rotating electrical machine according to this invention.

FIG. 26 and FIG. 27 exemplify the winding assembly 10 in which the lead wires 17a and 17b are formed by embodiment 3 and the leading end parts 18a, 18b, 18c and 18d are formed by embodiment 4. FIG. 26 exemplifies the winding assembly 10 in which the lead wires 17a and 17b are made a pair 17 of lead wires and six pairs 17 of lead wires are formed, and FIG. 27 shows the winding assembly 10 in which more, twelve, pairs 17 of lead wires are formed. In both the winding assemblies 10 exemplified in FIG. 26 and FIG. 27, all the pairs 17 of the lead wires are formed to project toward the upper side of the winding assembly 10. Such arrangement of the pairs 17 of the lead wires is effective in concentrating the lead wire pairs 17 in the winding assembly 10 to one side of the winding assembly 10, and facilitates joining of the lead wire pairs 17.

In FIG. 26 and FIG. 27, the winding start leading end parts 18a and 18b are formed at the left end part of the drawing, and the leading end parts 18a extend to the upper side of the winding assembly 10, and the leading end parts 18b extend to the lower side thereof. The winding finish leading end parts 18c and 18d are formed at the right side of the drawing. The leading end parts 18c of the wire rods 25-1 to 25-6 in which the leading end parts 18a are formed extend to the upper side of the winding assembly 10, and the leading end parts 18d of the wire rods 25-7 to 25-12 in which the leading end parts 18b are formed extend to the lower side. When they are inserted into slots of a stator iron core, the winding start end parts and the winding finish end parts are adjacent to each other, and accordingly, such arrangement of the leading end parts 18a, 18b, 18c and 18d facilitates the connection of the leading end parts.

[Description of a Stator of a Rotating Electrical Machine in Which a Winding Assembly of the Invention is Mounted]

Figure 28:
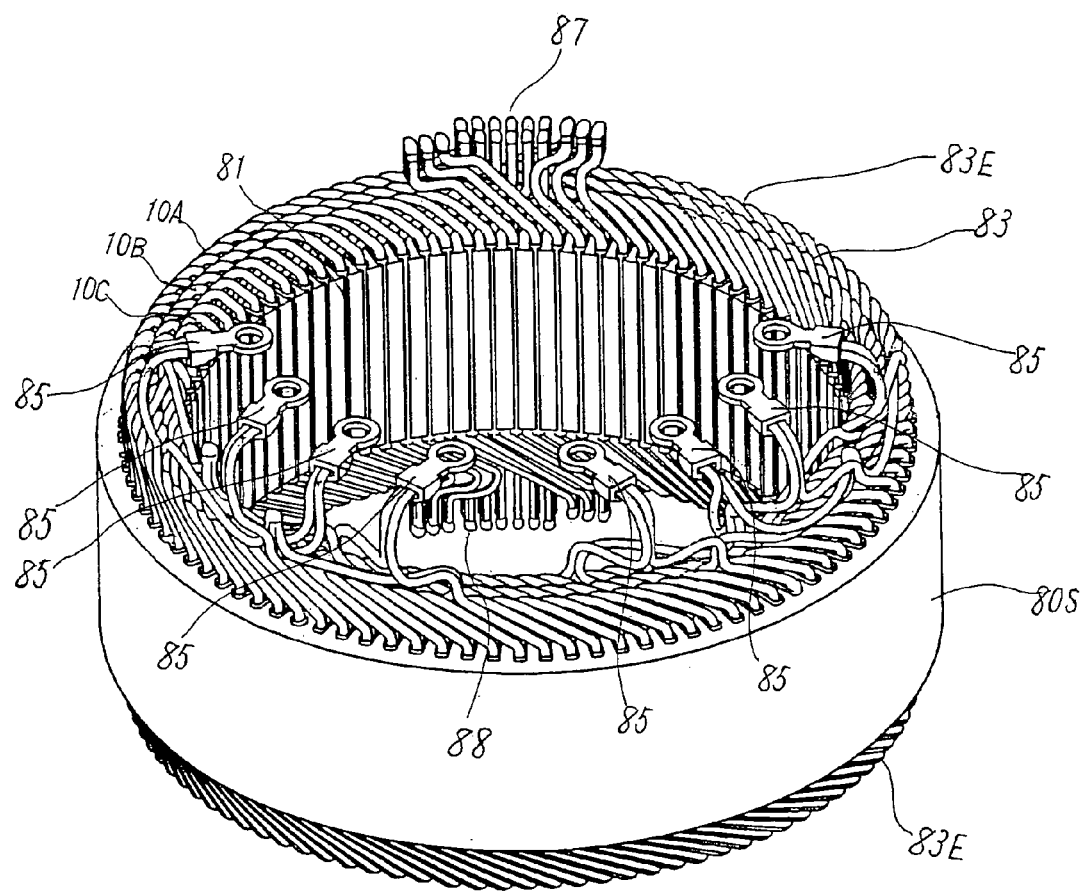
FIG. 28 is a perspective view showing a stator of a rotating electrical machine in which the winding assembly of the rotating electrical machine according to this invention is mounted.

Next, a stator of a rotating electrical machine in which the winding assembly 10 of the invention is mounted will be described with reference to FIG. 28. FIG. 28 exemplifies the stator of the rotating electrical machine in which the winding assembly 10 is mounted. This stator includes an annular stator iron core 80S, and many slots 81 are formed at an equal pitch on the inner periphery of the stator iron core 80S. Three winding assemblies 10A, 10B and 10C are overlapped with each other and are inserted in these slots 81 to constitute a stator winding 83. Each of the winding assemblies 10A, 10B and 10C includes twelve winding members 15, and the twelve winding members 15 constitute six winding combinations 12. Eight lead terminals 85, an upper leading end connection part 87 and a lower leading end connection part 88 are formed in the stator winding 83. Each of the upper leading end connection part 87 and the lower leading end connection parts 88 includes twelve connection parts. The lead terminals 85 are terminals in which the lead wires 17a and 17b formed in embodiment 3 are connected among the winding assemblies 10A, 10B and 10C. The upper leading end connection part 87 is the connection part in which the leading end parts 18a and 18c formed in embodiment 4 are connected among the winding assemblies 10A, 10B and 10C, and is positioned at the upper side of the stator winding 83. The lower leading end connection part 88 is the connection part in which the leading end parts 18b and 18d formed in embodiment 4 are connected among the winding assemblies 10A, 10B and 10C, and is positioned at the lower side of the stator winding 83.

In a rotating electrical machine, especially in a vehicle AC generator, the stator winding 83 is used as an armature winding to generate power output. In this vehicle AC generator, for miniaturization thereof, the stator winding 83 is mounted in a smaller space, and in order to cope with an increase in electrical load of a recent vehicle, there is a tendency that the stator winding 83 is required to have higher generator output, and a mounting structure with improved space efficiency is adopted for the stator winding 83. In this stator winding 83, in addition to the inside of the stator iron core 80S, a coil end portion 83E positioned at the upper side and the lower side of the stator iron core 80S, including the lead terminals 85, the upper leading end connection part 87, and the lower leading end connection part 88, is also arranged in a smaller space and is constructed.

In the winding assembly according to this invention, more, for example, twelve winding members 15 are simultaneously wound and the high density winding assembly 10 is efficiently manufactured, and further, the lead wires 17a and 17b constituting the lead terminal 85 can be efficiently formed in the winding step of the winding assembly 10, and as compared with a case where special lead wires are later joined, the lead wires can be constructed in a smaller space. Also with respect to the leading end connection parts 87 and 88, similarly, the leading end parts 18a, 18b, 18c and 18d are efficiently formed in the winding step, and as compared with a case where special lead wires are later joined to the leading end parts, the leading end parts can be constructed in a smaller space.

Figure 29:
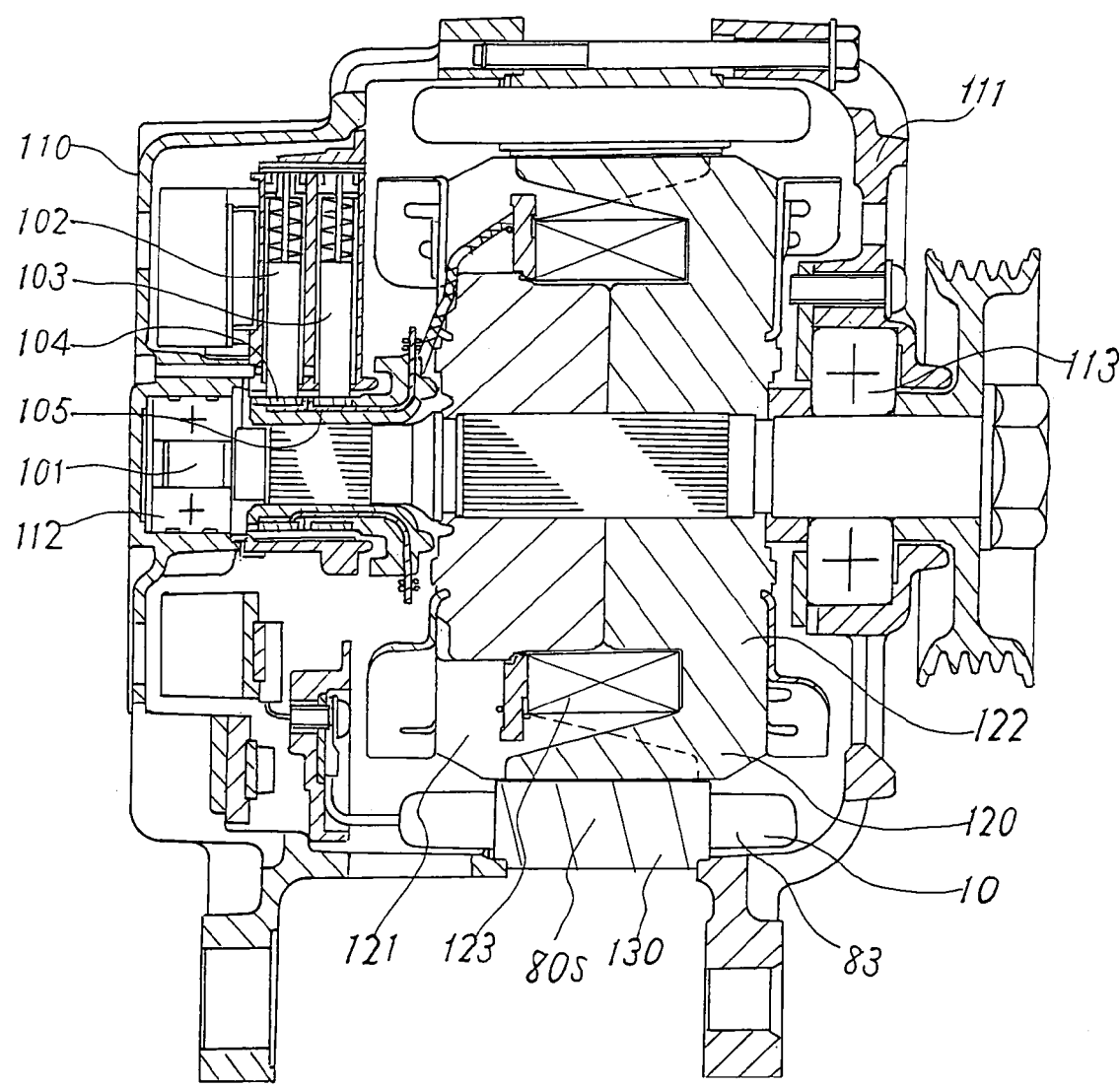
FIG. 29 is a sectional view showing an example of a rotating electrical machine using the winding assembly of the rotating electrical machine according to this invention.

Description of a Rotating Electrical Machine Using a Winding Assembly According to the Invention FIG. 29 is a sectional view showing an example of a rotating electrical machine using a winding assembly manufactured according to this invention.

This rotating electrical machine is an AC generator mounted in a vehicle, and is used for charging a battery of the vehicle, feeding to various electric loads mounted in the vehicle, and the like. This AC generator includes a rotating shaft 101, a pair of brackets 110 and 111, a rotor 120 and a stator 130. The rotor 120 includes a pair of rotor iron cores 121 and 122 and a rotation coil 123. This rotation coil 123 is a field coil, and is excited from a pair of brushes 102 and 103 provided on the rotating shaft 101 and slip rings 104 and 105. The rotating shaft 101 is rotatably supported by the pair of brackets 110 and 111 through bearings 112 and 113.

The stator 130 includes an annular stator iron core 80S disposed outside the outer periphery of the rotor 120 and a stator winding 83 including a winding assembly 10. As shown in FIG. 28, the stator iron core 80S includes many slots at predetermined intervals on the inner peripheral surface, and respective winding combinations 12 of at least one winding assembly 10 are inserted into the slots. Specifically, first and second parallel straight parts 15a1 and 15b1 of each of winding members 15 of each of the winding combinations 12 are inserted into the slots. This winding assembly 10 constitutes an output coil of the AC generator, and when the rotating shaft 101 is driven by an engine or the like, AC voltage is generated. This AC voltage is converted into DC voltage by a rectifier disposed inside of the bracket 110, and is fed to the battery and the various loads.

Description of Embodiment Relating to a Manufacturing Apparatus for a Winding Assembly of a Rotating Electrical Machine Embodiment 5 relating to a manufacturing apparatus for a winding assembly of a rotating electrical machine according to this invention will be described.

Embodiment 5

Although the main structure of the manufacturing apparatus 20 has been described with reference to FIG. 4 for convenience of explanation, in embodiment 5, more specific structure of the manufacturing apparatus 20 will be described anew.

Figure 30:
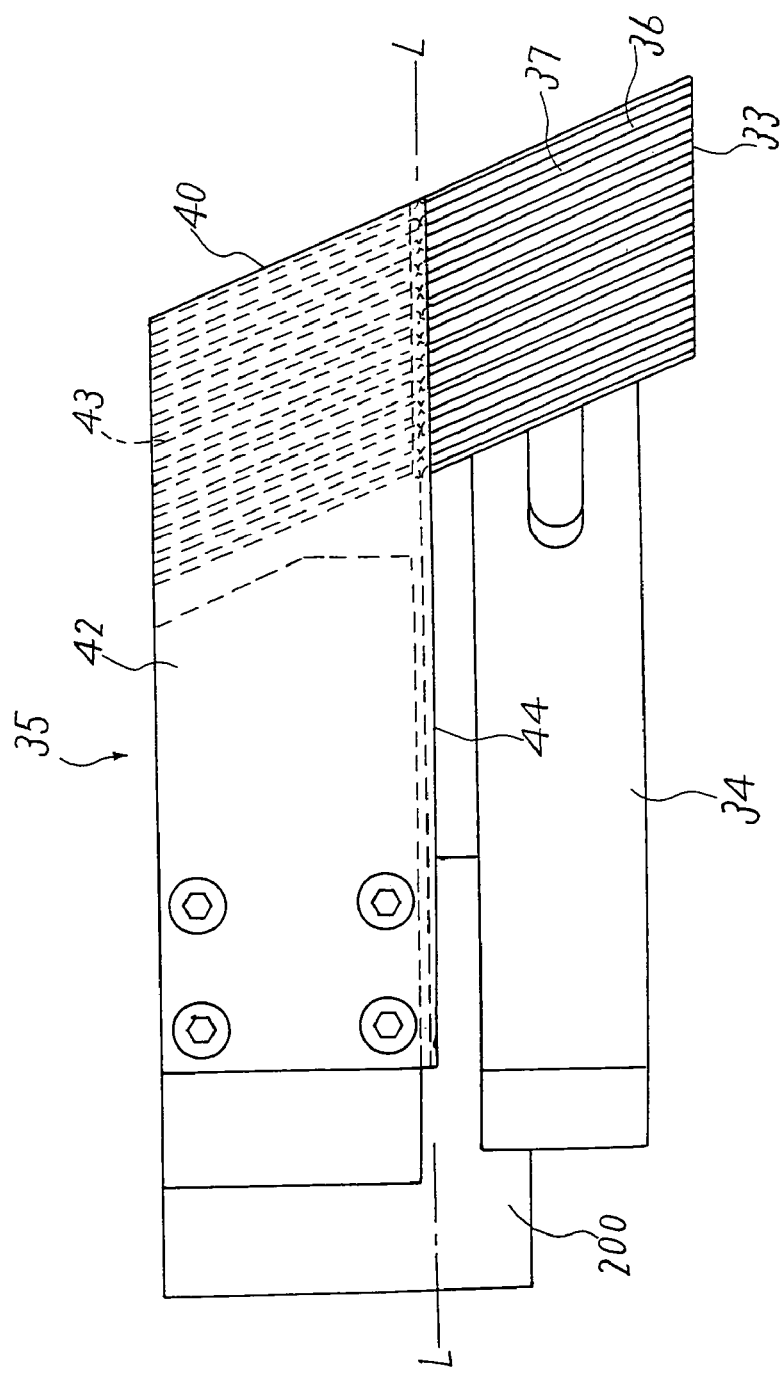
FIG. 30 is a plan view showing a main part of embodiment 5 relating to a manufacturing apparatus used for manufacturing a winding assembly of a rotating electrical machine according to this invention.
Figure 31:
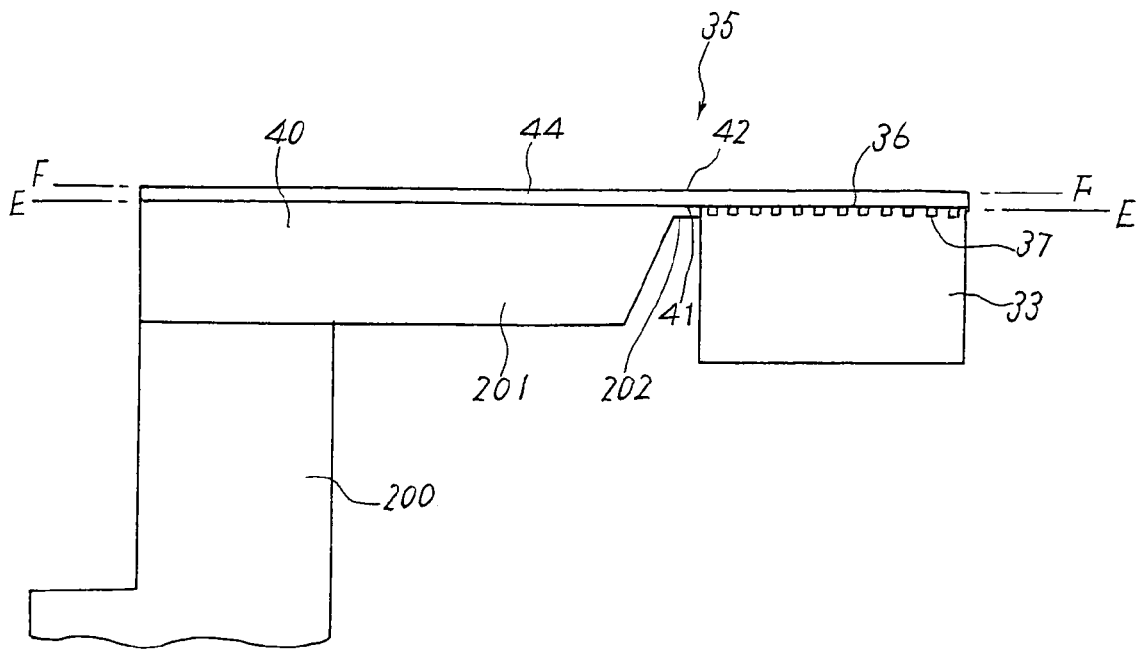
FIG. 31 is a front view showing a main part of FIG. 30.
Figure 32:
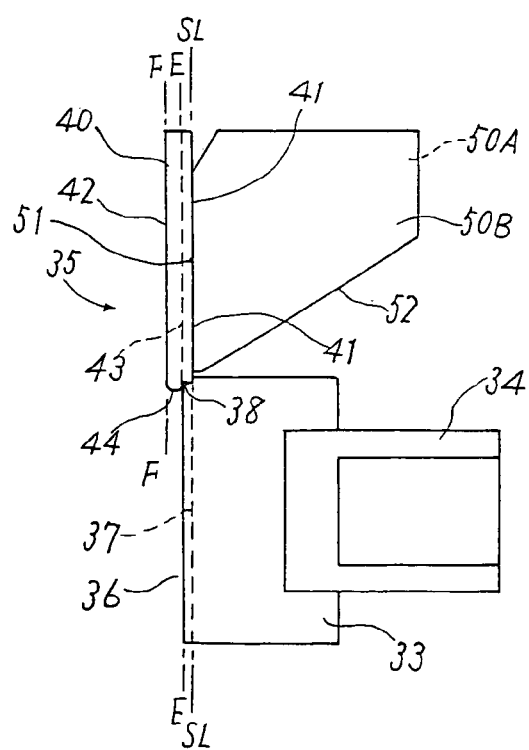
FIG. 32 is a side view showing a main part of embodiment 5.
Figure 33:
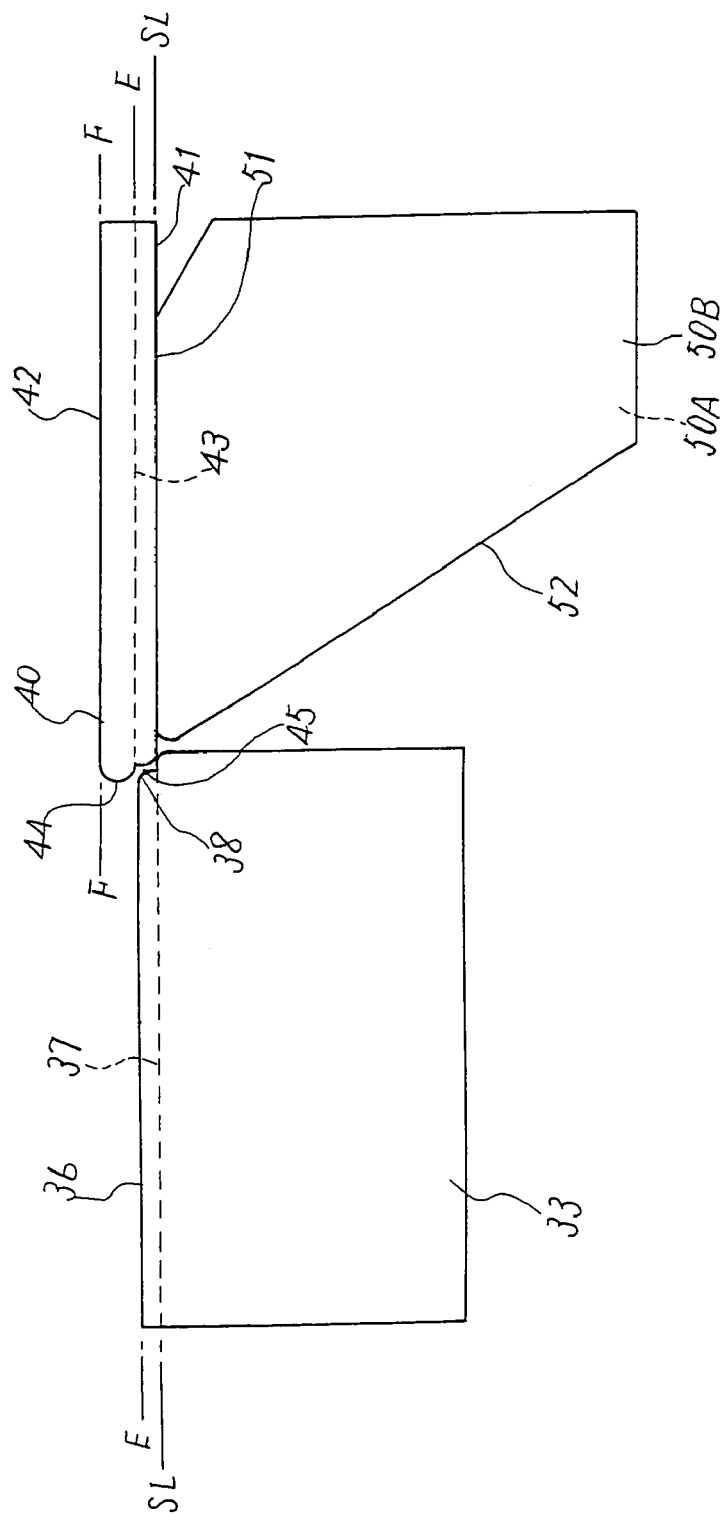
FIG. 33 is an enlarged front view of the main part of embodiment 5.

First, some main parts around a rotation space 35 of the manufacturing apparatus 20 will be described with reference to FIGS. 30, 31, 32 and 33. FIG. 30 is a plan view of the rotation space 35, FIG. 31 is a front view showing a main part of FIG. 30, FIG. 32 is a side view of the rotation space 35, and FIG. 33 is an enlarged front view showing a relation between a rotation block 33, a fixed block 40, and auxiliary blocks 50A and 50B.

The rotation block 33 is disposed at one end of a coupling body 34. This rotation block 33 is arranged to be rotatable around rotation axis L-L. This rotation block 33 has a flat rotation surface 36 facing the rotation space 35, and twelve guide grooves 37 are formed on this rotation surface 36. The rotation block 33 is made of iron, and the guide grooves 37 are such that as shown in FIG. 31, thin grooves having square sectional shapes are formed to be parallel to each other on the rotation surface 36. Also in FIGS. 30 to 34, the rotation block 33 is shown at the original position, and the guide grooves 37 are opened upward at the original position. The guide grooves 37 are formed to be parallel with supply lines SL of wire rods, and its width and depth are almost equal to a wire diameter of the wire rod 25. A chromium coating is applied to the surface of the guide groove 37. The rotation surface 36 is on a first reference surface E-E at the original position. The bottom surface of each of the guide grooves 37 is positioned below the first reference surface E-E by a dimension almost equal to the diameter of the wire rod, and the bottom surface of each of the guide grooves 37 exists on the supply line SL of the wire rod at the original position.

The fixed block 40 is also made of iron, and is fixed to an upper end of a fixing stand 200 by a bolt. This fixed block 40 has a thick portion 201 close to the fixing stand 200, a thin portion 202 is formed at the tip of the thick portion 201, and this thin portion 202 is opposite to the rotation block 33. The lower surface of the thin portion 202 is a flat first surface 41, and twelve guide grooves 43 are formed also on this first surface 41 in parallel to the supply lines SL of the wire rods. The guide grooves 43 are also such that grooves having square sections are formed on the first surface 41 in parallel to each other, and the grooves 43 are opened downward. The width and depth of each of the guide grooves 43 are substantially equal to the diameter of the wire rod. A chromium coating is applied also to the surface of the guide groove 43. The bottom surface of the guide groove 43 is positioned above the first surface 41 by a dimension equal to the diameter of the wire rod, and the bottom surface of the guide groove 43 exists on the first reference surface E-E. The chromium coatings of the surfaces of the guide grooves 37 and 43 facilitate the sliding of the wire rods 25 and prevent the abrasion of the guide grooves 37 and 43.

A flat second surface 42 is formed on the upper surface of the thin portion 202 of the fixed block 40, the second surface 42 is parallel to the first surface 41 and forms the second reference surface F-F. As shown in FIG. 33 under magnitude, an almost semicircular shaping surface 44 is formed at the inner ends of the first surface 41 and the second surface 42. The center point of the almost circular shaping surface 44 is coincident with the rotation axis L-L, and the shaping surface 44 is extended in parallel to the rotation axis L-L along the rotation axis L-L. The diameter of the almost semicircular shaping surface 44 is d1, and the almost semicircular surface of the shaping surface 44 is expanded toward the rotation surface 36. The diameter d1 is equal to the bend diameter of the first turn part 15C and the second turn part 15D of each of the winding members 15 constituting the winding assembly 10. The shaping surface 44 is formed between the first reference surface E-E on which the bottom surface of the guide groove 43 exists and the second reference surface F-F which the second surface forms. Accordingly, the interval between the first reference surface E-E and the second reference surface F-F is also equal to the diameter d1, and is equal to the bend diameter of the first turn part 15C and the second turn part 15D of each of the winding members 15 constituting the winding assembly 10.

An arc surface 38 opposite to the shaping surface 44 is formed at the inner end part of the rotation surface 36 of the rotation block 33, and this is opposite to the shaping surface 44 through a gap 45 smaller than the diameter of the wire rod. This arc surface 38 is provided so as to prevent the rotation surface 36 from coming in contact with the shaping surface 44.

An auxiliary block 50 includes a pair of the auxiliary blocks 50A and 50B. These auxiliary blocks 50A and 50B are arranged side by side under the thin portion 202 of the fixed block 40. These auxiliary blocks 50A and 50B have the same outer size, and have plane auxiliary surfaces 51 having the same size. The auxiliary surface 51 of the auxiliary block 50A is arranged so that the respective auxiliary surfaces 51 come in contact with the first surface 41 as shown in FIG. 33. The first surface 51 of the auxiliary block 50A is opposite to the six guide grooves 43 positioned at the depth side of the paper plane in FIG. 33 among the twelve guide grooves 43 of the first surface 41, and hinders the six wire rods supplied to the guide grooves from separating from the opposite guide grooves 43. The auxiliary block 50B is opposite to the six guide grooves 43 at this side, and hinders the six wire rods 25 supplied to these guide grooves 43 from separating from the opposite guide grooves 43. The inclined surface 52 is formed at the front end faces of the auxiliary blocks 50A and 50B on the rotation axis L-L side, and avoids collision of the auxiliary blocks 50A and 50B against the lead wire 17a of embodiment 2 and the leading end part 18c of embodiment 4.

Figure 34:
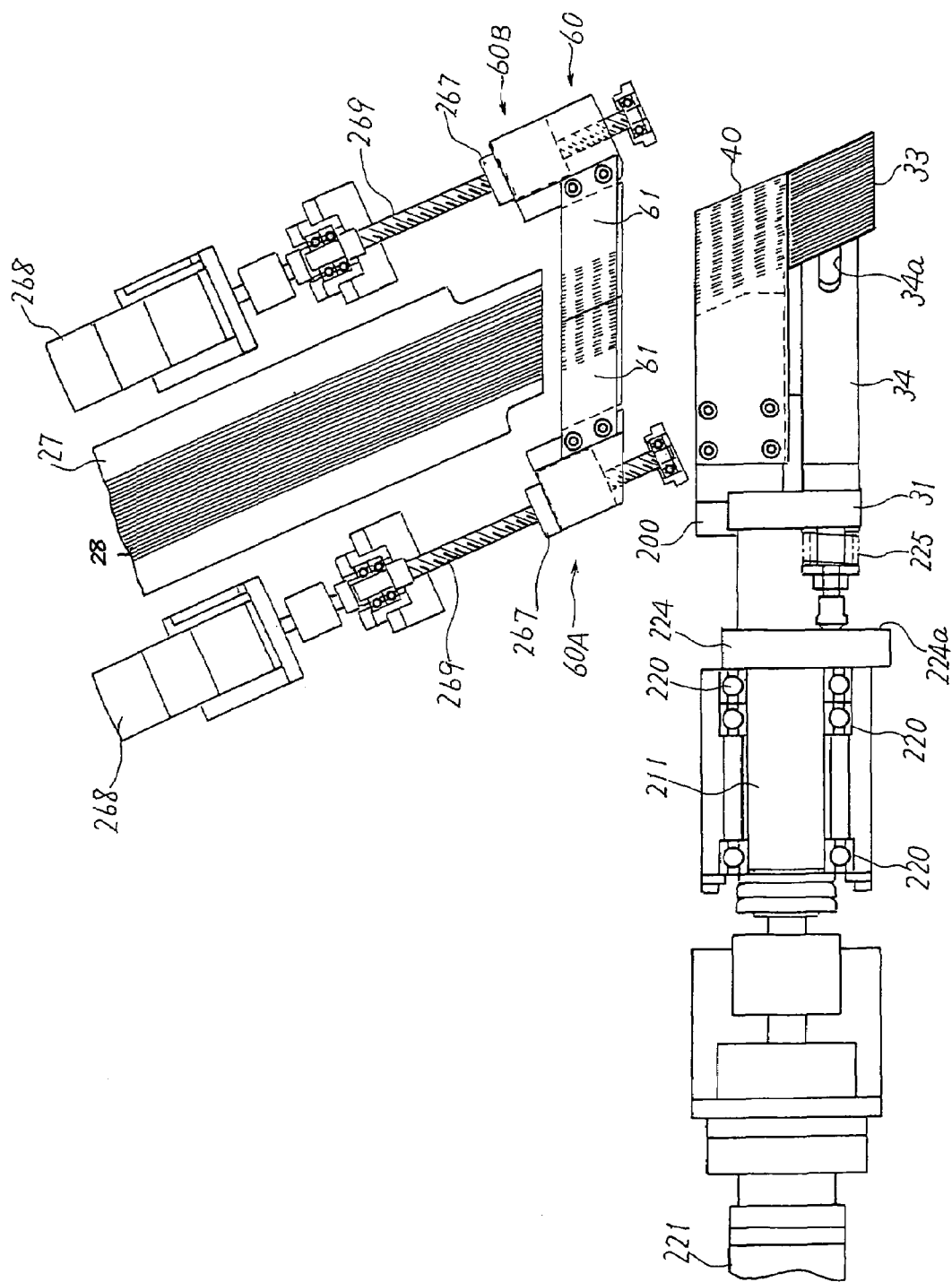
FIG. 34 is a plan view showing the whole structure of the manufacturing apparatus of embodiment 5.
Figures 35, 35A:
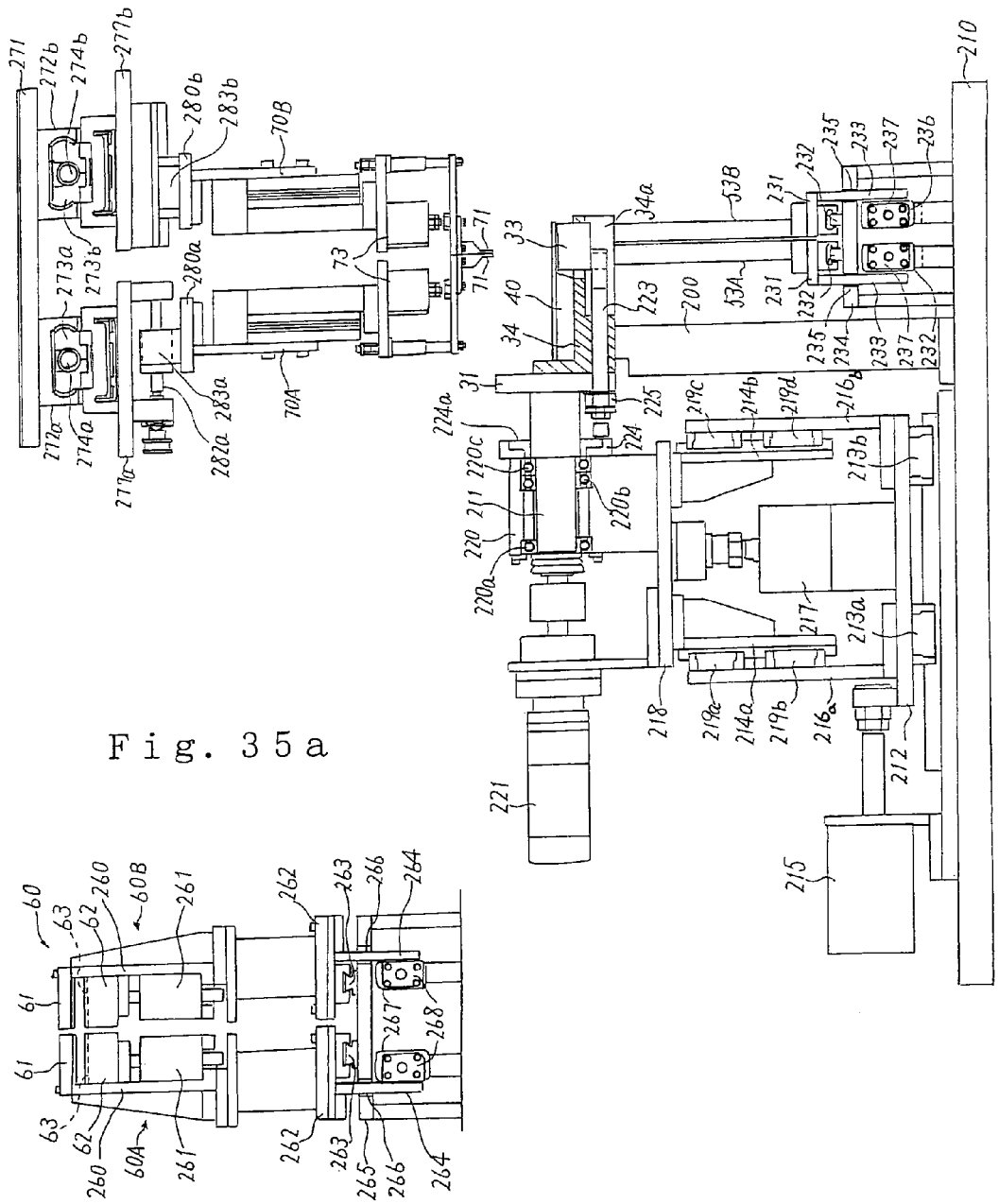
FIG. 35 is a front view showing the whole structure of the manufacturing apparatus of embodiment 5.
FIG. 35a is a front view showing a wire rod feed mechanism of the manufacturing apparatus of embodiment 5.

Subsequently, the whole structure of the manufacturing apparatus 20 will be described with reference to FIGS. 34, 35, 35a and 36. FIG. 34 is a plan view showing the whole structure of the manufacturing apparatus 20 except a cutting mechanism 70 and a selected wire rod push-out mechanism 75, FIG. 35 is a front view of the whole structure, FIG. 35a is a front view of wire rod feed mechanisms 60A and 60B hidden in FIG. 35, FIG. 36 is a side view showing the whole structure of the manufacturing apparatus 20, and FIG. 36a is a front view of the tip of a pusher 65 of the selected wire rod push-out mechanism.

This embodiment 5 includes the rotation block 33, the fixed block 40, the pair of auxiliary blocks 50A and 50B constituting the auxiliary block 50, feed mechanisms 53A and 53B for the auxiliary blocks 50A and 50B, the pair of wire rod feed mechanisms 60A and 60B constituting the wire rod feed mechanism 60, a pair of cutting mechanisms 70A and 70B constituting the cutting mechanism 70, and a pair of selected wire rod push-out mechanisms 75A and 75B constituting the selected wire rod push-out mechanism 75, and can deal with any manufacturing methods of embodiments 1 to 4. In the manufacturing apparatus 20 according to this embodiment 5, the respective parts, mechanisms and drive mechanisms are assembled on a common base stand 210.

The rotator 31, together with its rotation shaft 211, is disposed above the base stand 210. The axis of this rotation shaft 211 is the rotation axis L-L. Above the base stand 210, a horizontal movement stand 212 for the rotation block 33 is mounted on support bodies 213a and 213b to be capable of horizontally moving. This horizontal movement stand 212 is driven in a forward and backward direction along the rotation axis L-L by a forward and backward movement cylinder 215 fixed on the base stand 210. A vertical movement cylinder 217 for the rotation block 33 is mounted on the horizontal movement stand 212, and a mount stand 218 is driven in the vertical direction by the vertical movement cylinder 217. The movement of the mount stand 218 in the vertical direction is guided by support bodies 219a to 219d. Guide plates 214a and 214b vertically suspended from the mount stand 218 are guided by vertical plates 216a and 216b fixed to the horizontal movement stand 212 through the support bodies 219a to 219d. A bearing body structure 220 is fixed on the mount stand 218, and the rotation shaft 211 is rotatably supported around the rotation axis L-L through three bearings 220a, 220b and 220c by this bearing body structure 220. A rotating motor 221 is attached on the mount stand 218, and the rotator 31 is rotation-driven around the rotation axis L-L by this rotating motor 221. The rotation drive mechanism of the rotator 31 and the rotation block 33 by this rotating motor 221 constitutes the rotation drive mechanism 32 of FIG. 4(b).

A coupling body 34 is fixed to the rotator 31. A forward and backward movement bar 223 passes through the coupling body 34 and the moving body 31 so as to be movable along the rotation axis L-L. A forward and backward movement cam 224 is fixed to the bearing body structure 217, and the forward and backward movement bar 223 is always pressed to a cam surface 224a of the forward and backward movement cam 224 by a spring 225. The rotation block 33 is fixed to an end upper surface of the forward and backward movement bar 223, and projects from a guide hole 34a formed in the coupling body 34. The mechanism for moving the rotation block 33 backward and forward along the rotation axis L-L by the forward and backward movement cam 224 constitutes the reciprocal movement mechanism 39 shown in FIG. 4(a).

The forward and backward movement cylinder 215 horizontally moves the horizontal movement stand 212 and the mount stand 218 along the rotation axis L-L, and gives the forward movement FD and the backward movement BK to the rotation block 33. The switching of the forward movement FD and the backward movement BK is performed by switching the movement direction of the piston of the forward and backward movement cylinder 215. The vertical movement cylinder 217 moves the mount stand 218 in the vertical direction, and gives a first upward movement UP1, a downward movement DN, and a second upward movement UP2 to the rotation block 33. The switching of the upward movements UP1 and UP2 and the downward movement DN is performed by switching the movement direction of the piston of the vertical movement cylinder 217. The rotator 31, the coupling body 34, and the forward and backward movement bar 223 are rotated around the rotation axis L-L by the rotating motor 221, and the rotations are given to the rotation block 33 through the forward and backward movement bar 223. As a result, forward rotation driving FR in an arrow A1 direction around the rotation axis L-L and counter rotation driving CR in an arrow A2 direction are given to the rotation block 33. The forward rotation driving FR and the counter rotation driving CR can be changed by switching the rotation direction of the rotating motor 221. Since the forward and backward movement bar 223 is pressed to the cam surface 224a of the forward and backward movement cam 224 while rotating together with the rotator 31, the coupling body 34 and the rotation block 33, in synchronization with the rotation, the rotation block 33 is slightly moved backward and forward along the rotation axis L-L by the cam surface 224a. This cam surface 224a gives slight forward movement FD0 in an arrow B1 direction and slight backward movement BK0 in an arrow B2 direction to the rotation block 33.

A fixing stand 200 is fixed on the base stand 210, and the fixed block 40 is fixed to the upper end of the fixing stand 200. The pair of auxiliary blocks 50A and 50B constituting the auxiliary block 50 and the movement mechanisms 53A and 53B for the auxiliary blocks 50A and 50B are disposed under the fixed block 40. The auxiliary blocks 50A and 50B are supported on a pair of movement plates 231 constituting the movement mechanisms 53A and 53B shown in FIG. 35. These movement plates 231 can be moved on a pair of guide rails 232 in a direction inclined by an inclination angle α with respect to the paper plane, and by the movement, the auxiliary blocks 50A and 50B can be moved in parallel to the paper plane and the supply lines SL. A vertical plate 233 is fixed to each of the movement plates 231, the respective vertical plates 233 are fitted in a pair of guide grooves 235 of a guide plate 234 fixed to the base stand 210, and its movement is guided. As shown in FIG. 36, movement blocks 236 of the auxiliary blocks 50A and 50B are respectively attached to the respective vertical plates 233, and the respective movement blocks 236 are screwed to a pair of screw rods 238 rotated by a pair of auxiliary block drive motors 237 as shown in FIG. 36. The respective movement blocks 236 are moved in the direction of the pair of screw rods 238 in accordance with the rotation of the respective drive motors 237, and the auxiliary blocks 50A and 50B are moved. The movement direction of the auxiliary blocks 50A and 50B can be switched by switching the rotation direction of the drive motor 237, and movement in an arrow D1 direction or a D2 direction is performed.

As shown in FIG. 34, the pair of wire rod feed mechanisms 60A and 60B constituting the wire rod feed mechanism 60 are disposed behind the fixed block 40. Since the feed mechanisms 60A and 60B are not shown in the front view of FIG. 35 since they are hidden by the auxiliary blocks 50A and 50B and the movement mechanisms 53A and 53B, the front view of the feed mechanisms 60A and 60B is taken in FIG. 35a and is shown. Each of the feed mechanisms 60A and 60B is such that a feed block 61 having an urethane rubber layer at its lower surface and a feed block 62 made of iron are made to face each other in the vertical direction. The respective feed blocks 61 are fixed to the upper ends of a pair of support frames 260, and the respective feed blocks 62 are disposed at the lower parts. The respective feed blocks 62 are fixed on pistons of a pair of press cylinders 261, and the respective press cylinders 261 are attached to the lower parts of the support frames 260. The mechanism to press the feed blocks 62 to the urethane rubber surfaces of the feed blocks 61 by the respective press cylinders 261 constitutes the press mechanism 63 of FIG. 4(b).

As shown in FIG. 35a, the respective support frames 260 are supported on a pair of movement plates 262. These movement plates 262 can move on a pair of guide rails 263 in a direction of an inclination angle α with respect to the paper plane, and the feed mechanisms 60A and 60B can be moved by the movement in parallel to the supply lines SL of wire rods. Vertical plates 264 are fixed to the respective movement plates 262, the vertical plates 264 are fitted in a pair of guide grooves 266 provided in a guide plate 265 fixed to the base stand 210, and the movement is guided. Movement blocks 267 of the feed mechanisms 60A and 60B are attached to the respective vertical plates 264, and as shown in FIG. 36, the movement blocks 267 are screwed to a pair of screw rods 269 rotated by a pair of feed mechanism drive motors 268. The pair of movement blocks 267 are moved in the direction of the respective screw rods 269 according to the rotation of the pair of drive motors 268, and the feed mechanisms 60A and 60B are moved. The switching of the movement directions C1 and C2 of the feed mechanisms 60A and 60B can be made by switching the rotation directions of the respective drive motors 268. The mechanism to move the wire rod feed mechanisms 60A and 60B by the drive motor 268 constitutes the feed drive mechanism 65 of FIG. 4(b).

The cutting mechanism 70 is disposed above the supply lines SL of the wire rods, and this cutting mechanism 70 includes the pair of cutting mechanisms 70A and 70B. Besides, the selected wire rod push-out mechanism 75 is disposed behind and above the wire rod feed mechanisms 60A and 60B, and the selected wire rod push-out mechanism 75 also includes the pair of selected wire rod push-out mechanisms 75A and 75B. Since the cutting mechanism 70 and the selected wire rod push-out mechanism 75 give the same movement in the extension direction of the twelve wire rods 25 and the direction crossing the twelve wire rods 25 at right angles, they are attached to a common movement mechanism 270.

The common movement mechanism 270 includes a guide bar 271, a pair of guide rails 272a and 272b attached to the lower part of the guide bar 271, a pair of movement blocks 273a and 273b moving along the respective guide rails 272, and a pair of screw rods 274a and 274b screwed to the movement blocks 273a and 273b. Both the pair of guide rails 272a and 272b and the pair of screw rods 274a and 274b are placed in parallel to the supply lines SL of the wire rods 25. The respective screw rods 274a and 274b are rotated by drive motors 276a and 276b through belts 275a and 275b. The pair of movement blocks 273a and 273b are moved in parallel to the supply lines SL of the wire rods 25 along the respective screw rods 274a and 274b by the rotation of the drive motors 276a and 276b.

Support stands 277a and 277b are respectively attached to the pair of movement blocks 273a and 273b. A pair of guide rails 278a and 278b are attached to the one support stand 277a, and an attachment plate 280a is attached to be movable in the direction orthogonal to the supply lines SL through the guide rails 278a and 278b. A pair of guide rails 278c and 278d are attached to the other support stand 277b, and an attachment plate 280b is attached to be movable in the direction orthogonal to the supply lines SL through these guide rails 278c and 278d.

A drive motor 281a and a screw rod 282a driven through a pulley by the drive motor 281a are attached to the support stand 277a, and the attachment plate 280a is moved in the direction crossing the supply lines SL at right angles through a movement block 283a screwed to this screw rod 282a. Similarly, a drive motor 281b and a screw rod 282b driven through a pulley by this drive motor 281b are attached to the support stand 277b, and the attachment plate 280b is moved in the direction crossing the supply lines SL at right angles through a movement block 283b screwed to this screw rod 282b.

In embodiment 5, since the cutting mechanism 70 and the selected wire rod push-out mechanism 75 include the pair of cutting mechanisms 70A and 70B and the pair of selected wire rod push-out mechanisms 75A and 75B respectively arranged side by side in the direction crossing the supply lines SL at right angles, the cutting mechanism 70A and the selected wire rod push-out mechanism 75A are attached to the one attachment plate 280a, and the cutting mechanism 70B and the selected wire rod push-out mechanism 75B are attached to the other attachment plate 280b.

Each of the cutting mechanisms 70A and 70B includes a cutter 71 and a cylinder 73 to move the cutter upward and downward at high speed. The respective cutters 71 are moved by the drive motor 276 in parallel to the supply lines SL, and are moved to upper places of the front ends of the wire rod feed mechanisms 60A and 60B in parallel to the supply lines SL. In addition, they are moved by the drive motor 281 in the direction crossing the supply lines SL at right angles, and are moved to upper places of the selected wire rods 25. After the cutters 71 complete such movement, the cutters 71 are driven downward by the cylinder 73 at high speed, and cut the selected wire rods 25.

Similarly, the respective selected wire rod push-out mechanisms 75A and 75B include pushers 76 and cylinders 77 to move the pushers 76 upward and downward at high speed. The respective pushers 76, together with the cutters 71, are moved by the drive motor 274 in parallel to the supply lines SL, and, together with the cutters 71, are moved by the drive motor 281 in the direction crossing the supply lines SL at right angles, so that they are moved to upper places of the selected wire rods 25 to be cut by the cutters 71. After the pushers 76 complete such movement, the pushers 76 are driven downward at high speed by the cylinder 77, and push out the selected wire rods 25.

Incidentally, a stocker 27 for storing the twelve wire rods 25 is disposed behind the wire rod feed mechanisms 60A and 60B. Guide grooves 28 to guide the respective wire rods 25 in parallel to the supply lines SL are formed in this stocker 27. The pushers 76 of the selected push-out mechanisms 75A and 75B are pressed to the selected wire rods at the upper part of this stocker 27, and push out them to the rotation surface 36.

In the case where the manufacturing apparatus of this embodiment 5 is used for the manufacturing method of embodiment 1, the auxiliary blocks 50A and 50B constituting the auxiliary block 50 are fixed so as not to move from the original positions, and the wire rod feed mechanisms 60A and 60B constituting the wire rod feed mechanism 60 are made to be integrally moved. Besides, the cutting mechanism 70 is not used, and the selected wire rod push-out mechanism 75 is not also used. In this case, the twelve wire rods 25 are fed onto the rotation surface 36 at the wire rod feed steps S1 and S3 by the wire rod feed mechanism 60, the forward rotation operation FR is given to the rotation block 33 by the drive motor 221 at the wire rod turn steps S2 and S4, the twelve wire rods 25 are simultaneously bent by almost 180 degrees with respect to the rotation axis L-L by the forward rotation operation FR of the rotation surface 36, and the first and the second straight parts 15A and 15B and the first and the second turn parts 15C and 15D are formed. In accordance with the forward rotation operation FR of this rotation block 33 and the subsequent counter rotation operation CR, the slight forward movement FD0 and the slight backward movement BK0 are given to the rotation block 33 by the forward and backward movement cam 224, and the shapes of the turn parts 15C and 15D are adjusted.

In the case where the manufacturing apparatus of embodiment 5 is used for the manufacturing method of embodiment 2, at the lead wire formation preparation step SLP, the cutting mechanism 70A or the cutting mechanism 70B is moved to the upper place of the selected wire rod 25, and cuts the selected wire rod 25. At the lead wire additional formation turn step STL, the auxiliary blocks 50A and 50B are integrally moved to the retract position by the movement mechanisms 53A and 53B. Further, when the avoidance return movement AR of the rotation block 33 is given, the first upward movement UP1, the backward movement BK, the downward movement DN, the forward movement FD, and the second upward movement UP2 are given by the horizontal movement cylinder 215 and the vertical movement cylinder 217, and the counter rotation movement CR is given by the drive motor 221.

In the case where the manufacturing apparatus of embodiment 5 is used for the manufacturing method of embodiment 3, in addition to the case used for the manufacturing method of embodiment 2, the selected wire rod push-out mechanisms 75A and 75B, which are moved together with the cutting mechanisms 70A and 70B, are used, and the cut wire rod 25 is selected and is pushed out to the rotation surface 36.

In the case where the manufacturing apparatus of embodiment 5 is used for the manufacturing method of embodiment 4, the wire rod feed mechanisms 60A and 60B are operated independently of each other, and when the leading end parts 18a and 18b are formed at the winding start end parts, the six wire rods 25-1 to 25-6 are previously fed to the rotation surface 36, and then, the six wire rods 25-7 to 25-12 are fed to the rotation surface 36. In addition, when the leading end parts 18c and 18d are formed at the winding finish end parts, only the auxiliary block 50A is moved to the retract position.

As stated above, according to the manufacturing apparatus 20 of embodiment 5, any of the manufacturing methods of the winding assemblies according to embodiments 1 to 4 can be handled and the effective manufacture of the winding assembly can be performed.

Especially, according to the manufacturing apparatus of the winding assembly of the rotating electrical machine according to embodiment 5, the plate-like winding core of the prior art is not used, and the plural winding members 15 can be simultaneously wound while the adjustment of the lengths of the first and the second straight parts 15A and 15B is easily performed. Besides, by the use of the rotation block 33 and the fixed block 40, since more wire rods can be simultaneously bent as compared with the prior invention, the weaving step of the prior invention is made unnecessary, or the number of times of weaving can be decreased.

INDUSTRIAL APPLICABILITY

The manufacturing method for the winding assembly of the rotating electrical machine according to this invention can be applied for manufacturing windings of various rotating electrical machines, and is effectively used for manufacturing, for example, a stator winding of a vehicle AC generator. Besides, the manufacturing apparatus for the winding assembly of the rotating electrical machine according to this invention can also be applied for manufacturing winding assemblies of various rotating electrical machines, and can be effectively used for manufacturing, for example, a stator winding of a vehicle AC generator.

The invention claimed is:

1. A manufacturing method for a winding assembly of a rotating electrical machine, comprising a winding step of winding respective winding members so that each of the plural winding members has a first straight part, a second straight part, a first turn part connecting the first straight part and the second straight part at their one sides, and a second turn part connecting the first straight part and the second straight part at the other sides, wherein at the winding step, a rotation block and a fixed block are used, the rotation block includes a rotation surface rotatable around a rotation axis, the fixed block includes a first and a second surfaces opposite to each other and a shaping surface formed between end parts of the first surface and the second surface, and the shaping surface is made to have a substantial semicircular shape with the rotation axis as a center and is extended in a direction of the rotation axis, and the winding step includes a first and a second wire rod feed steps, and a first and a second wire rod turn steps, at the first and the second wire rod feed steps, plural wire rods are supplied such that in a state where they are arranged substantially in parallel to each other, the wire rods extend from the first surface of the fixed block onto the rotation surface of the rotation block and project by a predetermined dimension from the rotation axis, and consequently, lengths of the first and the second straight parts are respectively set, and at the first and the second wire rod turn steps, the plural wire rods on the rotation surface of the rotation block, together with the rotation block, are rotated, so that the plural wire rods are simultaneously bent along the shaping surface, and the first and the second turn parts are respectively formed.

2. The manufacturing method for the winding assembly of the rotating electrical machine according to claim 1, wherein the first wire rod feed step, the first wire rod turn step, the second wire rod feed step, and the second wire rod turn step are carried out in this order in the winding step, length of the first straight part is set for the plural wire rods by the first wire rod feed step, the first turn part is formed for the plural wire rods by the first wire rod turn step, length of the second straight part is set for the plural wire rods by the second wire rod feed step, and the second turn part is formed for the plural wire rods by the second wire rod turn step.

3. The manufacturing method for the winding assembly of the rotating electrical machine according to claim 1, wherein a wire rod feed mechanism is further used, and at the first and the second wire rod feed steps, the wire rod feed mechanism simultaneously supplies the plural wire rods in a state where they are arranged substantially in parallel to each other, and the wire rod feed mechanism nips and holds the plural wire rods at the first and the second wire rod turn steps.

4. The manufacturing method for the winding assembly of the rotating electrical machine according to claim 1, wherein at the first and the second wire rod turn steps, the rotation block simultaneously bends the plural wire rods along the shaping surface by a first rotation movement of rotation in a predetermined direction around the rotation axis from its original position.

5. The manufacturing method for the winding assembly of the rotating electrical machine according to claim 4, wherein the rotation surface of the rotation block presses the plural wire rods to the second surface of the fixed block at an end of the first rotation movement, and the plural wire rods are bent by substantially 180 degrees with respect to the rotation axis.

6. The manufacturing method for the winding assembly of the rotating electrical machine according to claim 4, wherein after the first rotation movement, the rotation block performs a second rotation movement in a direction opposite to the first rotation movement, and is returned to the original position.

7. The manufacturing method for the winding assembly of the rotating electrical machine according to claim 1, wherein an auxiliary block is further used, the auxiliary block faces the first surface of the fixed block at at least the first and the second turn steps and prevents the plural wire rods from outgoing from the first surface of the fixed block in accordance with rotation of the rotation block.

8. The manufacturing method for the winding assembly of the rotating electrical machine according to claim 7, wherein the auxiliary block faces the first surface of the fixed block also at the first and the second wire rod feed steps, and the plural wire rods are supplied from between the first surface of the fixed block and the auxiliary block to the rotation surface of the rotation block.

9. The manufacturing method for the winding assembly of the rotating electrical machine according to claim 1, wherein a deformation step of deforming, among the plural winding members, a first and a second winding members in which the first straight part and the second straight part cross each other at their midpoints is carried out after the winding step, at the deformation step, first end parts of the first straight parts of the first and the second winding members and first end parts of the second straight parts of those are deformed in directions opposite to each other, second end parts of the second straight parts of the first and the second winding member and second end parts of the first straight parts of those are deformed in directions opposite to each other, a first parallel straight part is formed at each of the first straight parts of the first and the second winding members, and a second parallel straight part is formed at each of the second straight parts of those.

10. The manufacturing method for the winding assembly of the rotating electrical machine according to claim 9, wherein at the deformation step, a winding combination in which the first and the second winding members are combined is formed, and in the winding combination, the second parallel straight part of the second winding member is overlapped on the first parallel straight part of the first winding member, and the first parallel straight part of the second winding member is overlapped under the second parallel straight part of the first winding member.

11. The manufacturing method for the winding assembly of the rotating electrical machine according to claim 10, wherein an insertion step of inserting the winding combination into slots of an iron core is further carried out after the deformation step, and at this insertion step, the winding combination is combined and inserted such that among the plural slots formed at a predetermined pitch on the iron core, at a predetermined slot, the first parallel straight part of the first winding member is positioned at a first layer, and the second parallel straight part of the second winding member is positioned at a second layer, and at a slot spaced from the predetermined slot by a predetermined number of slots, the first parallel straight part of the second winding is positioned at the first layer, and the second parallel straight part of the first winding member is positioned at the second layer.

12. The manufacturing method for the winding assembly of the rotating electrical machine according to claim 9, wherein a press step of pressing the first and the second winding members so that a first plane on which each of the first straight parts is positioned and a second plane on which each of the second straight parts is position approach each other.

13. A manufacturing method for a winding assembly of a rotating electrical machine, comprising a winding step of winding respective winding members so that each of the plural winding members has a first straight part, a second straight part, a first turn part connecting the first straight part and the second straight part at their one sides, and a second turn part connecting the first straight part and the second straight part at the other sides,
wherein at the winding step, a rotation block and a fixed block are used, the rotation block includes a rotation surface rotatable around a rotation axis, the fixed block includes a first and a second surfaces opposite to each other and a shaping surface formed between end parts of the first surface and the second surface, and the shaping surface is made to have a substantial semicircular shape with the rotation axis as a center and is extended in a direction of the rotation axis, and
the winding step includes a first and a second wire rod feed steps, and a first and a second wire rod turn steps, at the first and the second wire rod feed steps, plural wire rods are supplied such that in a state where the wire rods are arranged substantially in parallel to each other, the wire rods extend along a supply line inclined by a predetermined angle α with respect to the rotation axis from the first surface of the fixed block onto the rotation surface of the rotation block and project by a predetermined dimension from the rotation axis, and consequently, lengths of the first and the second straight parts are respectively set, and at the first and the second wire rod turn steps, the plural wire rods on the rotation surface of the rotation block, together with the rotation block, are rotated, so that the plural wire rods are simultaneously bent along the shaping surface, and the first and the second turn parts are respectively formed.

14. The manufacturing method for the winding assembly of the rotating electrical machine according to claim 13, wherein the predetermined angle α is substantially 60 degrees.

15. The manufacturing method for the winding assembly of the rotating electrical machine according to claim 13, wherein the rotation block is disposed at one side of a rotator, and as a result that the plural wire rods are simultaneously bent at the first and the second wire rod turn steps, the plural wire rods go away from the rotator.

16. The manufacturing method for the winding assembly of the rotating electrical machine according to claim 13, wherein a deformation step of deforming, among the plural winding members, a first and a second winding members in which the first straight part and the second straight part cross each other at their midpoints is carried out after the winding step, at the deformation step, first end parts of the first straight parts of the first and the second winding members and first end parts of the second straight parts of those are deformed in directions opposite to each other, second end parts of the second straight parts of the first and the second winding member and second end parts of the first straight parts of those are deformed in directions opposite to each other, a first parallel straight part is formed at each of the first straight parts of the first and the second winding members, and a second parallel straight part is formed at each of the second straight parts of those.

17. The manufacturing method for the winding assembly of the rotating electrical machine according to claim 16, wherein at the deformation step, a winding combination in which the first and the second winding members are combined is formed, and in the winding combination, the second parallel straight part of the second winding member is overlapped on the first parallel straight part of the first winding member, and the first parallel straight part of the second winding member is overlapped under the second parallel straight part of the first winding member.

18. The manufacturing method for the winding assembly of the rotating electrical machine according to claim 17, wherein an insertion step of inserting the winding combination into slots of an iron core is further carried out after the deformation step, and at this insertion step, the winding combination is combined and inserted such that among the plural slots formed at a predetermined pitch on the iron core, at a predetermined slot, the first parallel straight part of the first winding member is positioned at a first layer, and the second parallel straight part of the second winding member is positioned at a second layer, and at a slot spaced from the predetermined slot by a predetermined number of slots, the first parallel straight part of the second winding is positioned at the first layer, and the second parallel straight part of the first winding member is positioned at the second layer.

19. The manufacturing method for the winding assembly of the rotating electrical machine according to claim 16, wherein a press step of pressing the first and the second winding members so that a first plane on which each of the first straight parts is positioned and a second plane on which each of the second straight parts is position approach each other.

* * * * *